United States Patent
Mihara et al.

(10) Patent No.: US 7,436,599 B2
(45) Date of Patent: Oct. 14, 2008

(54) ELECTRONIC IMAGE PICKUP SYSTEM

(75) Inventors: Shinichi Mihara, Tama (JP); Hirokazu Konishi, Hachioji (JP); Toyoharu Hanzawa, Mitaka (JP); Masahito Watanabe, Hachioji (JP); Atsujiro Ishii, Nishi-tokyo (JP); Tetsuhide Takeyama, Hachioji (JP); Ayami Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 868 days.

(21) Appl. No.: 10/142,219

(22) Filed: May 10, 2002

(65) Prior Publication Data
US 2003/0160902 A1 Aug. 28, 2003

(30) Foreign Application Priority Data
May 14, 2001 (JP) ............................. 2001-142948

(51) Int. Cl.
G02B 15/14 (2006.01)
G02B 17/00 (2006.01)
(52) U.S. Cl. ..................... 359/676; 359/726; 359/733
(58) Field of Classification Search ............... 359/676, 359/683
See application file for complete search history.

(56) References Cited

U.S. PATENT DOCUMENTS

| | | | | |
|---|---|---|---|---|
| 4,037,938 A | | 7/1977 | Yamashita et al. | 350/202 |
| 4,249,798 A | * | 2/1981 | Moskovich | 359/683 |
| 4,971,428 A | * | 11/1990 | Moskovich | 359/366 |
| 5,157,550 A | | 10/1992 | Tsuchida et al. | 359/686 |
| 5,570,229 A | | 10/1996 | Kanamori | 359/431 |
| 5,973,858 A | | 10/1999 | Sekita | 359/729 |
| 6,104,432 A | | 8/2000 | Nakamura et al. | 348/360 |
| 6,124,984 A | | 9/2000 | Shibayama et al. | 359/689 |
| 6,124,987 A | | 9/2000 | Kayanuma et al. | 359/692 |
| 6,185,048 B1 | | 2/2001 | Ishii et al. | 359/687 |

(Continued)

FOREIGN PATENT DOCUMENTS

EP 0 906 587 B1 4/2002

(Continued)

OTHER PUBLICATIONS

Patent Abstracts of Japan, JP 2002-014282, Jan. 18, 2002 (Asahi Optical Co Ltd).

(Continued)

*Primary Examiner*—Jordan M Schwartz
(74) *Attorney, Agent, or Firm*—Kenyon & Kenyon LLP

(57) ABSTRACT

The invention relates to an electronic image pickup system whose depth dimension is extremely reduced, taking advantage of an optical system type that can overcome conditions imposed on the movement of a zooming movable lens group while high specifications and performance are kept. The electronic image pickup system comprises an optical path-bending zoom optical system comprising, in order from its object side, a 1-1st lens group G1-1 comprising a negative lens group and a reflecting optical element P for bending an optical path, a 1-2nd lens group G1-2 comprising one positive lens and a second lens group G2 having positive refracting power. For zooming from the wide-angle end to the telephoto end, the second lens group G2 moves only toward the object side. The electronic image pickup system also comprises an electronic image pickup device I located on the image side of the zoom optical system.

53 Claims, 28 Drawing Sheets

U.S. PATENT DOCUMENTS

| | | | |
|---|---|---|---|
| 6,304,388 B1 * | 10/2001 | Shimo | 359/687 |
| 6,308,011 B1 | 10/2001 | Wachi et al. | 396/72 |
| 6,331,917 B1 | 12/2001 | Ishii et al. | 359/687 |
| 6,339,508 B1 | 1/2002 | Nozawa et al. | 359/686 |
| 6,349,002 B1 | 2/2002 | Shibayama et al. | 359/689 |
| 6,414,791 B1 | 7/2002 | Sugawara | 359/497 |
| 6,538,824 B1 * | 3/2003 | Mihara et al. | 359/684 |
| 2001/0038496 A1 * | 11/2001 | Yamamoto et al. | 359/689 |
| 2002/0008920 A1 | 1/2002 | Mihara et al. | 359/684 |
| 2002/0027721 A1 | 3/2002 | Mihara | 359/686 |
| 2002/0136150 A1 * | 9/2002 | Mihara et al. | 369/125 |
| 2003/0058549 A1 * | 3/2003 | Hagimori | 359/689 |

FOREIGN PATENT DOCUMENTS

| | | |
|---|---|---|
| GB | 1 366 326 | 9/1974 |
| JP | 47-187 | 4/1972 |
| JP | 63-292106 | 11/1988 |
| JP | 63-307424 | 12/1988 |
| JP | 03-139607 | 6/1991 |
| JP | 03-158817 | 7/1991 |
| JP | 5-34769 | 12/1993 |
| JP | 7-5360 | 1/1995 |
| JP | 08-070400 | 3/1996 |
| JP | 08-130702 | 5/1996 |
| JP | 08-304704 | 11/1996 |
| JP | 09-211287 | 8/1997 |
| JP | 11-194274 | 7/1999 |
| JP | 11-249016 | 9/1999 |
| JP | 11-305312 | 11/1999 |
| JP | 2000-131610 | 5/2000 |
| JP | 2000-137164 | 5/2000 |
| JP | 2000-165708 | 6/2000 |
| JP | 2000-515255 | 11/2000 |

OTHER PUBLICATIONS

Patent Abstracts of Japan, JP 2002-014285, Jan. 18, 2002 (Asahi Optical Co Ltd).
Patent Abstracts of Japan, JP 2001-100100, Apr. 13, 2001 (Cosina Co Ltd).
Patent Abstracts of Japan, JP 2001-318313, Nov. 16, 2001 (Canon Inc).
Patent Abstracts of Japan, JP 2001-337275, Dec. 7, 2001 (Canon Inc).
Patent Abstracts of Japan, JP 08-248318, Sep. 27, 1996 (Sony Corp).
Patent Abstracts of Japan, JP 2000-131610, May 12, 2000 (Sony Corp).
Patent Abstracts of Japan, JP 07-005360, Jan. 10, 1995 (Olympus Optical Co Ltd).
Patent Abstracts of Japan, JP 2001-021986, Jan. 26, 2001 (Canon Inc).
Patent Abstracts of Japan, JP 03-203709, Sep. 5, 1991 (Minolta Camera Co Ltd).
Patent Abstracts of Japan, JP 11-305312, Nov. 5, 1999 (Ricoh Co Ltd).
Patent Abstracts of Japan, JP 2000-267010, Sep. 29, 2000 (Olympus Optical Co Ltd).

* cited by examiner

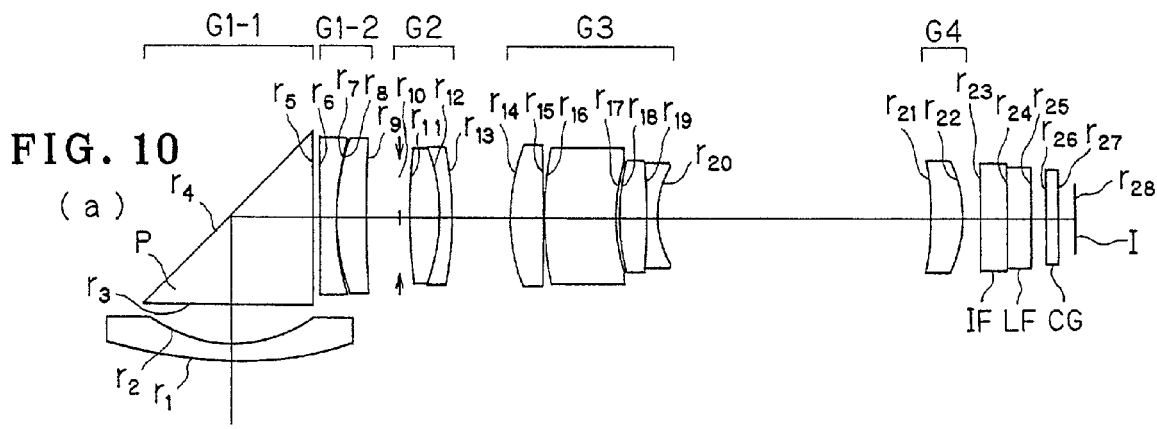
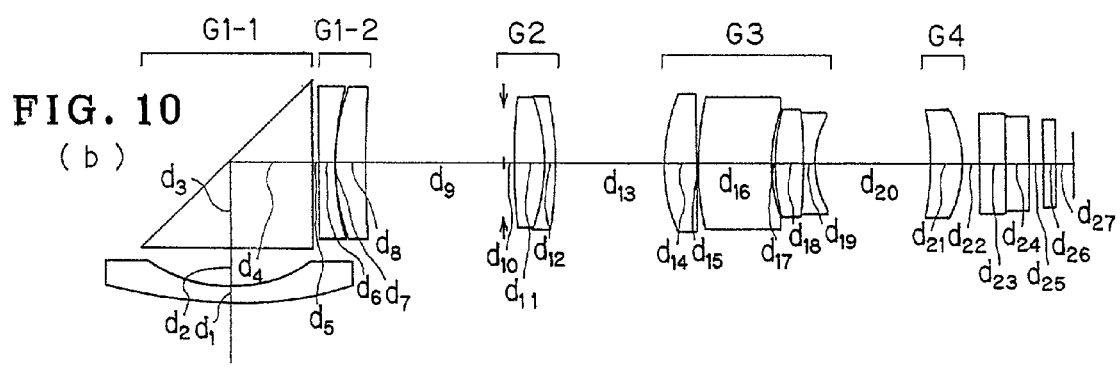
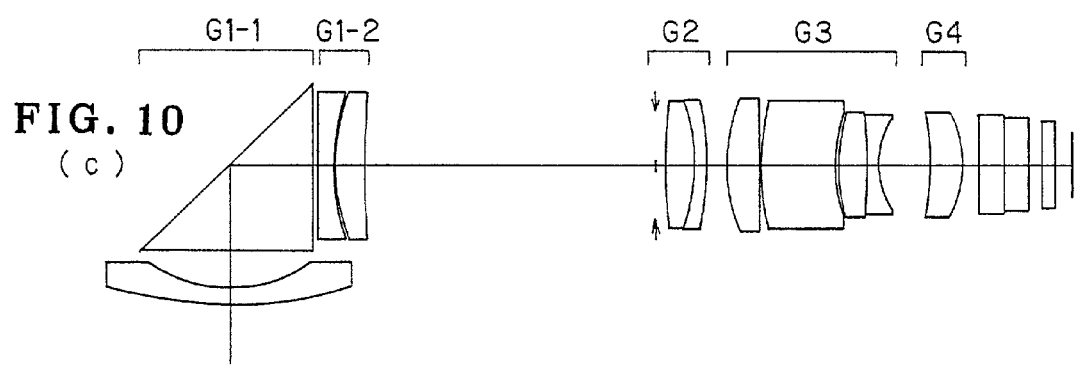

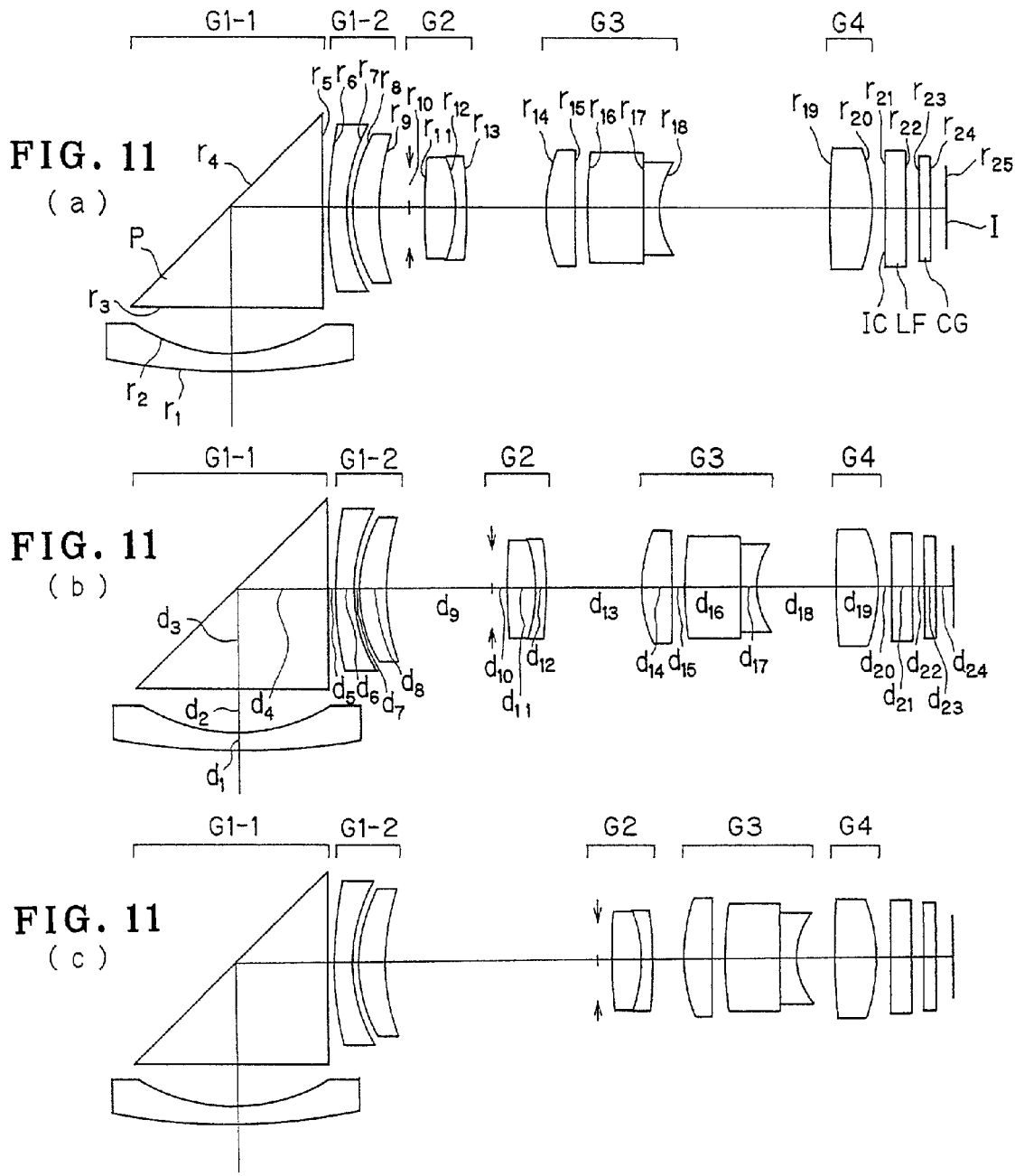

(a)

(b)

C: Cyan  M: Magenta
Ye: Yellow  G: Green (a)

(b)

(a)

(b)

(c)

ELECTRONIC IMAGE PICKUP SYSTEM

This application claims benefits of Japanese Application No. 2001-142948 filed in Japan on May 14, 2001, the contents of which are incorporated by this reference.

BACKGROUND OF THE INVENTION

The present invention relates generally to a slim electronic image pickup system comprising an optical path-bending zoom optical system, and particularly to an image pickup system inclusive of video cameras or digital cameras, the depth dimension of which is reduced by contriving an optical system portion thereof, e.g., a zoom lens.

In recent years, digital cameras (electronic cameras) have received attention as cameras of the next generation, an alternative to silver-salt 35 mm-film (usually called Leica format) cameras. Currently available digital cameras are broken down into some categories in wide ranges from the high-end type for commercial use to the portable low-end type.

In view of the portable low-end type category in particular, the primary object of the present invention is to provide the technology for implementing video or digital cameras whose depth dimension is reduced while ensuring high image quality.

The gravest bottleneck in making the depth dimension of cameras thin is the thickness of an optical system, especially a zoom lens from the surface located nearest to the object side to the image pickup plane. To make use of a collapsible lens mount that allows the optical system to be taken out of a camera body for phototaking and received therein for carrying now becomes mainstream. However, the thickness of an optical system received in a collapsible lens mount varies largely with the lens type or filter used. Especially in the case of a so-called+ precedent type zoom lens wherein a lens group having positive refracting power is positioned nearest to its object side, the thickness of each lens element and dead space are too large to set such requirements as zoom ratios and F-numbers at high values; in other words, the optical system does not become slime as expected, even upon received in the lens mount (JP-A 11-258507). A− precedent type zoom lens, especially of two or three-group construction is advantageous in this regard. However, this type zoom lens, too, does not become slim upon received in a collapsible lens mount, even when the lens positioned nearest to the object side is formed of a positive lens (JP-A 11-52246), because the lens groups are composed of an increased number of lens elements, and the thickness of lens elements is large.

Among zoom lenses known so far in the art, those set forth typically in JP-A's 11-194274, 11-287953 and 2000-9997 are suitable for use with electronic image pickup systems with improved image-formation capabilities including zoom ratios, field angles and F-numbers, and may possibly be reduced in thickness upon received in collapsible lens mounts.

To make the first lens group thin, it is preferable to make the entrance pupil position shallow; however, the magnification of the second lens group must be increased to this end. For this reason, some considerable load is applied on the second lens group. Thus, it is not only difficult to make the second lens group itself thin but it is also difficult to make correction for aberrations. In addition, the influence of production errors grows. Thickness and size reductions may be achieved by making the size of an image pickup device small. To ensure the same number of pixels, however, the pixel pitch must be diminished and insufficient sensitivity must be covered by the optical system. The same goes true for the influence of diffraction.

To obtain a camera body whose depth dimension is reduced, a rear focusing mode wherein the rear lens group is moved for focusing is effective in view of the layout of an associated driving system. It is then required to single out an optical system less susceptible to aberration fluctuations upon rear focusing. Alternatively, such thickness reductions may be achieved by bending the optical path of an optical system with a mirror or the like; however, some considerable restrictions are imposed on the zooming movement of lenses because of the space for such optical path bending.

SUMMARY OF THE INVENTION

In view of such problems with the prior art as referred to above, the primary object of the present invention is to provide an electronic image pickup system with extremely diminished depth dimension, which makes use of a rear focus type zoom lens wherein the optical path (optical axis) of an optical system is bent with a reflecting optical element such as a mirror, and restrictive conditions for the zooming movement of a moving lens group can be substantially eliminated while maintaining high specification requirements and improved performance.

According to the present invention, the aforesaid object is accomplished by the provision of an electronic image pickup system, characterized by comprising an optical path-bending zoom optical system comprising at least one lens group that moves only toward an object side of said optical system for zooming from a wide-angle end to a telephoto end of said optical system and at least one reflecting optical element for bending an optical path, which element is located between said object side of said optical system and a lens included in all lens groups movable during zooming and located nearest to said object side of said optical system, and an electronic image pickup device disposed on an image side of said optical system.

Why the aforesaid arrangement is used in the present invention, and how it works is now explained.

In the present invention, there is used an optical path-bending zoom optical system comprising at least one lens group that moves only toward the object side of said optical system for zooming from a wide-angle end to a telephoto end of said optical system and at least one reflecting optical element for bending an optical path, which element is located between said object side of said optical system and a lens included in all lens groups movable during zooming and located nearest to said object side of said optical system. To direct the entrance surface of the lens system toward the object side and reduce the depth dimension thereof, it is preferable that the optical path is bent at a position of a phototaking optical system which is as close to the object side as possible and at an air separation where the height of light rays is low. To simplify the driving system for zooming and focusing purposes, the moving lens group(s) is preferably located at an image side position with respect to the bending position. To reduce bending space as much as possible, it is preferable that the composite or combined focal length of a partial system from the lens disposed nearest to the object side, at which the bending portion exists, to just before the lens group that moves during zooming, is negative, because the heights of all light rays contributing to the formation of images in the vicinity of the bending position should preferably be low.

Specifically, one lens arrangement well fit for the bending zoom optical system is of the type that comprises, in order from its object side, a 1-1st lens group comprising a negative lens group and a reflecting optical element for bending an optical path, a 1-2nd lens group comprising one positive lens and a second lens group having positive refracting power, wherein for zooming from the wide-angle end to the telephoto end of the arrangement, the second lens group moves only toward the object side of the arrangement.

Another lens arrangement well suitable for the bending zoom optical system is of the type that comprises, in order from its object side, a 1-1st lens group comprising a prism that is a reflecting optical element for bending an optical path, wherein at least one of an entrance surface and an exit surface is defined by a concave surface, a 1-2nd lens group comprising one positive lens and a second lens group having positive refracting power, wherein for zooming form the wide-angle end to the telephoto end of the arrangement, the second lens group moves monotonously toward the object side of the arrangement.

In either type, it is preferable that an axial distance d, as calculated on an air basis, from a refracting surface just before the reflecting surface of the reflecting optical element to a refracting surface just after the reflecting surface should satisfy the following condition (a):

$$0.5 < d/L < 2.1 \quad (a)$$

where L is the diagonal length of an effective image pickup area (in a substantially rectangular form) on the electronic image pickup device.

As the upper limit of 2.1 to this condition (a) is exceeded, the optical system becomes too large. As the lower limit of 0.5 is not reached, a light beam that contributes to the imaging of the perimeter of an image does not satisfactorily arrive at the image plane or ghosts are likely to occur.

It is noted that when the field angle in the optical path-bending direction is in the range of 25°±3°, condition (a) should preferably be reduced down to the following condition (a-1), and when it is in the range of about 19°±3°, condition (a) should preferably be reduced down to the following condition (a-2).

$$0.8 < d/L < 1.9 \quad (a\text{-}1)$$

$$0.5 < d/L < 1.5 \quad (a\text{-}2)$$

More preferably, $$0.9 < d/L < 1.8 \quad (a'\text{-}1)$$

$$0.6 < d/L < 1.4 \quad (a'\text{-}2)$$

In either type, the profile of paraxial refracting power may be properly determined even when surfaces other than a planar surface are used for the reflecting surface. Preferably, however, a control system that allows the shape of the reflecting surface to be freely transformed is provided to make up a variable-shape mirror that corrects fluctuations of focal position and aberrations with zooming, and is of controllable shape for focusing or zooming purposes.

Alternatively, the reflecting optical element may be constructed as by cementing a planoconcave lens to a planar portion of the prism. To reconcile the level of correction of distortion well with the target size of the electronic image pickup system, it is acceptable to add a positive lens of weak power to the surface of the reflecting optical element located nearest to the object side. In this case, the 1-2nd lens group may be dispensed with.

Preferably in each of the two zoom types, the final lens group should be made up of a single lens having an aspheric surface. This is very effective for correction of off-axial aberrations such as distortions, astigmatisms and comas. This lens serves to cancel out aberrations produced at portions of the optical system, which are present on the object side with respect thereto; as the lens moves for focusing or other purposes, aberrations get out of balance. Thus, it is preferable to fix the final lens group.

Focusing should preferably be carried out with the second lens group and, if any, the subsequent lens group(s) save the final lens group, because the first lens group is provided for bending the optical path and so is not appropriate for any focusing group. It is particularly preferable to carry out focusing with the second lens group as counted from the final lens group toward the object side, because that lens group is less vulnerable to focal length and aberration fluctuations. When, in this case, the optical system is focused on a nearby object, such second lens group is moved out. For focusing, it is then preferable that the optical axis air separation $D_{FT}$ between the second lens group and the third lens group as counted from the final lens group toward the object side, upon focused on an infinite-distance object point at the telephoto end, satisfies the following condition (b).

$$0.1 < D_{FT}/f_T < 1.5 \quad (b)$$

Here $f_T$ is the focal length of the zoom optical system upon focused on an infinite-distance object point at the telephoto end.

As the upper limit of 1.5 to condition (b) is exceeded, it is difficult to ensure any desired zoom ratio, and as the lower limit of 0.1 is not reached, it is impossible to allow any focusable distance.

More preferably, $$0.2 < D_{FT}/f_T < 1 \quad (b')$$

Even more preferably, $$0.25 < D_{FT}/f_T < 0.8 \quad (b'')$$

Each of the aforesaid two zoom types should preferably comprise an additional or third lens group located on the image side of the second lens group and having positive refracting power, so that upon zooming from the wide-angle end to the telephoto end, the second and third lens groups move with a change in the relative spacing between them. With this zooming mode, it is possible to make the zoom ratio of the optical system high while its focal position upon zooming is corrected by taking advantage of space.

Preferably in that case, the ratio between the amounts of movement $M_2$ and $M_3$ of the second and third lens groups upon zooming from the wide-angle end to the telephoto end of the optical system when focused on a point at infinity should satisfy the following range:

$$0.5 < M_3/M_2 < 2.0 \quad (c)$$

As the upper limit of 2.0 to condition (c) is exceeded, it is impossible to ensure any satisfactory zoom ratio or focusable distance range. As the lower limit of 0.5 is not reached, it is again impossible to ensure any satisfactory zoom ratio.

More preferably, $$0.7 < M_3/M_2 < 1.4 \quad (c')$$

Even more preferably, $$0.8 < M_3/M_2 < 1.25 \quad (c'')$$

Preferable in each of the aforesaid two zoom types, the first lens group (the combined 1-1st and 1-2nd system) should remain fixed upon zooming or focusing, because it is an optical path-bending system that is difficult to move for mechanical reasons. It is here noted that while the 1-1st lens group is fixed upon zooming, the 1-2nd lens group may remain movable because of being relatively easy to move. Preferably in this case, the 1-2nd lens group should be designed to move in an orbit convex toward the image side. It is also preferable that the 1-2nd lens group comprises, in order from its object side, two lenses, a negative and a positive or, alternatively, one positive lens for the purpose of correcting off-axis aberrations such as chromatic aberrations and distortions.

Furthermore, if any one of such structural limitations as mentioned below is added to the bending zoom lens system, it is then possible to better its specifications and performance and simplify its construction, resulting in additional contributions to thickness reductions of the associated image pickup systems.

Limitation 1:

In the 1-1st lens group, the negative lens group located on the object side with respect to the reflecting optical element for bending the optical path comprises only one negative lens convex on its object side. With this arrangement, it is possible to minimize the depth dimension of the optical system while the desired field angle is maintained.

Limitation 2:

In that case, it is of significance that the negative lens has some power. In other words, the power ratio between the 1-1st lens group and the 1-2nd lens group should preferably satisfy:

$$0.8 < f_{11}/f_{12} < 1.9 \quad (d)$$

where $f_{11}$ is the focal length of the 1-1st lens group and $f_{12}$ is the focal length of the 1-2nd lens group. Any deviation from the upper and lower limits of 1.9 and −0.8 makes the bending optical element likely to become large.

More preferably, $$-0.6 < f_{11}/f_{12} < 1.7 \quad (d')$$

Even more preferably, $$-0.4 < f_{11}/f_{12} < 1.5 \quad (d'')$$

Limitation 3:

One of the second and third lens groups comprises a single lens, and the other comprises at least a concave lens.

The second and third lens groups move in approximately the same direction while the relative spacing between them changes slightly so that they can share the common use of a narrow space for zooming while the focal position is kept constant. Another merit is that correction of chromatic aberrations is not necessarily brought to completion for each lens group. In short, chromatic aberrations at the second lens group can be corrected separately from those at the third lens group, so that either one can be composed of a single lens, resulting in some contribution to the size and weight reductions of the optical system.

Limitation 4:

To reduce the change in the relative spacing between the second and the third lens group as much as possible, zooming should preferably be carried out at the magnification of the combined system of the second and subsequent lens groups, which is around −1. To this end, it is desired to satisfy the following condition at the telephoto end:

$$0.7 < -\beta_{Rt} < 2.1 \quad (e)$$

Here $\beta_{Rt}$ is the combined magnification of the second and subsequent lens groups at the telephoto end (upon focused on an object point at infinity).

Any deviation from the upper and lower limits of 2.1 and 0.7 to this condition incurs an increase in the amount of change in the relative spacing between the second and the third lens group.

More preferably, $$0.8 < -\beta_{Rt} < 1.9 \quad (e')$$

Even more preferably, $$0.85 < -\beta_{Rt} < 1.7 \quad (e'')$$

The present invention also provides an electronic image pickup system, characterized by comprising:

an optical path-bending zoom optical system comprising at least one lens group that moves only toward its object side upon zooming from the wide-angle end to the telephoto end of the optical system and at least one reflecting optical element for, upon zooming, bending an optical path toward the object side with respect to the lens included in all movable lens groups and located nearest to the object side, said optical path being defined by an entrance surface and an exit surface, at least one of which has a curvature, and an electronic image pickup device located on the image side of said optical system.

Thus, if the reflecting optical element (prism) for bending the optical path is allowed to have refracting power, it is then possible to diminish the number of lens elements, making contributions to size reductions or cost reductions.

In this case, the reflecting optical element for bending the optical path may be located nearest to the object side of the optical path-bending zooming optical system.

Thus, if the optical path-bending element is located as near to the object side as possible, it is then possible to diminish the depth dimension of the electronic image pickup system.

Furthermore, the entrance surface of the reflecting optical element for bending the optical path may be directed toward the object side of the zoom optical system.

According to one embodiment of the present invention, there is provided a slim electronic image pickup system constructed using a zoom optical system comprising, in order from its object side, a negative meniscus lens and an optical path-bending prism. If the optical path-bending prism is designed to have an entrance surface with negative refracting power, it is then possible to make the depth dimension of the electronic image pickup system by far smaller, because that negative meniscus lens can be dispensed with.

In that case, the entrance surface of the reflecting optical element for bending the optical path may be defined by an aspheric surface.

The axial curvature of the entrance surface having a negative value (the entrance surface being concave on the object side) is unfavorable in consideration of correction of off-axis aberrations such as distortions. With the introduction of the aspheric surface, however, such aberrations can be well corrected.

Furthermore, the exit surface of the reflecting optical element for bending the optical path may be defined by a planar surface.

It is here noted that when an aspheric surface is applied to the entrance surface as mentioned above, it is difficult to ensure any desired decentration accuracy between that surface and the exit surface. However, if another surface (exit surface) is defined by a planar surface, it is then possible to slacken off demand for decentration accuracy between both surfaces.

The lens group that moves only toward the object side upon zooming from the wide-angle end to the telephoto end is made up of two positive lenses and at least one negative lens. It is then acceptable that at least each positive lens and the negative lens are cemented together.

In the lens group that moves only toward the object side upon zooming form the wide-angle end to the telephoto end, there is a tendency for aberrations to deteriorate largely due to relative decentration between the positive lens and the negative lens. It is thus preferable that the positive and the negative lens are cemented to the greatest extent practicable.

The lens group that moves only toward the object side upon zooming from the wide-angle end to the telephoto end is made up of two positive lenses and at least one negative lens. It is then acceptable that at least one positive lens and the negative lens are cemented together.

Thus, the lens group that moves only toward the object side upon zooming from the wide-angle end to the telephoto end should comprise at least two positive lenses and at least one negative lens, at least three in all.

Next, how and why the thickness of filters is reduced is now explained. In an electronic image pickup system, an infrared absorption filter having a certain thickness is usually inserted between an image pickup device and its object side and positioned nearer to the object side, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance of at least 80% at 600 nm and a transmittance of up to 10% at 700 nm is introduced between an image pickup device in the rear of the zoom lens system and the object side of the system and nearer to the object side, the transmittance on the red side is relatively higher that that of the absorption type, so that the tendency of bluish purple to turn into magenta—a defect of a complementary mosaic filter-inserted CCD—is diminished by gain control and there can be obtained color reproduction comparable to that by a CCD having a primary colors filter. On the other hand, a complementary filter is higher in substantial sensitivity and more favorable in resolution than a primary colors filter-inserted CCD due to its high transmitted energy, and provides a great merit when used in combination with a small-size CCD. Regarding an optical low-pass filter that is another filter, too, its total thickness, $t_{LPF}$, should preferably comply with the following condition:

$$0.15a < t_{LPF} < 0.45a (mm) \quad (f)$$

Here $a$ is the horizontal pixel pitch (in μm) of the electronic image pickup device.

Reducing the thickness of the optical low-pass filter, too, is effective for making the thickness of the zoom lens upon received in the lens mount; however, this is generally not preferred because the moiré preventive effect becomes slender. On the other hand, as the pixel pitch becomes small, the contrast of frequency components greater than Nyquist criterion decreases under the influence of diffraction of an image-formation lens and, consequently, the decrease in the moiré preventive effect is more or less acceptable. For instance, it is known that when three different filters having crystallographic axes in directions where upon projected onto the image plane, the azimuth angle is horizontal (=0°) and ±45° are used while they are put one upon another, some moiré preventive effect is obtainable. According to the specifications known to make the filter assembly thinnest, each filter is displaced by $a$ μm in the horizontal and by SQRT(½)*a μm in the ±45° directions. Here SQRT means a square root. The then filter thickness is approximately given by [1+2*SQRT(½)]*a/5.88 (mm). This is the specification where the contrast is reduced down to zero at a frequency corresponding just to Nyquist criterion. At a thickness a few % to a few tens of % smaller than this, a little more contrast of the frequency corresponding to Nyquist criterion appears; however, this can be suppressed under the influence of the aforesaid diffraction.

In other filter embodiments where two filters are placed one upon another or one single filter is used, too, it is preferable to comply with condition (f). When the upper limit of 0.45a is exceeded, the optical low-pass filter becomes too thick, contrary to size reduction requirements. When the lower limit of 0.15a is not reached, moiré removal becomes insufficient. In this condition, $a$ should be 5 μm or less.

When $a$ is 4 μm or less or where the optical low-pass filter is more susceptible to diffraction, it is preferable that $$0.13a < t_{LPF} < 0.42a \quad (f')$$

It is also acceptable that when $a$ is 4 μm or greater,
  $0.3a < t_{LPF} < 0.4a$ provided that three filters are placed one upon another and a<5 μm
  $0.2a < t_{LPF} < 0.28a$ provided that two filters are placed one upon another and a<5 μm
  $0.1a < t_{LPF} < 0.16a$ provided that one filter is used and a<5 μm when $a$ is 4 μm or less,
  $0.25a < t_{LPF} < 0.37a$ provided that three filters are placed one upon another
  $0.16a < t_{LPF} < 0.25a$ provided that two filters are placed one upon another
  $0.08a < t_{LPF} < 0.14a$ provided that one filter is used When an image pickup device having a small pixel pitch is used, there is degradation in image quality under the influence of diffraction effect by stop-down. In this case, the electronic image pickup system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by $a$ (μm)/F-number<4.0, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

In order to slim down an electronic image pickup system, not only contrivances for an associated optical system but also contrivances for its mechanical mechanism and layouts are of importance. In particular, it is important to take advantage of the collapsible lens mount type wherein the optical system is received in the lens mount. For the lens arrangement of the present invention, it is preferable to make use of a specific collapsible lens mount type wherein the reflecting optical element already in the optical system body is relocated from the optical path in a separate space in the optical system body, and the lens groups that are located on the object side with respect to the reflecting optical element and move out of the optical system body during phototaking are received in the resulting space on the optical path.

This specific collapsible lens mount type may also be applied to an optical system having a lens arrangement other than that of the present invention, provided that it comprises, in order from its object side, a first lens group of negative power, a reflecting optical element for bending an optical path and a second lens group of positive power. The reflecting optical element is relocated from the optical path in a separate space in the optical system body, so that the first lens group is received in the resulting space on the optical path.

Preferably in this case, while the first lens group is received in the optical system body, the second lens group is shifted to the image side with respect to the position farthest away from the image plane at the time of phototaking. There is also a moving space for zooming or focusing subsequent to the second lens group. To make effective use of that space during lens reception or the like, the second lens is put down as close to the image side as possible and, if required, the reflecting optical element is shifted to the image side, so that the first lens group is received in place.

For instance, when the reflecting optical element is constructed of a reflecting mirror comprising a thin plate with a reflecting mirror coating applied thereon, the first lens group can be received in place with no need of any separate space, because the reflecting mirror is relocated vertically to the optical axis with the reflecting surface bent.

Besides, each of lenses other than the reflecting optical element may be tilted or shifted during lens reception, thereby creating some reception space.

When the prism is constructed of a solid outer shell with a liquid or the like filled therein, thickness reductions may be achieved by removing the liquid from inside.

It is noted that with an optical system using a reflecting optical element, the following embodiments are feasible.

The best embodiment is a TTL single-lens reflecting optical system fused with a Porro prism type finder.

In one typical embodiment of this optical system, between a phototaking optical system including a reflecting optical element and an image pickup device there is interposed a second reflecting surface for splitting (in time division, amplitude division or any other modes) an optical path toward a side nearly at right angles with a plane including an optical axis before and after reflection at the reflecting optical element. A third reflecting surface is disposed along the opposite side, with the normal lying in much the same plane with respect to the normal to the second reflecting surface and nearly at right angles therewith. Furthermore, a fourth reflecting surface is disposed in such a way that an optical path after reflection thereat runs parallel with the optical axis of the entrance side of the phototaking optical system. This makes a great deal of contribution to the thickness reductions of a camera.

In the second embodiment wherein the reflecting optical element and an optical system on the object side with respect thereto is designed to be rotatable with respect to the vicinity of the entrance pupil of a phototaking optical system or the like, it is possible to change the phototaking direction. Alternatively, optical prevention of camera movements is possible.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 10(a) to 10(c) are sections in schematic illustrative of Example 10 of the optical path-bending zoom optical system, similar to FIGS. 1(a) to 1(c).

FIGS. 11(a) to 11(c) are sections in schematic illustrative of Example 11 of the optical path-bending zoom optical system, similar to FIGS. 1(a) to 1(c).

DESCRIPTION OF THE PREFERRED EMBODIMENTS

Examples 1 to 12 of the optical path-bending zoom optical system used with the electronic image pickup system of the invention are now explained. Sectional lens configurations of these examples at the telephoto end (a), intermediate state (b) and wide-angle end (c) upon focused on an object point at infinity are shown in FIGS. 1 through 12 wherein G1 represents a first lens group, G1-1 a 1-1st lens group, G1-2 a 1-2nd lens group, G2 a second lens group, G3 a third lens group, G4 a fourth lens group, G5 a fifth lens group, P an optical path-bending prism, S an aperture stop (in an independent case), IF a near infrared cut filter, IC a near infrared cut coat surface, LF a low-pass filter, CG a cover glass for an electronic image pickup device CCD, and I the image plane of CCD. The near infrared cut filter IF and low-pass filter LF or the near infrared cut coat surface IC, low-pass filter LF and cover glass CG, located in order from the object side of the zoom optical system, are fixedly provided between the final lens group and the image plane I.

Figure 1:
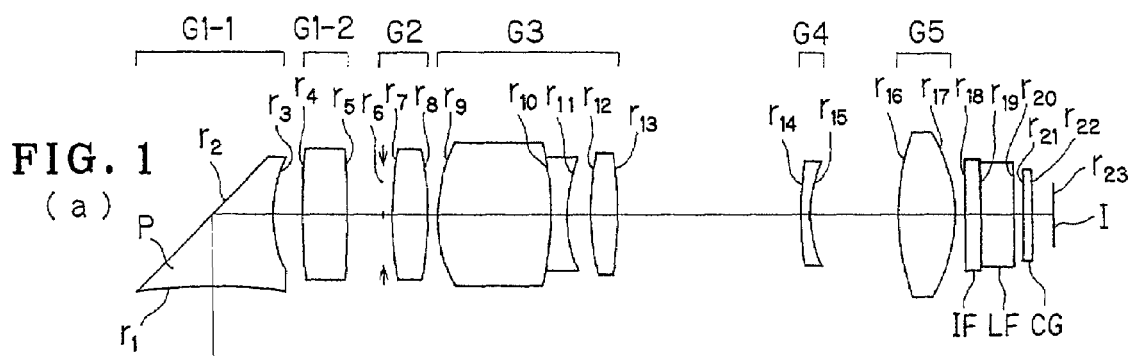
FIGS. 1(a) to 1(c) are sections in schematic illustrative of Example 1 of the optical path-bending zoom optical system used with the electronic image pickup system of the invention at the telephoto end (a), intermediate state (b) and wide-angle end (c) when the optical path-bending zoom optical system is focused on an object point at infinity.
Figure 1:
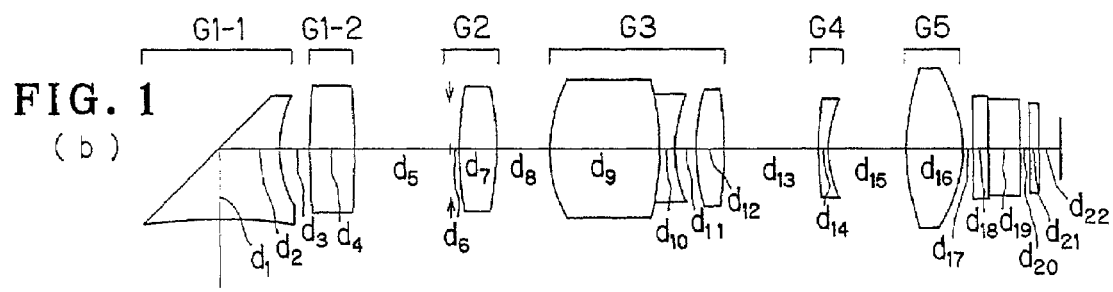
Figure 1:
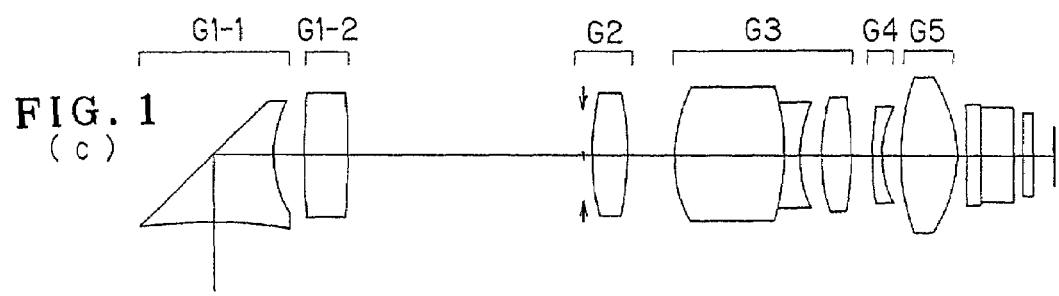

As shown in FIG. 1, Example 1 is directed to an optical path-bending zoom optical system made up of a 1-1st lens group G1-1 consisting of an optical path-bending prism P equivalent to a double-concave negative lens, a 1-2nd lens group G1-2 consisting of a double-convex positive lens, a second lens group G1 consisting of an aperture stop and a double-convex positive lens, a third lens group G3 consisting of a doublet composed of a double-convex positive lens and a double-concave negative lens and a double-convex positive lens, a fourth lens group G4 consisting of a negative meniscus lens convex on its object side, and a fifth lens group G5 consisting of a double-convex positive lens. For zooming from the wide-angle end to the telephoto end of the zoom optical system, the second lens group G2 and the third lens group G3 move toward the object side while the spacing between them becomes wide and then narrow, and the fourth lens group G4 and the third lens group G3 move toward the object side while the spacing between them becomes wide.

Four aspheric surfaces are used, one at the object-side surface of the double-convex positive lens in the 1-2nd lens group G1-2, one at the object-side surface of the double-convex positive lens in the second lens group G2, one at the image-side surface of the negative meniscus lens in the fourth lens group G4, and one at the image-side surface of the double-convex positive lens in the fifth lens group G5.

Figure 2:
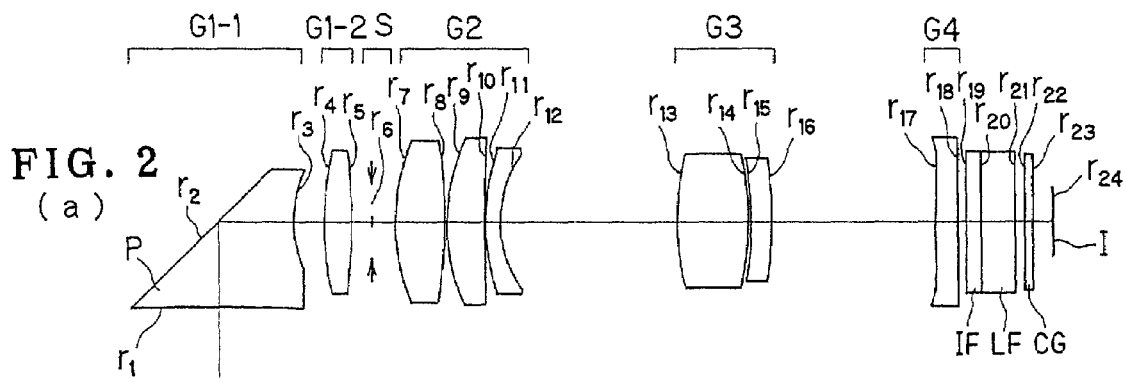
FIGS. 2(a) to 2(c) are sections in schematic illustrative of Example 2 of the optical path bending-zoom optical system, similar to FIGS. 1(a) to 1(c).
Figure 2:
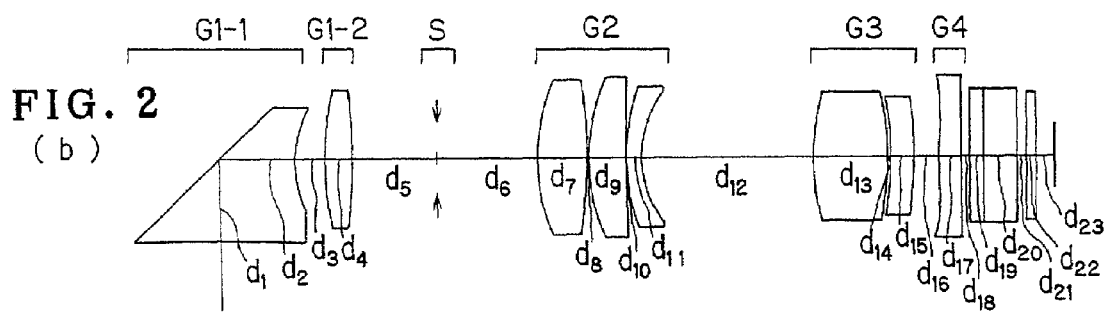
Figure 2:
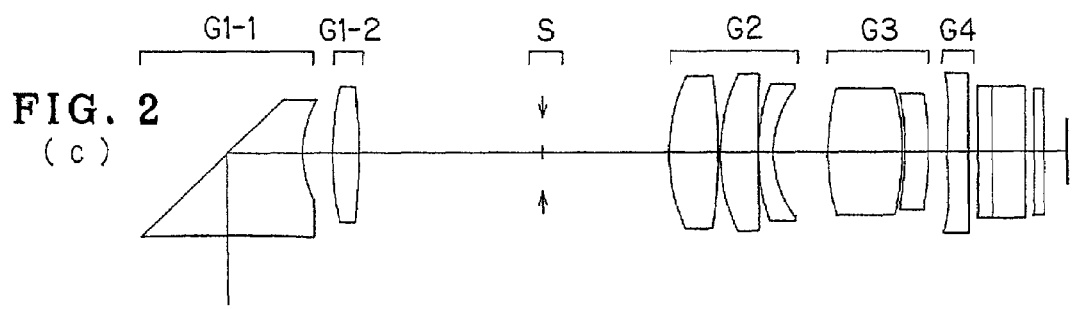

As shown in FIG. 2, Example 2 is directed to an optical path-bending zoom optical system made up of a 1-1st lens group consisting of an optical path bending prism P equivalent to a double-concave negative lens, a 1-2nd lens group consisting of a double-convex positive lens, an independently moving aperture stop S, a second lens group G2 consisting of a double-convex positive lens, a positive meniscus lens convex on its object side and a negative meniscus lens convex on its object side, a third lens group G3 consisting of a double-convex positive lens and a negative meniscus lens convex on its image side, and a fourth lens group G4 consisting of a positive meniscus lens convex on its object side. For zooming from the wide-angle end to the telephoto end of the zoom optical system, the second lens group G2 and the third lens group move toward the object side while the spacing between them becomes wide. The aperture stop S located between the 1-2nd lens group 1-2 and the second lens group G2, too, moves toward the object side while the spacing between the 1-2nd lens group G1-2 and the fourth lens group G4 becomes narrow.

Three aspheric surfaces are used, one at the object-side surface of the double-convex positive lens in the 1-2nd lens group G1-2, one at the surface of the second lens group G2 located nearest to its object side, and one at the object-side surface of the positive meniscus lens in the fourth lens group G4.

Figure 3:
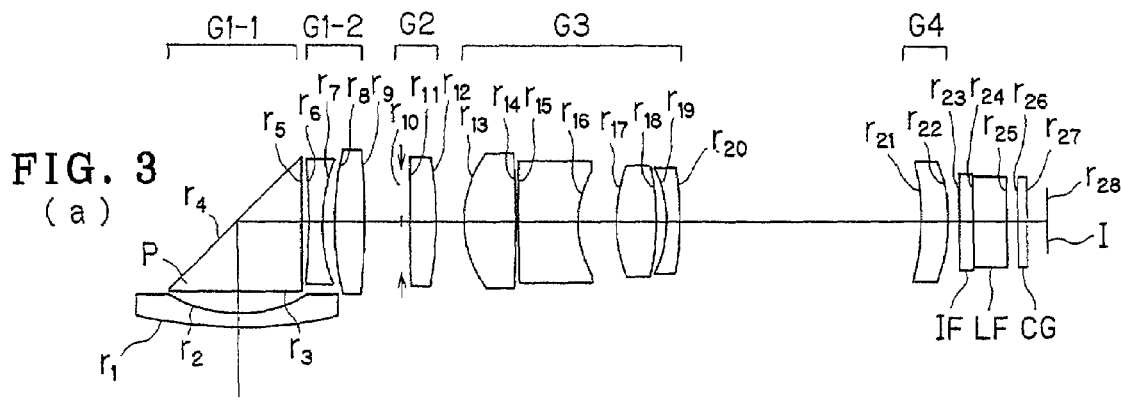
FIGS. 3(a) to 3(c) are sections in schematic illustrative of Example 3 of the optical path-bending zoom optical system, similar to FIGS. 1(a) to 1(c).
Figure 3:
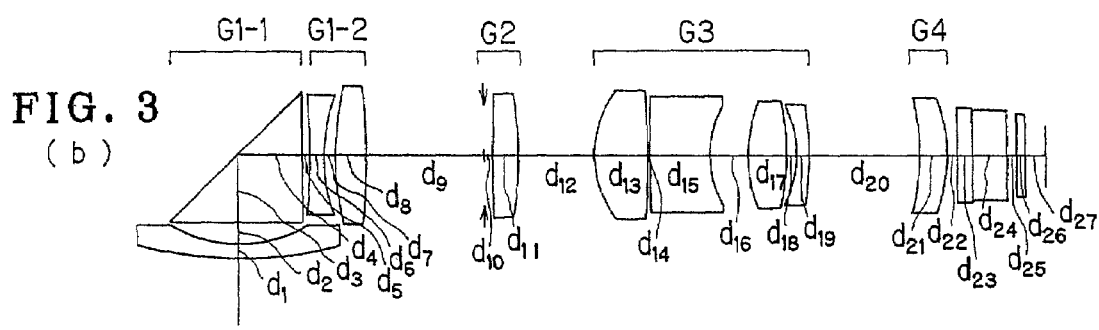
Figure 3:
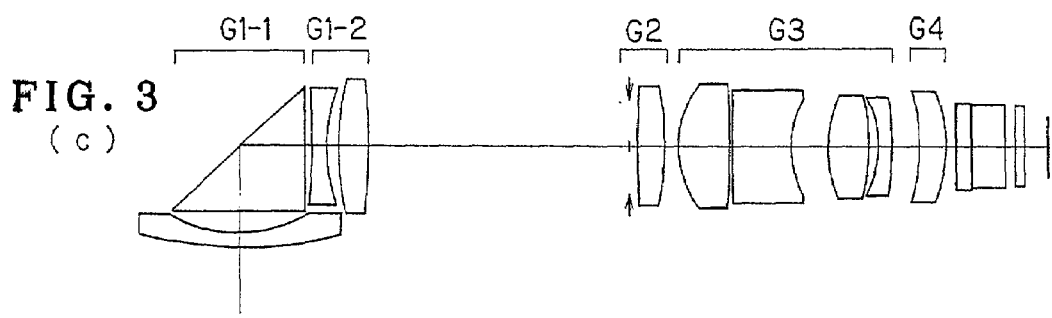

As shown in FIG. 3, Example 3 is directed to an optical path-bending zoom optical system made up of a 1-1st lens group G1-1 consisting of a negative meniscus lens convex on its object side and an optical path bending prism P equivalent to a plane-parallel plate, a 1-2nd lens group G1-2 consisting of a double-concave negative lens and a double-convex positive lens, a second lens group G2 consisting of an aperture stop and a double-convex positive lens, a third lens group G3 consisting of a double-convex positive lens, a negative meniscus lens convex on its object side, a double-convex positive lens and a negative meniscus lens convex on its image side, and a fourth lens group G4 consisting of a positive meniscus lens convex on its image side. For zooming from the wide-angle end to the telephoto end of the zoom optical system, the second lens group G2 and the third lens group G3 move toward the object side of the zoom optical system while the spacing between them becomes wide and then narrow.

Three aspheric surface are used, one at the object side-surface of the double-convex positive lens in the 1-2nd group G1-2, one at the surface of the third lens group G3 located nearest to its object side, and one at the object side-surface of the positive meniscus lens in the fourth lens group G4.

Figure 4:
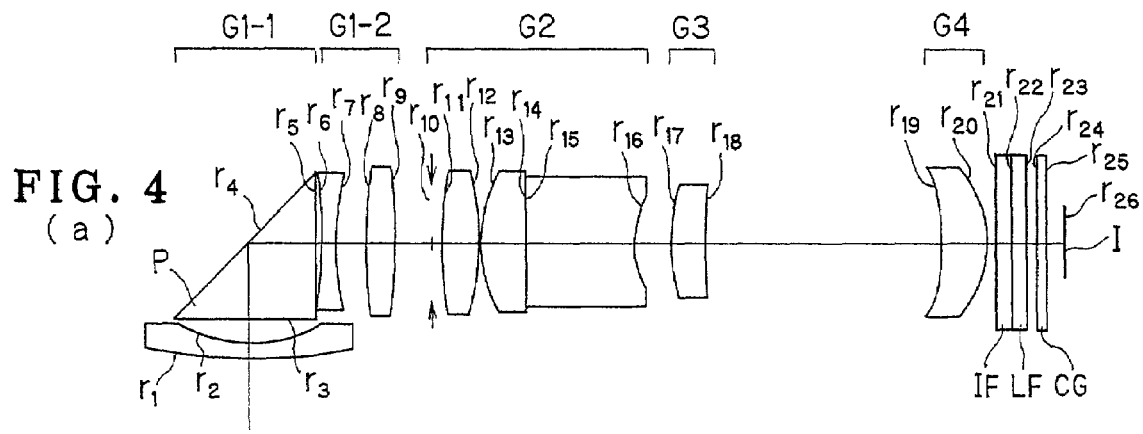
FIGS. 4(a) to 4(c) are sections in schematic illustrative of Example 4 of the optical path-bending zoom optical system, similar to FIGS. 1(a) to 1(c).
Figure 4:
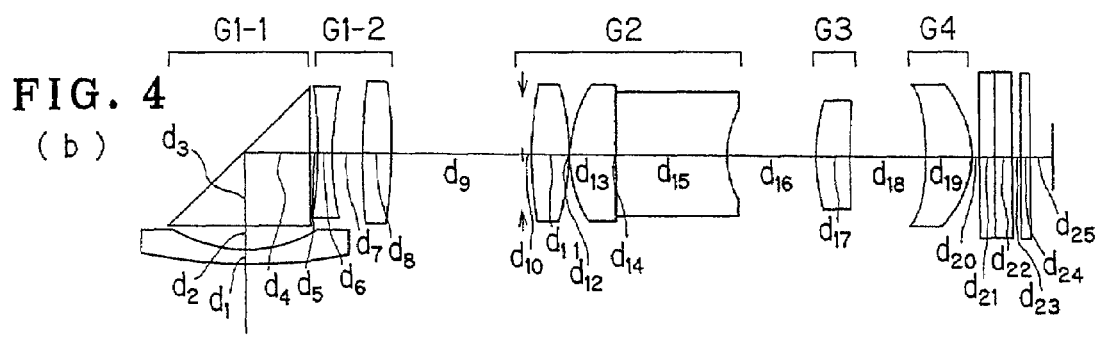
Figure 4:
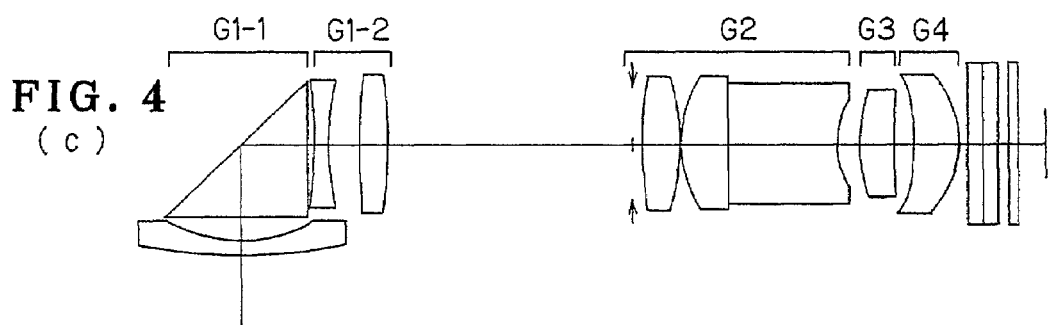

As shown in FIG. 4, Example 4 is directed to an optical path-bending zoom optical system made up of a 1-1st lens group G1-1 consisting of a negative meniscus lens convex on its object side and an optical path bending prism P equivalent to a plane-parallel plate, a 1-2nd lens group G1-2 consisting of a double-concave negative lens and a double-convex positive lens, a second lens group G2 consisting of an aperture stop, a double-convex positive lens, a double-convex positive lens and a negative meniscus lens convex on its object side, a third lens group G3 consisting of a positive meniscus lens convex on its object side, and a fourth lens group G4 consisting of a positive meniscus lens convex on its image side. For zooming from the wide-angle end to the telephoto end of the zoom optical system, the second lens group G2 and the third lens group G3 move toward the object side of the zoom optical system while the spacing between them becomes wide and then narrow.

Three aspheric surfaces are used, one at the object-side surface of the double-convex positive lens in the 1-2nd lens group G1-2, one at the object-side surface of the double-convex positive lens located after the stop in the second lens group G2, and one at the object-side surface of the positive meniscus lens in the second lens group G4.

Figure 5:
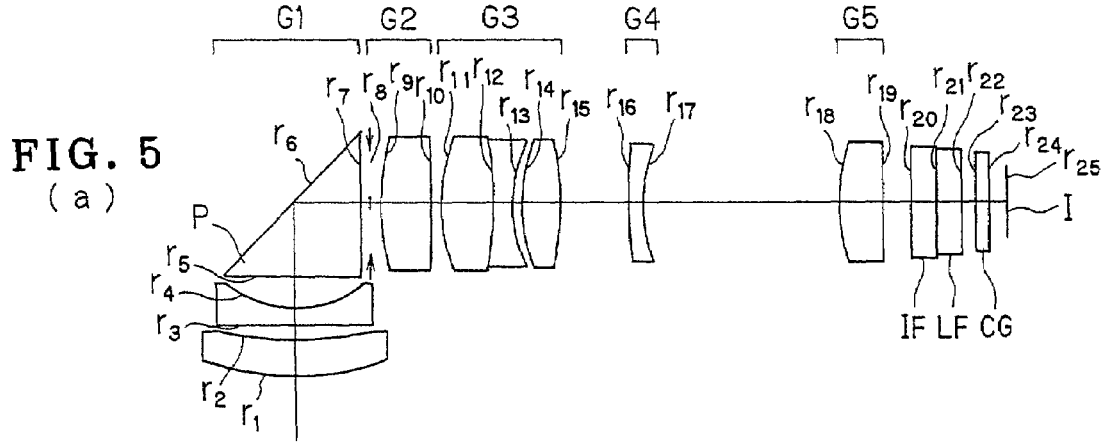
FIGS. 5(a) to 5(c) are sections in schematic illustrative of Example 5 of the optical path-bending zoom optical system, similar to FIGS. 1(a) to 1(c).
Figure 5:
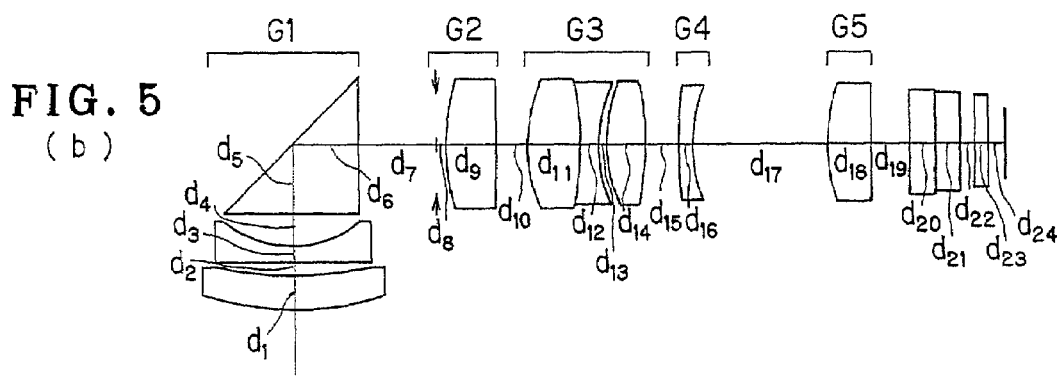
Figure 5:
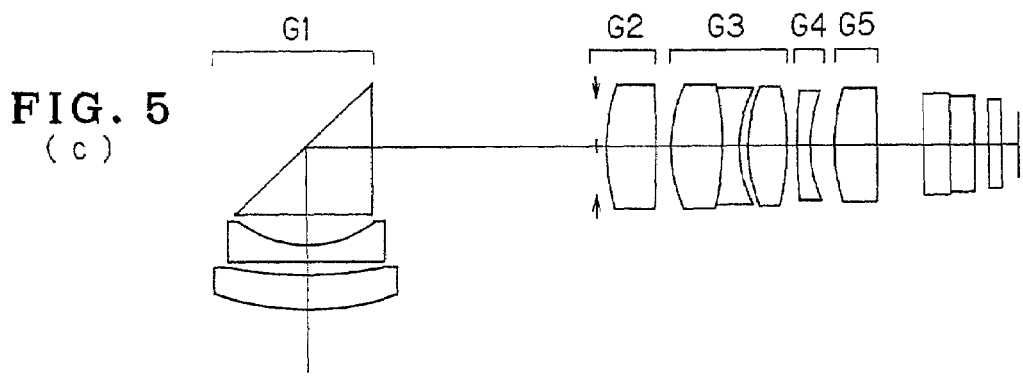

As shown in FIG. 5, Example 5 is directed to an optical path-bending zoom optical system made up of a first lens group G1 consisting of a positive meniscus lens convex on its object side, a negative meniscus lens convex on its object side and an optical path bending prism P equivalent to a plane-parallel plate, a second lens group G2 consisting of an aperture stop and a double-convex positive lens, a third lens group G3 consisting of a doublet consisting of a double-convex positive lens and a double-concave negative lens and a double-convex positive lens, a fourth lens group G4 consisting of a negative meniscus lens convex on its object side, and a fifth lens group G5 consisting of a positive meniscus lens convex on its object side. For zooming from the wide-angle end to the telephoto end of the zoom optical system, the second lens group G2 and the third lens group G3 move toward the object side of the zoom optical system while the spacing between them becomes wide and then narrow, the third lens group G3 and the fourth lens group G4 move toward the object side while the spacing between them becomes wide, and the fifth lens group moves slightly toward the image side of the zoom optical system.

Four aspheric surfaces are used, one at the image-side surface of the double-convex positive lens in the first lens group G1, one at the object side-surface of the double-convex positive lens in the second lens group G2, one at the image side-surface of the negative meniscus lens in the fourth lens group G4 and one at the image side-surface of the positive meniscus lens in the fifth lens group G5.

Figure 6:
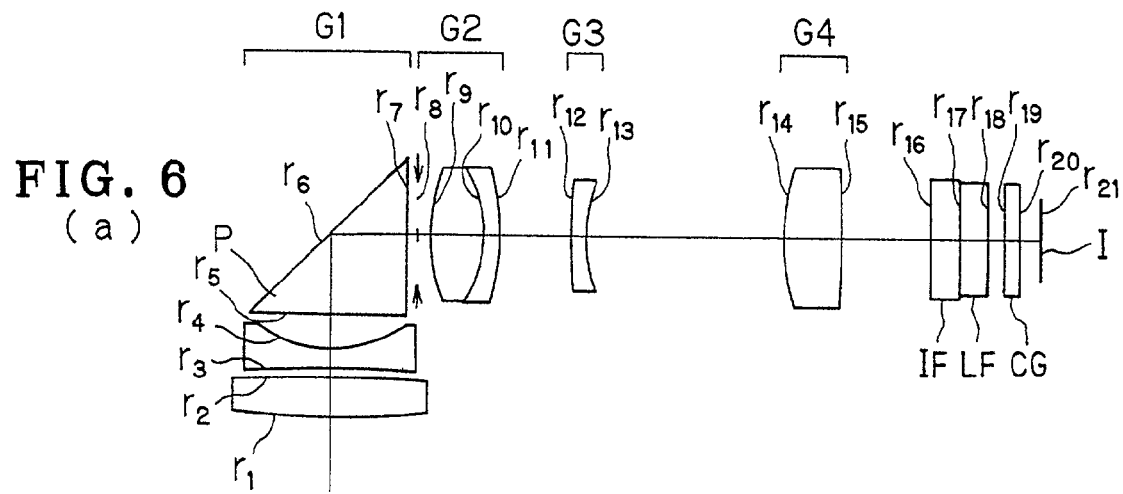
FIGS. 6(a) to 6(c) are sections in schematic illustrative of Example 6 of the optical path-bending zoom optical system, similar to FIGS. 1(a) to 1(c).
Figure 6:
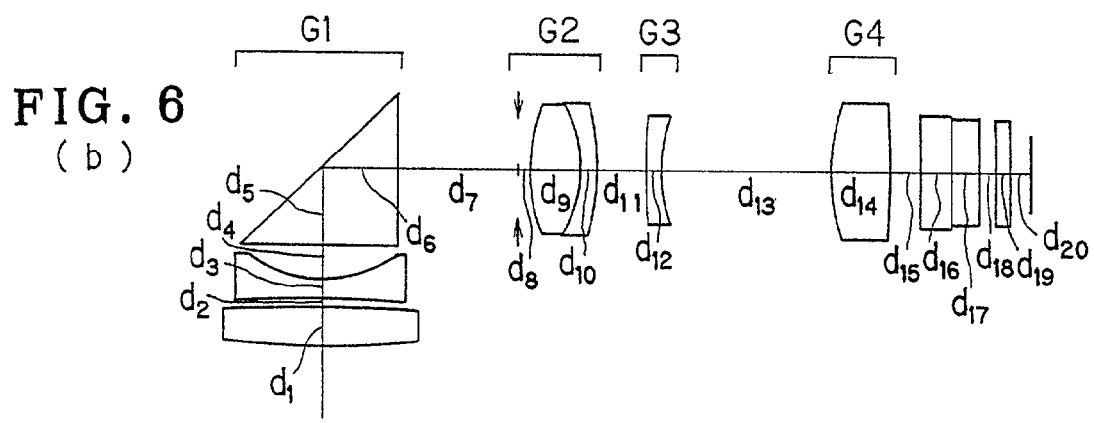
Figure 6:
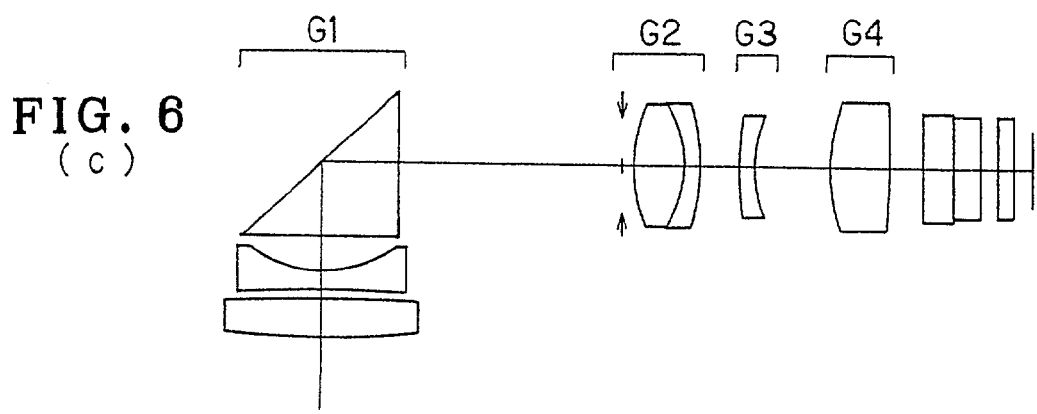

As shown in FIG. 6, Example 6 is directed to an optical path-bending zoom optical system made up of a first lens group G1 consisting of a double-convex positive lens, a double-concave negative lens and an optical path bending prism P equivalent to a plane-parallel plate, a second lens group G2 consisting of an aperture stop and a doublet consisting of a double-convex positive lens and a negative meniscus lens convex on its image side, a third lens group G3 consisting of a negative meniscus lens convex on its object side, and a fourth lens group G4 consisting of a double-convex positive lens. For zooming from the wide-angle end to the telephoto end of the zoom optical system, the second lens group G2 and the third lens group G3 move toward the object side of the zoom optical system while the spacing between them becomes wide, and the fourth lens group G4 moves slightly toward the object side on the telephoto side while it moves in a convex orbit toward the image side of the zoom lens optical system.

Three aspheric surfaces are used, one at the object side-surface of the double-concave negative lens in the first lens group G1, one at the surface of the second lens group G2 located nearest to its object side and one at the image side-surface of the negative meniscus lens in the third lens group G3.

Figure 7:
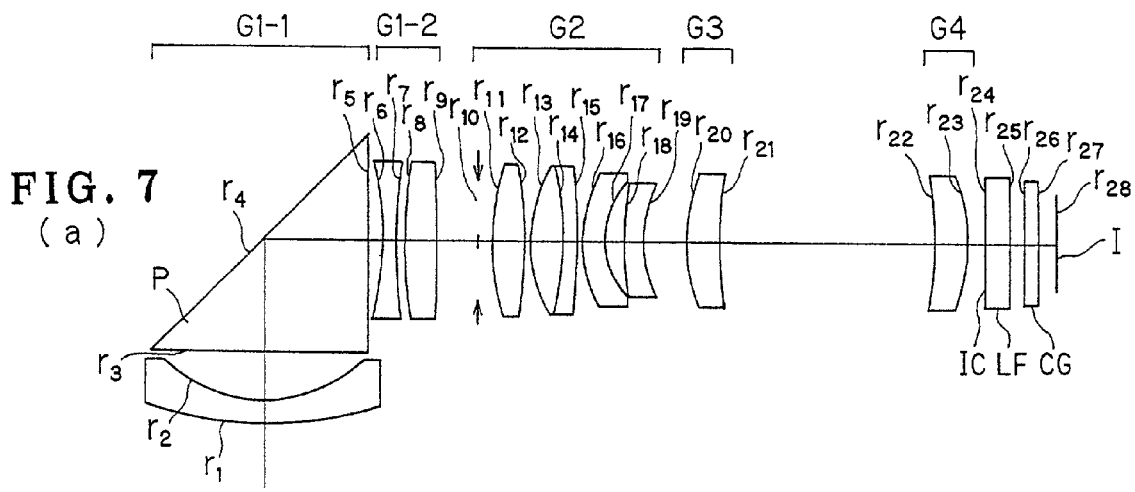
FIGS. 7(a) to 7(c) are sections in schematic illustrative of Example 7 of the optical path-bending zoom optical system, similar to FIGS. 1(a) to 1(c).
Figure 7:
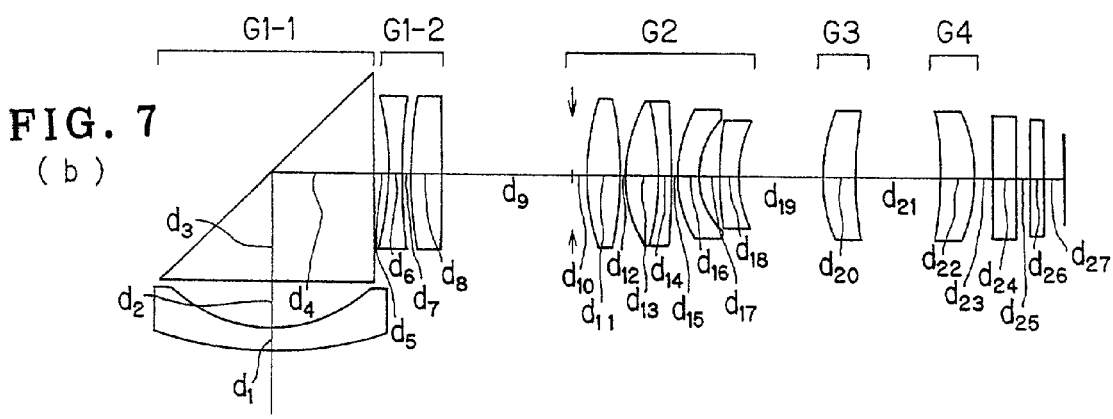
Figure 7:
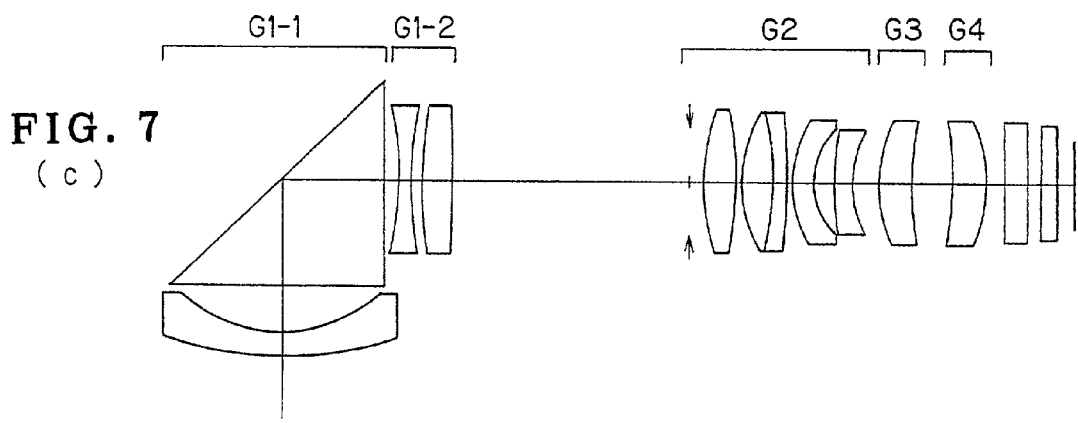

As shown in FIG. 7, Example 7 is directed to an optical path-bending zoom optical system made up of a 1-1st lens group G1-1 consisting of a negative meniscus lens convex on its object side and an optical path bending prism P equivalent to a plane-parallel plate, a 1-2nd lens group G1-2 consisting of a double-concave positive lens and a double-convex positive lens, a second lens group G2 consisting of an aperture stop, a double-convex positive lens, a doublet composed of a double-convex positive lens and a negative meniscus lens convex on its image side, a third lens group G3 consisting of a positive meniscus lens convex on its image side, and a fourth lens group G4 consisting of a positive meniscus lens convex on its image side. For zooming from the wide-angle end to the telephoto end of the zoom optical system, the second lens group G2 and the third lens group G3 move toward the object side of the zoom optical system while the spacing between them becomes wide and then narrow.

Three aspheric surfaces are used, one at the image side-surface of the negative meniscus lens in the 1-1st lens group G1-1, one at the surface of the second lens group G2 located nearest to the object side and one at the object side-surface of the positive meniscus lens in the fourth lens group G4.

Figure 8:
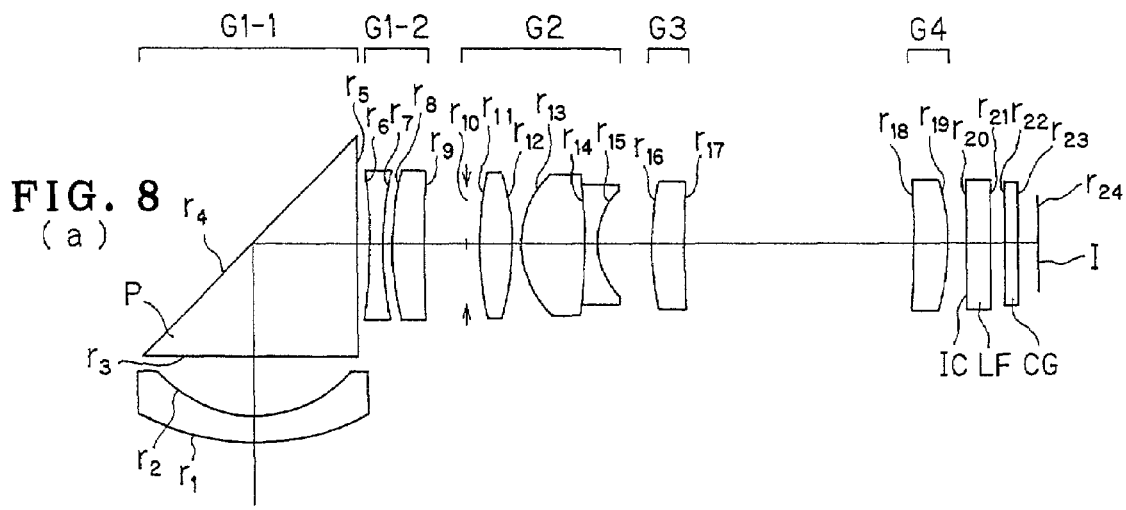
FIGS. 8(a) to 8(c) are sections in schematic illustrative of Example 8 of the optical path-bending zoom optical system, similar to FIGS. 1(a) to 1(c).
Figure 8:
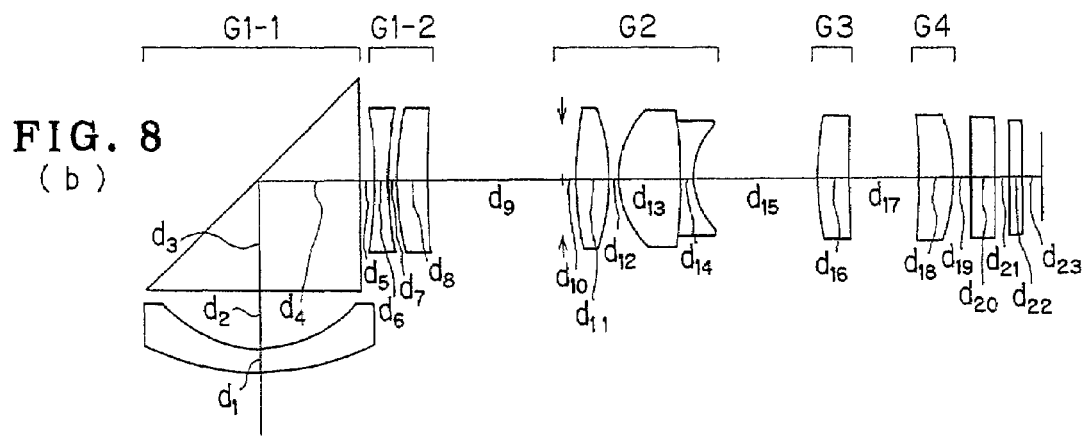
Figure 8:
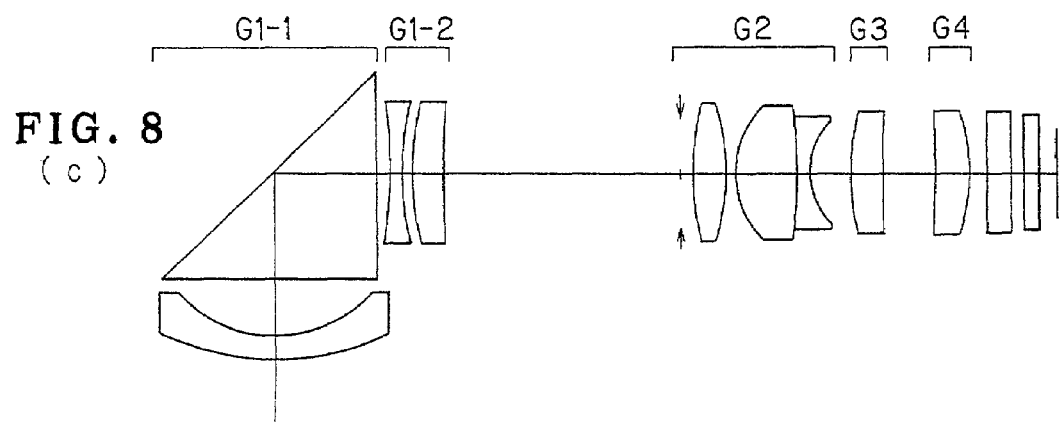

As shown in FIG. 8, Example 8 is directed to an optical path-bending zoom optical system made up of a 1-1st lens group G1-1 consisting of a negative meniscus lens convex on its object side and an optical path bending prism P equivalent to a plane-parallel plate, a 1-2nd lens group G1-2 consisting of a double-concave negative lens and a positive meniscus lens convex on its object side, a second lens group G2 consisting of an aperture stop, a double-convex positive lens and a doublet composed of a double-convex positive lens and a double-concave negative lens, a third lens group G3 consisting of a positive meniscus lens convex on its image side, and a fourth lens group G4 consisting of a positive meniscus lens convex on its image side. For zooming from the wide-angle end to the telephoto end of the zoom optical system, the second lens group G2 and the third lens group G3 move toward the object side of the zoom optical system while the spacing between them becomes wide and then narrow.

Three aspheric surfaces are used, one at the object side-surface of the negative meniscus lens in the 1-1st lens group G1-1, the surface of the second lens group G2 located nearest to its object side and one at the image side-surface of the positive meniscus lens in the fourth lens group G4.

Figure 9:
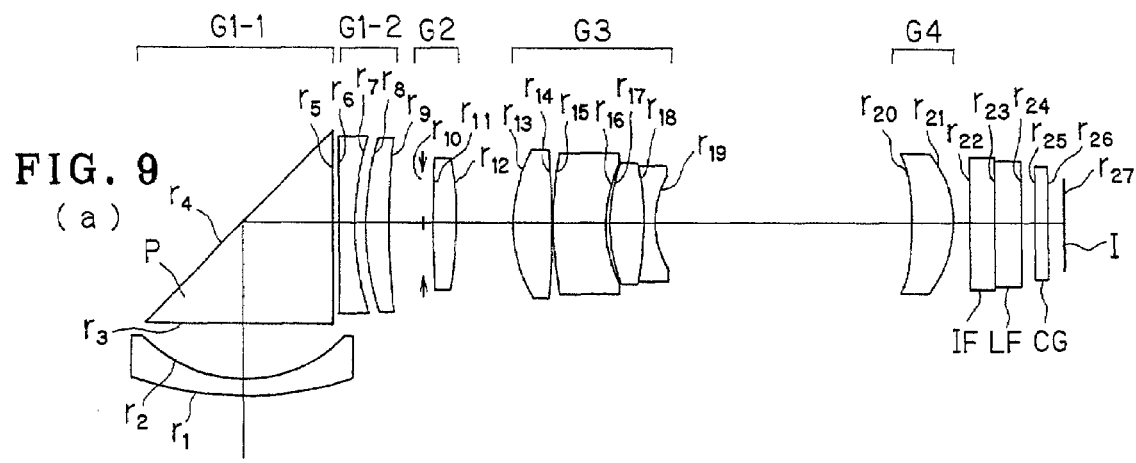
FIGS. 9(a) to 9(c) are sections in schematic illustrative of Example 9 of the optical path-bending zoom optical system, similar to FIGS. 1(a) to 1(c).
Figure 9:
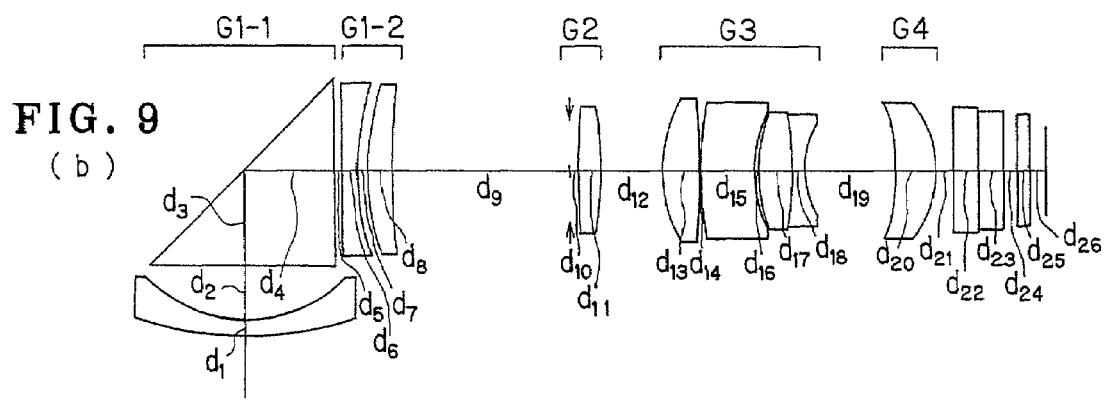
Figure 9:
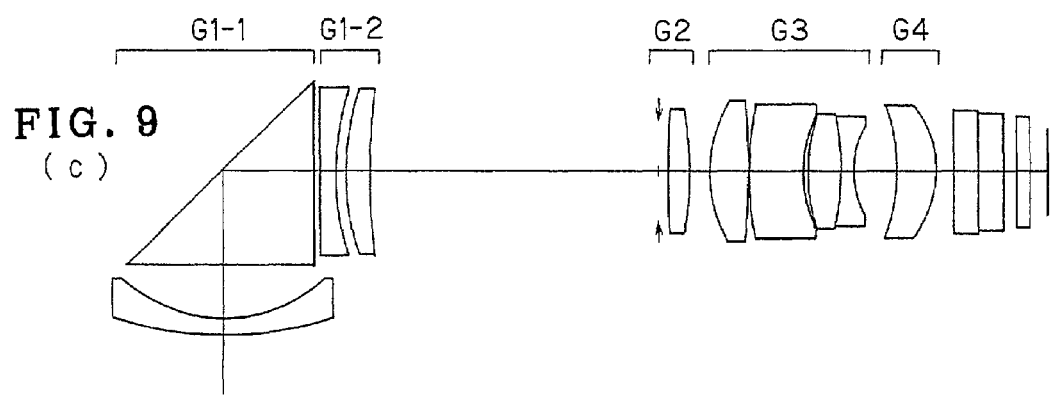

As shown in FIG. 9, Example 9 is directed to an optical path-bending zoom optical system made up of a 1-1st lens group G1-1 consisting of a negative meniscus lens convex on its object side and an optical path bending prism P equivalent to a plane-parallel plate, a 1-2nd lens group G1-2 consisting of a negative meniscus lens convex on its object side and a positive meniscus lens convex on its object side, a second lens group G2 consisting of an aperture stop and a double-convex positive lens, a third lens group G3 consisting of a double-convex positive lens, a negative meniscus lens convex on its object side and a doublet composed of a double-convex positive lens and a double-concave negative lens, and a fourth lens group G4 consisting of a positive meniscus lens convex on its image side. For zooming from the wide-angle end to the telephoto end of the zoom optical system, the second lens group G2 and the third lens group G3 move toward the object side while the spacing between them becomes wide and then narrow.

Three aspheric surfaces are used, one at the image side-surface of the negative meniscus lens in the 1-2nd lens group G1-2, one at the surface of the third lens group G3 located nearest to its object side and one at the object side-surface of the positive meniscus lens in the fourth lens group G4.

As shown in FIG. 10, Example 10 is directed to an optical path-bending zoom optical system made up of a 1-1st lens group G1-1 consisting of a negative meniscus lens convex on its object side and an optical path bending prism P equivalent to a plane-parallel plate, a 1-2nd lens group G1-2 consisting of a negative meniscus lens convex on its object side and a positive meniscus lens convex on its object side, a second lens group G2 consisting of an aperture stop and a doublet composed of a double-convex positive lens and a negative meniscus lens convex on its image plane side, a third lens group G3 consisting of a positive meniscus lens convex on its object side, a negative meniscus lens convex on its object side and a doublet composed of a double-convex positive lens and a double-concave negative lens, and a fourth lens group G4 consisting of a positive meniscus lens convex on its image plane side. For zooming from the wide-angle end to the telephoto end of the zoom optical system, the second lens group G2 and the third lens group G3 move toward the object side of the zoom lens system while the spacing between them becomes wide and then narrow.

Three aspheric surfaces are used, one at the image plane side-surface of the negative meniscus lens in the 1-2nd lens group G1-2, one at the surface of the third lens group G3 located nearest to its object side and one at the object side-surface of the positive meniscus lens in the fourth lens group G4.

As shown in FIG. 11, Example 11 is directed to an optical path-bending zoom optical system made up of a 1-1st lens group G1-1 consisting of a negative meniscus lens convex on its object side and an optical path bending prism P equivalent to a plane-parallel plate, a 1-2nd lens group consisting of a negative meniscus lens convex on its object side and a positive meniscus lens convex on its object side, a second lens group G2 consisting of an aperture stop and a doublet composed of a double-convex positive lens and a negative meniscus lens convex on its image plane side, a third lens group G3 consisting of a positive meniscus lens convex on its object side and a doublet composed of a planoconvex positive lens and a planoconcave negative lens, and a fourth lens group G4 consisting of a double-convex positive lens. For zooming from the wide-angle end to the telephoto end of the zoom optical system, the second lens group G2 and the third lens group G3 move toward the object side of the zoom optical system while the spacing between them becomes wide and then narrow.

Three aspheric surfaces are used, one at the image plane side-surface of the negative meniscus lens in the 1-2nd lens group G1-2, one at the object side-surface of the positive meniscus lens in the third lens group G3 and one at the image plane side-surface of the double-convex positive lens in the fourth lens group G4.

Figure 12:
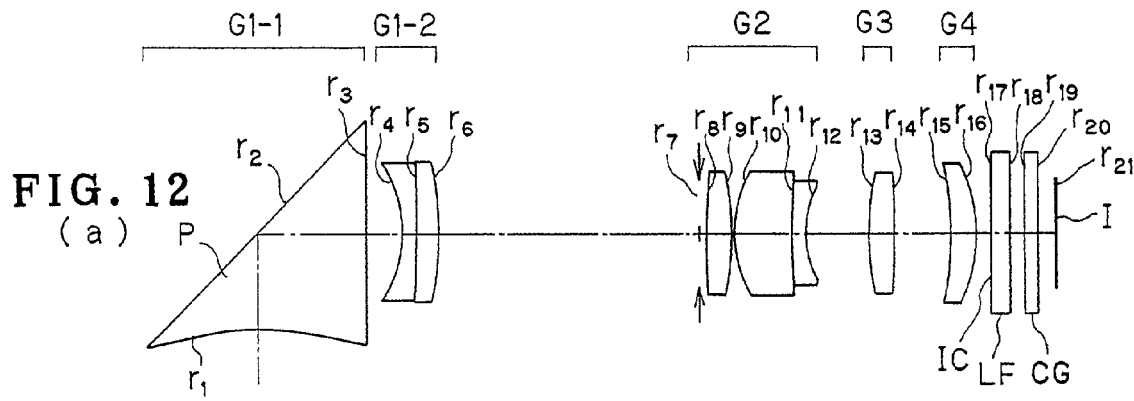
FIGS. 12(a) to 12(c) are sections in schematic illustrative of Example 12 of the optical path-bending zoom optical system, similar to FIGS. 1(a) to 1(c).
Figure 12:
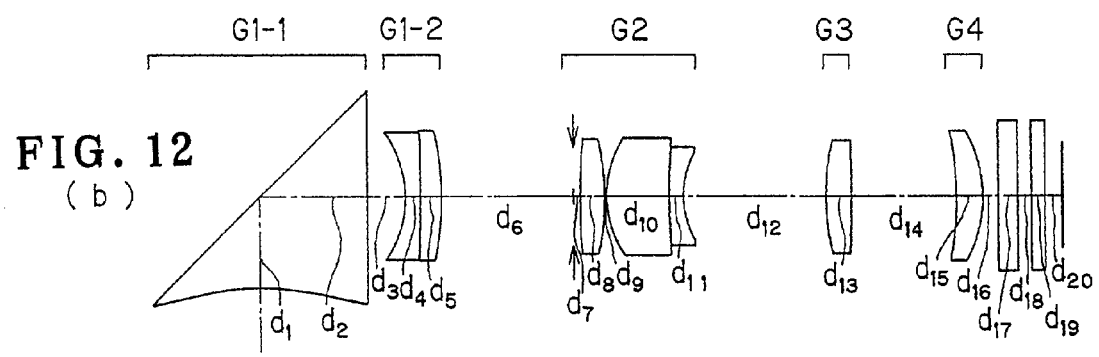
Figure 12:
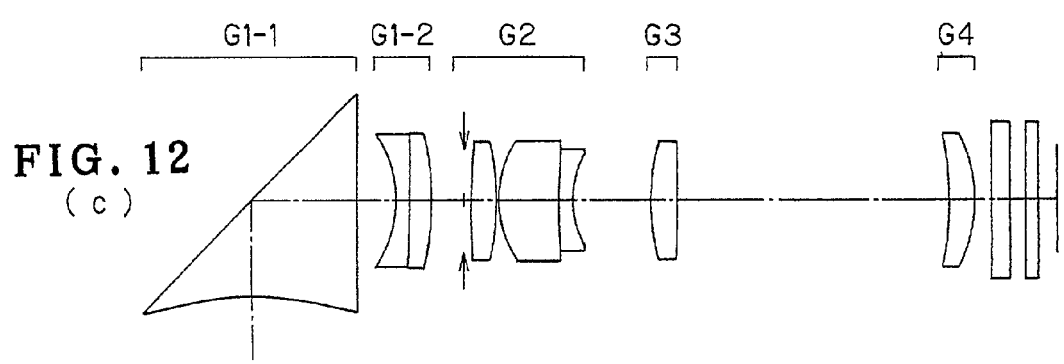

As shown in FIG. 12, Example 12 is directed to an optical path-bending zoom optical system made up of a 1-1st lens group G1-1 consisting of an optical path bending prism P equivalent to a planoconcave negative lens, a 1-2nd lens group G1-2 consisting of a doublet composed of a negative meniscus lens concave on its object side and a positive meniscus lens concave on its object side, a second lens group G2 consisting of a positive meniscus lens convex on its object side and a negative meniscus lens convex on its object side, a third lens group G3 consisting of a double-convex positive lens, and a fourth lens group G4 consisting of a positive meniscus lens convex on its image plane side. For zooming from the wide-angle end to the telephoto end of the zoom optical system, the second lens group G2 and the third lens group G3 move toward the object side of the zoom optical system while the spacing between them becomes wide and then narrow.

Three aspheric surfaces are used, one at the object side-surface of the optical path bending prism P in the 1-1st lens group G1-1, one at the surface of the second lens group G2 located nearest to its object side and one at the image plane side-surface of the positive meniscus lens in the fourth lens group G4.

Set out below are the numerical data on each example. Symbols used hereinafter but not hereinbefore have the following meanings:

f: focal length of the zoom optical system
2ω: field angle
$F_{NO}$: F-number
WE: wide-angle end
ST: standard or intermediate state
TE: telephoto end
$r_1, r_2, \ldots$: radius of curvature of each lens element
$d_1, d_2, \ldots$: spacing between the adjacent lens elements
$n_{d1}, n_{d2}, \ldots$: d-line refractive index of each lens element
$V_{d1}, V_{d2}, \ldots$: Abbe constant of each lens element Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4 y^4+A_6 y^6+A_8 y^8+A_{10}y^{10}$$

where r is a paraxial radius of curvature, K is a conical coefficient, and $A_4, A_6, A_8$ and $A_{10}$ are the fourth, sixth, eighth and tenth aspheric coefficients, respectively.

EXAMPLE 1

| | | | |
|---|---|---|---|
| $r_1 = -26.8147$ | $d_1 = 3.8000$ | $n_{d1} = 1.73400$ | $v_{d1} = 51.47$ |
| $r_2 = \infty$ (Mirror) | $d_2 = 3.2000$ | $n_{d2} = 1.73400$ | $v_{d2} = 51.47$ |
| $r_3 = 6.2254$ | $d_3 = 1.7202$ | | |
| $r_4 = 424.9864$ (Aspheric) | $d_4 = 2.4297$ | $n_{d3} = 1.84666$ | $v_{d3} = 23.78$ |
| $r_5 = -48.1247$ | $d_5 =$ (Variable) | | |
| $r_6 = \infty$ (Stop) | $d_6 = 0.5000$ | | |
| $r_7 = 17.8731$ (Aspheric) | $d_7 = 2.0000$ | $n_{d4} = 1.58913$ | $v_{d4} = 61.26$ |
| $r_8 = -16.6911$ | $d_8 =$ (Variable) | | |
| $r_9 = 7.9903$ | $d_9 = 6.2379$ | $n_{d5} = 1.48749$ | $v_{d5} = 70.23$ |
| $r_{10} = -14.7007$ | $d_{10} = 0.8488$ | $n_{d6} = 1.84666$ | $v_{d6} = 23.78$ |
| $r_{11} = 7.0178$ | $d_{11} = 1.1903$ | | |
| $r_{12} = 11.2307$ | $d_{12} = 1.6307$ | $n_{d7} = 1.84666$ | $v_{d7} = 23.78$ |

-continued

| | | | |
|---|---|---|---|
| $r_{13} = -24.5400$ | $d_{13}$ = (Variable) | | |
| $r_{14} = 18.1763$ | $d_{14} = 0.5000$ | $n_{d8} = 1.84666$ | $v_{d8} = 23.78$ |
| $r_{15} = 5.9110$ | $d_{15}$ = (Variable) | | |
| (Aspheric) | | | |
| $r_{16} = 14.1876$ | $d_{16} = 3.0000$ | $n_{d9} = 1.58913$ | $v_{d9} = 61.26$ |
| $r_{17} = -7.1178$ | $d_{17} = 0.5006$ | | |
| (Aspheric) | | | |
| $r_{18} = \infty$ | $d_{18} = 0.8000$ | $n_{d10} = 1.51633$ | $v_{d10} = 64.14$ |
| $r_{19} = \infty$ | $d_{19} = 1.8000$ | $n_{d11} = 1.54771$ | $v_{d11} = 62.84$ |
| $r_{20} = \infty$ | $d_{20} = 0.5000$ | | |
| $r_{21} = \infty$ | $d_{21} = 0.5000$ | $n_{d12} = 1.51633$ | $v_{d12} = 64.14$ |
| $r_{22} = \infty$ | $d_{22} = 1.1914$ | | |
| $r_{23} = \infty$ | | | |
| (Image Plane) | | | |

Aspherical Coefficients

4th surface

K = 0.0195
$A_4 = -5.4111 \times 10^{-4}$
$A_6 = 2.1984 \times 10^{-6}$
$A_8 = 4.5957 \times 10^{-7}$
$A_{10} = -1.0754 \times 10^{-8}$ 7th surface K = 5.8821
$A_4 = -2.7575 \times 10^{-4}$
$A_6 = 5.8194 \times 10^{-6}$
$A_8 = -7.9649 \times 10^{-7}$
$A_{10} = 3.4848 \times 10^{-8}$ 15th surface K = -3.6043
$A_4 = 2.6150 \times 10^{-3}$
$A_6 = -8.5623 \times 10^{-6}$
$A_8 = -2.8972 \times 10^{-6}$
$A_{10} = 1.5174 \times 10^{-7}$ 17th surface K = 0.8882
$A_4 = 1.1140 \times 10^{-3}$
$A_6 = -8.5962 \times 10^{-6}$
$A_8 = 3.9677 \times 10^{-7}$
$A_{10} = 3.1086 \times 10^{-8}$ Zooming Data (∞)

| | WE | ST | TE |
|---|---|---|---|
| f (mm) | 4.59000 | 8.95000 | 13.23000 |
| $F_{NO}$ | 2.8316 | 3.8724 | 4.6438 |
| 2 ω (°) | 65.5 | 34.0 | 23.0 |
| $d_5$ | 12.93741 | 5.34873 | 2.00000 |
| $d_8$ | 2.61607 | 2.85689 | 0.50000 |
| d13 | 1.09671 | 5.22639 | 10.38165 |
| d15 | 1.00016 | 4.21405 | 4.71724 |

EXAMPLE 2

| | | | |
|---|---|---|---|
| $r_1 = -129.7294$ | $d_1 = 4.5500$ | $n_{d1} = 1.80400$ | $v_{d1} = 46.57$ |
| $r_2 = \infty$ (Mirror) | $d_2 = 4.0019$ | $n_{d2} = 1.80400$ | $v_{d2} = 46.57$ |
| $r_3 = 5.3898$ | $d_3 = 1.6465$ | | |
| $r_4 = 30.0332$ | $d_4 = 1.4609$ | $n_{d3} = 1.84666$ | $v_{d3} = 23.78$ |
| (Aspheric) | | | |
| $r_5 = -35.8611$ | $d_5$ = (Variable) | | |
| $r_6 = \infty$ (Stop) | $d_6$ = (Variable) | | |
| $r_7 = 9.6063$ | $d_7 = 2.7296$ | $n_{d4} = 1.48749$ | $v_{d4} = 70.23$ |
| (Aspheric) | | | |
| $r_8 = -30.8421$ | $d_8 = 0.1469$ | | |
| $r_9 = 10.1172$ | $d_9 = 2.1277$ | $n_{d5} = 1.69680$ | $v_{d5} = 55.53$ |
| $r_{10} = 97.1974$ | $d_{10} = 0.0500$ | | |
| $r_{11} = 12.1982$ | $d_{11} = 0.7949$ | $n_{d6} = 1.84666$ | $v_{d6} = 23.78$ |
| $r_{12} = 5.7271$ | $d_{12}$ = (Variable) | | |
| $r_{13} = 14.2960$ | $d_{13} = 4.0342$ | $n_{d7} = 1.48749$ | $v_{d7} = 70.23$ |
| $r_{14} = -15.7323$ | $d_{14} = 0.1401$ | | |
| $r_{15} = -18.5671$ | $d_{15} = 1.1241$ | $n_{d8} = 1.84666$ | $v_{d8} = 23.78$ |
| $r_{16} = -29.8834$ | $d_{16}$ = (Variable) | | |
| $r_{17} = 46.3841$ | $d_{17} = 1.1752$ | $n_{d9} = 1.58913$ | $v_{d9} = 61.26$ |
| (Aspheric) | | | |
| $r_{18} = 541.6142$ | $d_{18} = 0.4453$ | | |
| $r_{19} = \infty$ | $d_{19} = 0.8000$ | $n_{d10} = 1.51633$ | $v_{d10} = 64.14$ |
| $r_{20} = \infty$ | $d_{20} = 1.8000$ | $n_{d11} = 1.54771$ | $v_{d11} = 62.84$ |
| $r_{21} = \infty$ | $d_{21} = 0.5000$ | | |
| $r_{22} = \infty$ | $d_{22} = 0.5000$ | $n_{d12} = 1.51633$ | $v_{d12} = 64.14$ |
| $r_{23} = \infty$ | $d_{23} = 1.2588$ | | |
| $r_{24} = \infty$ | | | |
| (Image Plane) | | | |

Aspherical Coefficients

4th surface

K = 42.6072
$A_4 = 4.5281 \times 10^{-4}$
$A_6 = -1.2752 \times 10^{-8}$
$A_8 = 2.9327 \times 10^{-7}$
$A_{10} = 0$ 7th surface K = 0
$A_4 = -2.9136 \times 10^{-4}$
$A_6 = -7.7511 \times 10^{-7}$
$A_8 = 2.4221 \times 10^{-8}$
$A_{10} = 0$ 17th surface K = 0
$A_4 = -8.0585 \times 10^{-4}$
$A_6 = 1.7583 \times 10^{-5}$
$A_8 = -1.1309 \times 10^{-6}$
$A_{10} = 0$ Zooming Data (∞)

| | WE | ST | TE |
|---|---|---|---|
| f (mm) | 4.71141 | 7.84455 | 13.21508 |
| $F_{NO}$ | 2.8000 | 3.6612 | 5.0650 |
| 2 ω (°) | 67.8 | 41.2 | 24.8 |
| $d_5$ | 10.20144 | 4.70557 | 1.12127 |
| $d_6$ | 7.09024 | 5.59391 | 1.24849 |
| $d_{12}$ | 3.08267 | 9.70509 | 10.04403 |
| $d_{16}$ | 0.98577 | 1.28696 | 8.72623 |

EXAMPLE 3

| | | | |
|---|---|---|---|
| $r_1 = 22.0799$ | $d_1 = 0.7823$ | $n_{d1} = 1.80400$ | $v_{d1} = 46.57$ |
| $r_2 = 7.0105$ | $d_2 = 1.1905$ | | |
| $r_3 = \infty$ | $d_3 = 3.8000$ | $n_{d2} = 1.80400$ | $v_{d2} = 46.57$ |
| $r_4 = \infty$ (Mirror) | $d_4 = 3.4483$ | $n_{d3} = 1.80400$ | $v_{d3} = 46.57$ |
| $r_5 = \infty$ | $d_5 = 0.4000$ | | |
| $r_6 = -43.4610$ | $d_6 = 0.7742$ | $n_{d4} = 1.77250$ | $v_{d4} = 49.60$ |
| $r_7 = 9.6384$ | $d_7 = 0.6369$ | | |
| $r_8 = 19.1908$ | $d_8 = 1.6810$ | $n_{d5} = 1.84666$ | $v_{d5} = 23.78$ |
| (Aspheric) | | | |
| $r_9 = -40.1274$ | $d_9$ = (Variable) | | |
| $r_{10} = \infty$ (Stop) | $d_{10} = 0.5000$ | | |
| $r_{11} = 85.1662$ | $d_{11} = 1.5117$ | $n_{d6} = 1.58913$ | $v_{d6} = 61.26$ |
| $r_{12} = -18.3807$ | $d_{12}$ = (Variable) | | |
| $r_{13} = 5.5347$ | $d_{13} = 2.9473$ | $n_{d7} = 1.48749$ | $v_{d7} = 70.23$ |
| (Aspheric) | | | |
| $r_{14} = -102.8346$ | $d_{14} = 0.1500$ | | |
| $r_{15} = 68.5128$ | $d_{15} = 3.4582$ | $n_{d8} = 1.84666$ | $v_{d8} = 23.78$ |
| $r_{16} = 5.6774$ | $d_{16} = 2.1376$ | | |
| $r_{17} = 7.8453$ | $d_{17} = 2.3148$ | $n_{d9} = 1.60542$ | $v_{d9} = 45.99$ |

-continued

| | | | |
|---|---|---|---|
| $r_{18} = -12.6010$ | $d_{18} = 0.5441$ | | |
| $r_{19} = -6.0465$ | $d_{19} = 0.7255$ | $n_{d10} = 1.61800$ | $v_{d10} = 63.33$ |
| $r_{20} = -17.9513$ | $d_{20}$ = (Variable) | | |
| $r_{21} = -17.2238$ (Aspheric) | $d_{21} = 1.4117$ | $n_{d11} = 1.58913$ | $v_{d11} = 61.26$ |
| $r_{22} = -9.8048$ | $d_{22} = 0.5599$ | | |
| $r_{23} = \infty$ | $d_{23} = 0.8000$ | $n_{d12} = 1.51633$ | $v_{d12} = 64.14$ |
| $r_{24} = \infty$ | $d_{24} = 1.8000$ | $n_{d13} = 1.54771$ | $v_{d13} = 62.84$ |
| $r_{25} = \infty$ | $d_{25} = 0.5000$ | | |
| $r_{26} = \infty$ | $d_{26} = 0.5000$ | $n_{d14} = 1.51633$ | $v_{d14} = 64.14$ |
| $r_{27} = \infty$ | $d_{27} = 1.3641$ | | |
| $r_{28} = \infty$ (Image Plane) | | | |

Aspherical Coefficients

8th surface $K = 1.5876$
$A_4 = 2.6616 \times 10^{-4}$
$A_6 = 3.3939 \times 10^{-6}$
$A_8 = -1.0023 \times 10^{-7}$
$A_{10} = 0$ 13th surface $K = 0$
$A_4 = -2.7230 \times 10^{-4}$
$A_6 = -5.7432 \times 10^{-6}$
$A_8 = -3.4301 \times 10^{-7}$
$A_{10} = 0$ 21th surface $K = 0$
$A_4 = -8.9975 \times 10^{-4}$
$A_6 = -1.8358 \times 10^{-5}$
$A_8 = 1.4143 \times 10^{-6}$
$A_{10} = 0$ Zooming Data ($\infty$)

| | WE | ST | TE |
|---|---|---|---|
| f (mm) | 4.60758 | 7.85021 | 13.40785 |
| $F_{NO}$ | 2.8000 | 3.4489 | 4.6187 |
| $2\omega$ (°) | 65.3 | 39.0 | 22.9 |
| $d_9$ | 14.75212 | 6.67783 | 2.00000 |
| $d_{12}$ | 0.67500 | 4.26744 | 1.54139 |
| $d_{20}$ | 1.35767 | 6.03580 | 13.51290 |

EXAMPLE 4

| | | | |
|---|---|---|---|
| $r_1 = 29.0184$ | $d_1 = 0.7437$ | $n_{d1} = 1.80400$ | $v_{d1} = 46.57$ |
| $r_2 = 7.3275$ | $d_2 = 1.3049$ | | |
| $r_3 = \infty$ | $d_3 = 4.0000$ | $n_{d2} = 1.80400$ | $v_{d2} = 46.57$ |
| $r_4 = \infty$ (Mirror) | $d_4 = 3.5133$ | $n_{d3} = 1.80400$ | $v_{d3} = 46.57$ |
| $r_5 = \infty$ | $d_5 = 0.3000$ | | |
| $r_6 = -31.2038$ | $d_6 = 0.7673$ | $n_{d4} = 1.80400$ | $v_{d4} = 46.57$ |
| $r_7 = 15.2085$ | $d_7 = 1.5760$ | | |
| $r_8 = 33.1818$ (Aspheric) | $d_8 = 1.5628$ | $n_{d5} = 1.84666$ | $v_{d5} = 23.78$ |
| $r_9 = -29.4113$ | $d_9$ = (Variable) | | |
| $r_{10} = \infty$ (Stop) | $d_{10} = 0.5000$ | | |
| $r_{11} = 20.3172$ (Aspheric) | $d_{11} = 1.9876$ | $n_{d6} = 1.58913$ | $v_{d6} = 61.26$ |
| $r_{12} = -14.3558$ | $d_{12} = 0.1387$ | | |
| $r_{13} = 7.0863$ | $d_{13} = 2.5021$ | $n_{d7} = 1.48749$ | $v_{d7} = 70.23$ |
| $r_{14} = -521.1337$ | $d_{14} = 0.0001$ | | |
| $r_{15} = 217.6721$ | $d_{15} = 5.9501$ | $n_{d8} = 1.84666$ | $v_{d8} = 23.78$ |
| $r_{16} = 4.5340$ | $d_{16}$ = (Variable) | | |
| $r_{17} = 10.1062$ | $d_{17} = 1.8686$ | $n_{d9} = 1.60300$ | $v_{d9} = 65.44$ |
| $r_{18} = 46.5940$ | $d_{18}$ = (Variable) | | |
| $r_{19} = -22.5387$ (Aspheric) | $d_{19} = 2.3721$ | $n_{d10} = 1.58913$ | $v_{d10} = 61.26$ |

-continued

| | | | |
|---|---|---|---|
| $r_{20} = -5.8538$ | $d_{20} = 0.4297$ | | |
| $r_{21} = \infty$ | $d_{21} = 0.8000$ | $n_{d11} = 1.51633$ | $v_{d11} = 64.14$ |
| $r_{22} = \infty$ | $d_{22} = 0.8000$ | $n_{d12} = 1.54771$ | $v_{d12} = 62.84$ |
| $r_{23} = \infty$ | $d_{23} = 0.5000$ | | |
| $r_{24} = \infty$ | $d_{24} = 0.5000$ | $n_{d13} = 1.51633$ | $v_{d13} = 64.14$ |
| $r_{25} = \infty$ | $d_{25} = 1.3824$ | | |
| $r_{27} = \infty$ (Image Plane) | | | |

Aspherical Coefficients

8th surface $K = 1.9221$
$A_4 = 1.0674 \times 10^{-4}$
$A_6 = 7.5509 \times 10^{-7}$
$A_8 = -6.9692 \times 10^{-8}$
$A_{10} = 0$ 11th surface $K = 0$
$A_4 = -1.4582 \times 10^{-4}$
$A_6 = 4.2034 \times 10^{-8}$
$A_8 = 1.1204 \times 10^{-8}$
$A_{10} = 0$ 19th surface $K = 0$
$A_4 = -1.8514 \times 10^{-3}$
$A_6 = 6.5803 \times 10^{-6}$
$A_8 = -9.0686 \times 10^{-7}$
$A_{10} = 0$ Zooming Data ($\infty$)

| | WE | ST | TE |
|---|---|---|---|
| f (mm) | 4.65117 | 7.85007 | 13.29161 |
| $F_{NO}$ | 2.5000 | 3.4944 | 4.8337 |
| $2\omega$ (°) | 68.4 | 41.7 | 24.7 |
| $d_9$ | 13.35295 | 7.17214 | 2.00000 |
| $d_{16}$ | 1.22323 | 4.89168 | 2.01917 |
| $d_{18}$ | 0.94992 | 3.89804 | 12.56077 |

EXAMPLE 5

| | | | |
|---|---|---|---|
| $r_1 = 15.9959$ | $d_1 = 2.0000$ | $n_{d1} = 1.84666$ | $v_{d1} = 23.78$ |
| $r_2 = 17.9366$ (Aspheric) | $d_2 = 0.8000$ | | |
| $r_3 = 122.3665$ | $d_3 = 1.0000$ | $n_{d2} = 1.72916$ | $v_{d2} = 54.68$ |
| $r_4 = 6.1500$ | $d_4 = 1.9000$ | | |
| $r_5 = \infty$ | $d_5 = 4.1000$ | $n_{d3} = 1.56883$ | $v_{d3} = 56.36$ |
| $r_6 = \infty$ (Mirror) | $d_6 = 3.9000$ | $n_{d4} = 1.56883$ | $v_{d4} = 56.36$ |
| $r_7 = \infty$ | $d_7$ = (Variable) | | |
| $r_8 = \infty$ (Stop) | $d_8 = 0.5928$ | | |
| $r_9 = 14.1418$ (Aspheric) | $d_9 = 3.0000$ | $n_{d5} = 1.80610$ | $v_{d5} = 40.92$ |
| $r_{10} = -138.1914$ | $d_{10}$ = (Variable) | | |
| $r_{11} = 9.2691$ | $d_{11} = 3.2000$ | $n_{d6} = 1.48749$ | $v_{d6} = 70.23$ |
| $r_{12} = -18.4588$ | $d_{12} = 1.0064$ | $n_{d7} = 1.84666$ | $v_{d7} = 23.78$ |
| $r_{13} = 7.4386$ | $d_{13} = 0.5000$ | | |
| $r_{14} = 9.1725$ | $d_{14} = 2.4000$ | $n_{d8} = 1.80518$ | $v_{d8} = 25.42$ |
| $r_{15} = -16.4170$ | $d_{15}$ = (Variable) | | |
| $r_{16} = 44.6119$ | $d_{16} = 0.8000$ | $n_{d9} = 1.84666$ | $v_{d9} = 23.78$ |
| $r_{17} = 8.9511$ (Aspheric) | $d_{17}$ = (Variable) | | |
| $r_{18} = 11.2550$ | $d_{18} = 2.6000$ | $n_{d10} = 1.58913$ | $v_{d10} = 61.26$ |
| $r_{19} = 673.2282$ (Aspheric) | $d_{19}$ = (Variable) | | |
| $r_{20} = \infty$ | $d_{20} = 1.5000$ | $n_{d11} = 1.51633$ | $v_{d11} = 64.14$ |
| $r_{21} = \infty$ | $d_{21} = 1.4400$ | $n_{d12} = 1.54771$ | $v_{d12} = 62.84$ |
| $r_{22} = \infty$ | $d_{22} = 0.8000$ | | |
| $r_{23} = \infty$ | $d_{23} = 0.8000$ | $n_{d13} = 1.51633$ | $v_{d13} = 64.14$ |

-continued

| | | |
|---|---|---|
| $r_{24} = \infty$ | $d_{24} = 1.0000$ | |
| $r_{25} = \infty$ (Image Plane) | | |

Aspherical Coefficients

2nd surface $K = 0$
$A_4 = -2.1855 \times 10^{-4}$
$A_6 = 3.4923 \times 10^{-7}$
$A_8 = 0$
$A_{10} = 0$

9th surface $K = 5.1530$
$A_4 = -2.4340 \times 10^{-4}$
$A_6 = -7.4872 \times 10^{-6}$
$A_8 = 2.0515 \times 10^{-7}$
$A_{10} = -1.0188 \times 10^{-8}$

17th surface $K = -3.7152$
$A_4 = 1.2209 \times 10^{-3}$
$A_6 = -1.7576 \times 10^{-5}$
$A_8 = 2.5810 \times 10^{-6}$
$A_{10} = -1.2193 \times 10^{-7}$

19th surface $K = 1.4583$
$A_4 = -1.5578 \times 10^{-4}$
$A_6 = -1.1072 \times 10^{-4}$
$A_8 = 5.6481 \times 10^{-7}$
$A_{10} = -8.6742 \times 10^{-9}$

Zooming Data ($\infty$)

| | WE | ST | TE |
|---|---|---|---|
| f (mm) | 5.43000 | 10.61200 | 15.80000 |
| $F_{NO}$ | 2.7116 | 3.7726 | 4.5293 |
| $2\omega$ (°) | 63.5 | 35.7 | 24.5 |
| $d_7$ | 13.12435 | 4.47821 | 0.50000 |
| $d_{10}$ | 0.81880 | 1.71785 | 0.50000 |
| $d_{15}$ | 0.60000 | 2.00387 | 4.09707 |
| $d_{17}$ | 1.40000 | 8.20925 | 11.93740 |
| $d_{19}$ | 2.71758 | 2.25155 | 1.62627 |

EXAMPLE 6

| | | | |
|---|---|---|---|
| $r_1 = 49.3427$ | $d_1 = 2.0000$ | $n_{d1} = 1.84666$ | $\nu_{d1} = 23.78$ |
| $r_2 = -115.4656$ | $d_2 = 0.4000$ | | |
| $r_3 = -52.5304$ (Aspheric) | $d_3 = 1.0000$ | $n_{d2} = 1.69350$ | $\nu_{d2} = 53.21$ |
| $r_4 = 5.8428$ | $d_4 = 1.8000$ | | |
| $r_5 = \infty$ | $d_5 = 4.0000$ | $n_{d3} = 1.56883$ | $\nu_{d3} = 56.36$ |
| $r_6 = \infty$ (Mirror) | $d_6 = 3.8000$ | $n_{d4} = 1.56883$ | $\nu_{d4} = 56.36$ |
| $r_7 = \infty$ | $d_7$ = (Variable) | | |
| $r_8 = \infty$ (Stop) | $d_8 = 0.6000$ | | |
| $r_9 = 8.0295$ (Aspheric) | $d_9 = 2.8000$ | $n_{d5} = 1.69350$ | $\nu_{d5} = 53.21$ |
| $r_{10} = -5.9145$ | $d_{10} = 0.8000$ | $n_{d6} = 1.80440$ | $\nu_{d6} = 39.59$ |
| $r_{11} = -12.3640$ | $d_{11}$ = (Variable) | | |
| $r_{12} = 26.8805$ | $d_{12} = 0.8000$ | $n_{d7} = 1.84666$ | $\nu_{d7} = 23.78$ |
| $r_{13} = 7.1849$ (Aspheric) | $d_{13}$ = (Variable) | | |
| $r_{14} = 10.7803$ | $d_{14} = 3.1000$ | $n_{d8} = 1.48749$ | $\nu_{d8} = 70.23$ |
| $r_{15} = -52.9481$ | $d_{15}$ = (Variable) | | |
| $r_{16} = \infty$ | $d_{16} = 1.5000$ | $n_{d9} = 1.51633$ | $\nu_{d9} = 64.14$ |
| $r_{17} = \infty$ | $d_{17} = 1.4400$ | $n_{d10} = 1.54771$ | $\nu_{d10} = 62.84$ |
| $r_{18} = \infty$ | $d_{18} = 0.8000$ | | |
| $r_{19} = \infty$ | $d_{19} = 0.8000$ | $n_{d11} = 1.51633$ | $\nu_{d11} = 64.14$ |

-continued

| | | |
|---|---|---|
| $r_{20} = \infty$ | $d_{20} = 1.0000$ | |
| $r_{21} = \infty$ (Image Plane) | | |

Aspherical Coefficients

3rd surface $K = 0$
$A_4 = 2.6048 \times 10^{-4}$
$A_6 = -3.2365 \times 10^{-6}$
$A_8 = 2.2913 \times 10^{-8}$
$A_{10} = 0$

9th surface $K = 0$
$A_4 = -3.0615 \times 10^{-4}$
$A_6 = -2.0330 \times 10^{-6}$
$A_8 = -1.0403 \times 10^{-7}$
$A_{10} = 0$

13th surface $K = -3.5241$
$A_4 = 1.8328 \times 10^{-3}$
$A_6 = -1.6164 \times 10^{-5}$
$A_8 = 3.5495 \times 10^{-6}$
$A_{10} = -1.2410 \times 10^{-7}$

Zooming Data ($\infty$)

| | WE | ST | TE |
|---|---|---|---|
| f (mm) | 5.38001 | 8.50001 | 13.45001 |
| $F_{NO}$ | 3.0358 | 3.8702 | 4.5606 |
| $2\omega$ (°) | 65.8 | 43.8 | 28.4 |
| $d_7$ | 11.53527 | 6.15290 | 0.50000 |
| $d_{11}$ | 2.10162 | 2.49863 | 3.68430 |
| $d_{13}$ | 3.96820 | 9.09478 | 10.56416 |
| $d_{15}$ | 1.75491 | 1.61369 | 4.61155 |

EXAMPLE 7

| | | | |
|---|---|---|---|
| $r_1 = 21.0760$ | $d_1 = 1.4000$ | $n_{d1} = 1.74320$ | $\nu_{d1} = 49.34$ |
| $r_2 = 7.9352$ (Aspheric) | $d_2 = 2.8000$ | | |
| $r_3 = \infty$ | $d_3 = 6.5000$ | $n_{d2} = 1.56883$ | $\nu_{d2} = 56.36$ |
| $r_4 = \infty$ (Mirror) | $d_4 = 6.0000$ | $n_{d3} = 1.56883$ | $\nu_{d3} = 56.36$ |
| $r_5 = \infty$ | $d_5 = 0.8000$ | | |
| $r_6 = -18.8610$ | $d_6 = 0.8000$ | $n_{d4} = 1.72916$ | $\nu_{d4} = 54.68$ |
| $r_7 = 29.7460$ | $d_7 = 0.5273$ | | |
| $r_8 = 25.1850$ | $d_8 = 1.9000$ | $n_{d5} = 1.84666$ | $\nu_{d5} = 23.78$ |
| $r_9 = -121.8149$ | $d_9$ = (Variable) | | |
| $r_{10} = \infty$ (Stop) | $d_{10} = 0.8000$ | | |
| $r_{11} = 11.8772$ (Aspheric) | $d_{11} = 1.9992$ | $n_{d6} = 1.49700$ | $\nu_{d6} = 81.54$ |
| $r_{12} = -22.2117$ | $d_{12} = 0.3000$ | | |
| $r_{13} = 8.0295$ | $d_{13} = 1.9997$ | $n_{d7} = 1.48749$ | $\nu_{d7} = 70.23$ |
| $r_{14} = -16.2855$ | $d_{14} = 0.7997$ | $n_{d8} = 1.64769$ | $\nu_{d8} = 33.79$ |
| $r_{15} = -52.6732$ | $d_{15} = 0.3000$ | | |
| $r_{16} = 7.3242$ | $d_{16} = 1.3308$ | $n_{d9} = 1.84666$ | $\nu_{d9} = 23.78$ |
| $r_{17} = 4.4772$ | $d_{17} = 1.2000$ | | |
| $r_{18} = 17.2769$ | $d_{18} = 1.1317$ | $n_{d10} = 1.80610$ | $\nu_{d10} = 40.92$ |
| $r_{19} = 6.2199$ | $d_{19}$ = (Variable) | | |
| $r_{20} = 9.0812$ | $d_{20} = 2.0000$ | $n_{d11} = 1.61800$ | $\nu_{d11} = 63.33$ |
| $r_{21} = 19.8406$ | $d_{21}$ = (Variable) | | |
| $r_{22} = -34.2139$ (Aspheric) | $d_{22} = 2.0000$ | $n_{d12} = 1.58313$ | $\nu_{d12} = 59.38$ |
| $r_{23} = -9.7728$ | $d_{23} = 1.0032$ | | |
| $r_{24} = \infty$ | $d_{25} = 1.4400$ | $n_{d13} = 1.54771$ | $\nu_{d13} = 62.84$ |
| $r_{25} = \infty$ | $d_{26} = 0.8000$ | | |
| $r_{26} = \infty$ | $d_{27} = 0.8000$ | $n_{d14} = 1.51633$ | $\nu_{d14} = 64.14$ |

-continued

| | |
|---|---|
| $r_{27} = \infty$ | $d_{28} = 1.0003$ |
| $r_{28} = \infty$ (Image Plane) | |

Aspherical Coefficients

2nd surface $K = 0$
$A_4 = -9.3483 \times 10^{-5}$
$A_6 = 1.4787 \times 10^{-7}$
$A_8 = -4.5620 \times 10^{-8}$
$A_{10} = 0$ 11th surface $K = 0$
$A_4 = -2.6863 \times 10^{-4}$
$A_6 = -1.0879 \times 10^{-7}$
$A_8 = 3.8711 \times 10^{-9}$
$A_{10} = 0$ 22nd surface $K = 0$
$A_4 = -4.8081 \times 10^{-4}$
$A_6 = 5.9535 \times 10^{-6}$
$A_8 = -1.6767 \times 10^{-7}$
$A_{10} = 0$ Zooming Data ($\infty$)

| | WE | ST | TE |
|---|---|---|---|
| f (mm) | 5.80000 | 9.17005 | 14.49992 |
| $F_{NO}$ | 2.6880 | 3.4974 | 4.5402 |
| 2 ω (°) | 60.8 | 40.1 | 25.4 |
| $d_9$ | 14.10553 | 7.78994 | 2.48873 |
| $d_{19}$ | 1.54225 | 5.16705 | 2.56297 |
| $d_{21}$ | 2.32790 | 5.01801 | 12.92472 |

EXAMPLE 8

| | | | |
|---|---|---|---|
| $r_1 = 16.1825$ (Aspheric) | $d_1 = 1.4000$ | $n_{d1} = 1.80610$ | $v_{d1} = 40.92$ |
| $r_2 = 7.3872$ | $d_2 = 3.5000$ | | |
| $r_3 = \infty$ | $d_3 = 6.5000$ | $n_{d2} = 1.60311$ | $v_{d2} = 60.64$ |
| $r_4 = \infty$ (Mirror) | $d_4 = 6.0000$ | $n_{d3} = 1.60311$ | $v_{d3} = 60.64$ |
| $r_5 = \infty$ | $d_5 = 0.7950$ | | |
| $r_6 = -27.1461$ | $d_6 = 0.8000$ | $n_{d4} = 1.72916$ | $v_{d4} = 54.68$ |
| $r_7 = 20.2982$ | $d_7 = 0.5273$ | | |
| $r_8 = 17.2255$ | $d_8 = 1.9000$ | $n_{d5} = 1.84666$ | $v_{d5} = 23.78$ |
| $r_9 = 90.2451$ | $d_9 =$ (Variable) | | |
| $r_{10} = \infty$ (Stop) | $d_{10} = 0.8000$ | | |
| $r_{11} = 17.0416$ (Aspheric) | $d_{11} = 1.9965$ | $n_{d6} = 1.56384$ | $v_{d6} = 60.67$ |
| $r_{12} = -13.7245$ | $d_{12} = 0.5000$ | | |
| $r_{13} = 5.5039$ | $d_{13} = 3.7857$ | $n_{d7} = 1.48749$ | $v_{d7} = 70.23$ |
| $r_{14} = -38.8943$ | $d_{14} = 0.8000$ | $n_{d8} = 1.69895$ | $v_{d8} = 30.13$ |
| $r_{15} = 4.2611$ | $d_{15} =$ (Variable) | | |
| $r_{16} = 16.8715$ | $d_{16} = 2.0000$ | $n_{d9} = 1.48749$ | $v_{d9} = 70.23$ |
| $r_{17} = 96.4706$ | $d_{17} =$ (Variable) | | |
| $r_{18} = -60.1937$ | $d_{18} = 2.0000$ | $n_{d10} = 1.56384$ | $v_{d10} = 60.67$ |
| $r_{19} = -11.5463$ (Aspheric) | $d_{19} = 1.0039$ | | |
| $r_{20} = \infty$ | $d_{20} = 1.4400$ | $n_{d11} = 1.54771$ | $v_{d11} = 62.84$ |
| $r_{21} = \infty$ | $d_{21} = 0.8000$ | | |
| $r_{22} = \infty$ | $d_{22} = 0.8000$ | $n_{d12} = 1.51633$ | $v_{d12} = 64.14$ |
| $r_{23} = \infty$ | $d_{23} = 1.0021$ | | |
| $r_{24} = \infty$ (Image Plane) | | | |

Aspherical Coefficients

1st surface $K = 0$
$A_4 = 5.1308 \times 10^{-5}$
$A_6 = 2.3428 \times 10^{-7}$
$A_8 = -3.7916 \times 10^{-9}$
$A_{10} = 7.2819 \times 10^{-11}$ 11th surface $K = 0$
$A_4 = -1.6960 \times 10^{-4}$
$A_6 = -1.0587 \times 10^{-6}$
$A_8 = 5.6885 \times 10^{-8}$
$A_{10} = -2.0816 \times 10^{-10}$ 19th surface $K = 0$
$A_4 = 2.9238 \times 10^{-4}$
$A_6 = -1.4179 \times 10^{-5}$
$A_8 = 6.7945 \times 10^{-7}$
$A_{10} = -1.6439 \times 10^{-8}$ Zooming Data ($\infty$)

| | WE | ST | TE |
|---|---|---|---|
| f (mm) | 5.80001 | 9.17026 | 14.49938 |
| $F_{NO}$ | 2.6926 | 3.5230 | 4.5194 |
| 2 ω (°) | 61.1 | 40.1 | 25.7 |
| $d_9$ | 14.09978 | 8.00554 | 2.48873 |
| $d_{15}$ | 2.47558 | 7.50212 | 3.24411 |
| $d_{17}$ | 3.07729 | 4.13993 | 13.92316 |

EXAMPLE 9

| | | | |
|---|---|---|---|
| $r_1 = 21.2658$ | $d_1 = 1.0000$ | $n_{d1} = 1.74100$ | $v_{d1} = 52.64$ |
| $r_2 = 8.6245$ | $d_2 = 3.3711$ | | |
| $r_3 = \infty$ | $d_3 = 5.8400$ | $n_{d2} = 1.80400$ | $v_{d2} = 46.57$ |
| $r_4 = \infty$ (Mirror) | $d_4 = 5.4952$ | $n_{d3} = 1.80400$ | $v_{d3} = 46.57$ |
| $r_5 = \infty$ | $d_5 = 0.3221$ | | |
| $r_6 = 300.0000$ | $d_6 = 1.0000$ | $n_{d4} = 1.74320$ | $v_{d4} = 49.34$ |
| $r_7 = 15.3314$ (Aspheric) | $d_7 = 0.5979$ | | |
| $r_8 = 15.8974$ | $d_8 = 1.4903$ | $n_{d5} = 1.84666$ | $v_{d5} = 23.78$ |
| $r_9 = 43.0822$ | $d_9 =$ (Variable) | | |
| $r_{10} = \infty$ (Stop) | $d_{10} = 0.6000$ | | |
| $r_{11} = 63.9771$ | $d_{11} = 1.3913$ | $n_{d6} = 1.61800$ | $v_{d6} = 63.33$ |
| $r_{12} = -23.2380$ | $d_{12} =$ (Variable) | | |
| $r_{13} = 7.9674$ (Aspheric) | $d_{13} = 2.3478$ | $n_{d7} = 1.48749$ | $v_{d7} = 70.23$ |
| $r_{14} = -68.3182$ | $d_{14} = 0.1000$ | | |
| $r_{15} = 24.3652$ | $d_{15} = 3.3012$ | $n_{d8} = 1.84666$ | $v_{d8} = 23.78$ |
| $r_{16} = 7.7880$ | $d_{16} = 0.2484$ | | |
| $r_{17} = 9.2912$ | $d_{17} = 2.1349$ | $n_{d9} = 1.72916$ | $v_{d9} = 54.68$ |
| $r_{18} = -19.4929$ | $d_{18} = 0.7000$ | $n_{d10} = 1.53172$ | $v_{d10} = 48.84$ |
| $r_{19} = 5.2999$ | $d_{19} =$ (Variable) | | |
| $r_{20} = -22.5496$ (Aspheric) | $d_{20} = 2.5068$ | $n_{d11} = 1.58913$ | $v_{d11} = 61.14$ |
| $r_{21} = -6.5395$ | $d_{21} = 1.0000$ | | |
| $r_{22} = \infty$ | $d_{22} = 1.5000$ | $n_{d12} = 1.51633$ | $v_{d12} = 64.14$ |
| $r_{23} = \infty$ | $d_{23} = 1.4400$ | $n_{d13} = 1.54771$ | $v_{d13} = 62.84$ |
| $r_{24} = \infty$ | $d_{24} = 0.8000$ | | |
| $r_{25} = \infty$ | $d_{25} = 0.8000$ | $n_{d14} = 1.51633$ | $v_{d14} = 64.14$ |
| $r_{26} = \infty$ | $d_{26} = 1.0894$ | | |
| $r_{27} = \infty$ (Image Plane) | | | |

Aspherical Coefficients

7th surface $K = 0$
$A_4 = -6.9423 \times 10^{-5}$
$A_6 = 1.9216 \times 10^{-7}$
$A_8 = -2.3395 \times 10^{-8}$
$A_{10} = 0$

13th surface $K = 0$
$A_4 = -2.1881 \times 10^{-4}$
$A_6 = -2.0288 \times 10^{-6}$
$A_8 = 7.6472 \times 10^{-10}$
$A_{10} = 0$

20th surface $K = 0$
$A_4 = -1.0095 \times 10^{-3}$
$A_6 = 3.4022 \times 10^{-8}$
$A_8 = -1.7165 \times 10^{-7}$
$A_{10} = 0$

Zooming Data (∞)

|  | WE | ST | TE |
|---|---|---|---|
| f (mm) | 5.52179 | 7.96811 | 15.98093 |
| $F_{NO}$ | 2.4770 | 2.9873 | 4.5000 |
| 2 ω (°) | 64.5 | 44.7 | 22.7 |
| $d_9$ | 17.73448 | 10.81643 | 2.00000 |
| $d_{12}$ | 1.20000 | 3.80000 | 3.50000 |
| $d_{19}$ | 2.60300 | 5.58623 | 15.86209 |

EXAMPLE 10

| | | | |
|---|---|---|---|
| $r_1 = 24.8917$ | $d_1 = 1.0000$ | $n_{d1} = 1.74100$ | $v_{d1} = 52.64$ |
| $r_2 = 8.0792$ | $d_2 = 2.3760$ | | |
| $r_3 = \infty$ | $d_3 = 5.2400$ | $n_{d2} = 1.80400$ | $v_{d2} = 46.57$ |
| $r_4 = \infty$ (Mirror) | $d_4 = 5.0006$ | $n_{d3} = 1.80400$ | $v_{d3} = 46.57$ |
| $r_5 = \infty$ | $d_5 = 0.2922$ | | |
| $r_6 = 300.0000$ | $d_6 = 1.0000$ | $n_{d4} = 1.74320$ | $v_{d4} = 49.34$ |
| $r_7 = 14.5213$ (Aspheric) | $d_7 = 0.1000$ | | |
| $r_8 = 14.5896$ | $d_8 = 1.7517$ | $n_{d5} = 1.84666$ | $v_{d5} = 23.78$ |
| $r_9 = 64.9869$ | $d_9 = $ (Variable) | | |
| $r_{10} = \infty$ (Stop) | $d_{10} = 0.6000$ | | |
| $r_{11} = 33.4595$ | $d_{11} = 1.8985$ | $n_{d6} = 1.61800$ | $v_{d6} = 63.33$ |
| $r_{12} = -11.1499$ | $d_{12} = 0.7000$ | $n_{d7} = 1.80518$ | $v_{d7} = 25.42$ |
| $r_{13} = -20.0542$ | $d_{13} = $ (Variable) | | |
| $r_{14} = 10.2987$ (Aspheric) | $d_{14} = 2.0299$ | $n_{d8} = 1.48749$ | $v_{d8} = 70.23$ |
| $r_{15} = 18890.0000$ | $d_{15} = 0.1000$ | | |
| $r_{16} = 19.8062$ | $d_{16} = 4.5045$ | $n_{d9} = 1.84666$ | $v_{d9} = 23.78$ |
| $r_{17} = 9.7836$ | $d_{17} = 0.2000$ | | |
| $r_{18} = 11.2175$ | $d_{18} = 1.7598$ | $n_{d10} = 1.72916$ | $v_{d10} = 54.68$ |
| $r_{19} = -51.5183$ | $d_{19} = 0.7000$ | $n_{d11} = 1.53172$ | $v_{d11} = 48.84$ |
| $r_{20} = 5.5430$ | $d_{20} = $ (Variable) | | |
| $r_{21} = -23.0137$ (Aspheric) | $d_{21} = 1.9685$ | $n_{d12} = 1.58913$ | $v_{d12} = 61.14$ |
| $r_{22} = -7.0933$ | $d_{22} = 1.0000$ | | |
| $r_{23} = \infty$ | $d_{23} = 1.5000$ | $n_{d13} = 1.51633$ | $v_{d13} = 64.14$ |
| $r_{24} = \infty$ | $d_{24} = 1.4400$ | $n_{d14} = 1.54771$ | $v_{d14} = 62.84$ |
| $r_{25} = \infty$ | $d_{25} = 0.8000$ | | |
| $r_{26} = \infty$ | $d_{16} = 0.8000$ | $n_{d15} = 1.51633$ | $v_{d15} = 64.14$ |
| $r_{27} = \infty$ | $d_{17} = 1.0106$ | | |
| $r_{28} = \infty$ (Image Plane) | | | |

Aspherical Coefficients

7th surface $K = 0$
$A_4 = -8.0580 \times 10^{-5}$
$A_6 = 7.6927 \times 10^{-7}$
$A_8 = -2.7173 \times 10^{-8}$
$A_{10} = 0$

14th surface $K = 0$
$A_4 = -1.1033 \times 10^{-4}$
$A_6 = -1.4285 \times 10^{-8}$
$A_8 = -1.8629 \times 10^{-8}$
$A_{10} = 0$

21st surface $K = 0$
$A_4 = -8.5891 \times 10^{-4}$
$A_6 = 1.0215 \times 10^{-5}$
$A_8 = -3.2143 \times 10^{-5}$
$A_{10} = 0$

Zooming Data (∞)

|  | WE | ST | TE |
|---|---|---|---|
| f (mm) | 5.86879 | 9.99877 | 17.39648 |
| $F_{NO}$ | 2.4340 | 3.2140 | 4.5000 |
| 2 ω (°) | 61.4 | 35.8 | 21.0 |
| $d_9$ | 17.88781 | 8.41716 | 2.00000 |
| $d_{13}$ | 1.20000 | 6.81663 | 3.50000 |
| $d_{20}$ | 3.14136 | 7.01231 | 16.74709 |

EXAMPLE 11

| | | | |
|---|---|---|---|
| $r_1 = 41.9739$ | $d_1 = 1.2000$ | $n_{d1} = 1.77250$ | $v_{d1} = 49.60$ |
| $r_2 = 11.1642$ | $d_2 = 2.9000$ | | |
| $r_3 = \infty$ | $d_3 = 6.5000$ | $n_{d2} = 1.78590$ | $v_{d2} = 44.20$ |
| $r_4 = \infty$ (Mirror) | $d_4 = 6.0000$ | $n_{d3} = 1.78590$ | $V_{d3} = 44.20$ |
| $r_5 = \infty$ | $d_5 = 0.3971$ | | |
| $r_6 = 28.0000$ | $d_6 = 1.2000$ | $n_{d4} = 1.74330$ | $v_{d4} = 49.33$ |
| $r_7 = 11.3578$ (Aspheric) | $d_7 = 0.3457$ | | |
| $r_8 = 9.4845$ | $d_8 = 1.7925$ | $n_{d5} = 1.84666$ | $v_{d5} = 23.78$ |
| $r_9 = 14.2959$ | $d_9 = $ (Variable) | | |
| $r_{10} = \infty$ (Stop) | $d_{10} = 1.0000$ | | |
| $r_{11} = 47.8757$ | $d_{11} = 1.9600$ | $n_{d6} = 1.72916$ | $v_{d6} = 54.68$ |
| $r_{12} = -9.0806$ | $d_{12} = 0.7000$ | $n_{d7} = 1.72825$ | $v_{d7} = 28.46$ |
| $r_{13} = -25.4395$ | $d_{13} = $ (Variable) | | |
| $r_{14} = 9.1761$ (Aspheric) | $d_{14} = 1.9500$ | $n_{d8} = 1.74330$ | $v_{d8} = 49.33$ |
| $r_{15} = 75.3616$ | $d_{15} = 0.8461$ | | |
| $r_{16} = 24.3002$ | $d_{16} = 3.8969$ | $n_{d9} = 1.74330$ | $v_{d9} = 49.33$ |
| $r_{17} = \infty$ | $d_{17} = 1.0000$ | $n_{d10} = 1.72825$ | $v_{10} = 28.46$ |
| $r_{18} = 4.8249$ | $d_{18} = $ (Variable) | | |
| $r_{19} = 49.5382$ | $d_{19} = 2.7500$ | $n_{d11} = 1.69350$ | $v_{d11} = 53.20$ |
| $r_{20} = -10.0407$ (Aspheric) | $d_{20} = 0.8269$ | | |
| $r_{21} = \infty$ | $d_{21} = 1.4400$ | $n_{d12} = 1.54771$ | $v_{d12} = 62.84$ |
| $r_{22} = \infty$ | $d_{22} = 0.8000$ | | |
| $r_{23} = \infty$ | $d_{23} = 0.8000$ | $n_{d13} = 1.51633$ | $v_{d13} = 64.14$ |
| $r_{24} = \infty$ | $d_{24} = 1.0447$ | | |
| $r_{25} = \infty$ (Image Plane) | | | |

-continued

Aspherical Coefficients

7th surface

K = 0
$A_4 = 2.2504 \times 10^{-5}$
$A_6 = 2.6875 \times 10^{-6}$
$A_8 = -1.2962 \times 10^{-7}$
$A_{10} = 2.8718 \times 10^{-9}$ 14th surface K = 0
$A_4 = -9.8664 \times 10^{-5}$
$A_6 = 4.0400 \times 10^{-6}$
$A_8 = -4.4986 \times 10^{-7}$
$A_{10} = 1.3851 \times 10^{-8}$ 20th surface K = 0
$A_4 = 5.3089 \times 10^{-4}$
$A_6 = -1.6198 \times 10^{-5}$
$A_8 = 4.4581 \times 10^{-7}$
$A_{10} = -4.9080 \times 10^{-9}$ Zooming Data (∞)

| | WE | ST | TE |
|---|---|---|---|
| f (mm) | 6.02622 | 9.31725 | 14.28897 |
| $F_{NO}$ | 2.7652 | 3.4888 | 4.5271 |
| 2ω (°) | 62.4 | 42.8 | 28.7 |
| $d_9$ | 14.24100 | 6.97804 | 2.00694 |
| $d_{13}$ | 2.10000 | 6.51339 | 5.34809 |
| $d_{18}$ | 2.46549 | 5.31403 | 11.45279 |

EXAMPLE 12

| | | | |
|---|---|---|---|
| $r_1 = -14.2761$ (Aspheric) | $d_1 = 5.1000$ | $n_{d1} = 1.50913$ | $v_{d1} = 56.20$ |
| $r_2 = ∞$ (Mirror) | $d_2 = 5.7941$ | $n_{d2} = 1.50913$ | $v_{d2} = 56.20$ |
| $r_3 = ∞$ | $d_3 = 2.1000$ | | |
| $r_4 = -6.4892$ | $d_4 = 0.8000$ | $n_{d3} = 1.64000$ | $v_{d3} = 60.07$ |
| $r_5 = -84.1654$ | $d_5 = 1.1935$ | $n_{d4} = 1.84666$ | $v_{d4} = 23.78$ |
| $r_6 = -16.8306$ | $d_6 = $ (Variable) | | |
| $r_7 = ∞$ (Stop) | $d_7 = 0.4000$ | | |
| $r_8 = 34.9225$ (Aspheric) | $d_8 = 1.4006$ | $n_{d5} = 1.74330$ | $v_{d5} = 49.33$ |
| $r_9 = -15.2934$ | $d_9 = 0.1500$ | | |
| $r_{10} = 6.1210$ | $d_{10} = 3.3481$ | $n_{d6} = 1.61800$ | $v_{d6} = 63.33$ |
| $r_{11} = 27.4556$ | $d_{11} = 0.8000$ | $n_{d7} = 1.84666$ | $v_{d7} = 23.78$ |
| $r_{12} = 4.9467$ | $d_{12} = $ (Variable) | | |
| $r_{13} = 13.6380$ | $d_{13} = 1.4415$ | $n_{d8} = 1.51633$ | $v_{d8} = 64.14$ |
| $r_{14} = -143.7586$ | $d_{14} = $ (Variable) | | |
| $r_{15} = -19.5436$ | $d_{15} = 1.3641$ | $n_{d9} = 1.58913$ | $v_{d9} = 61.25$ |
| $r_{16} = -7.1346$ (Aspheric) | $d_{16} = 0.8000$ | | |
| $r_{17} = ∞$ | $d_{17} = 1.0500$ | $n_{d10} = 1.54771$ | $v_{d10} = 62.84$ |
| $r_{18} = ∞$ | $d_{18} = 0.8000$ | | |
| $r_{19} = ∞$ | $d_{19} = 0.8000$ | $n_{d11} = 1.51633$ | $v_{d11} = 64.14$ |
| $r_{20} = ∞$ | $d_{20} = 0.9669$ | | |
| $r_{21} = ∞$ (Image Plane) | | | |

Aspherical Coefficients

1st surface

K = 0
$A_4 = 3.2165 \times 10^{-4}$
$A_6 = -9.1756 \times 10^{-7}$
$A_8 = 4.1788 \times 10^{-9}$
$A_{10} = 0.0000$ -continued 8th surface K = 0
$A_4 = -1.2083 \times 10^{-4}$
$A_6 = 1.1516 \times 10^{-7}$
$A_8 = -2.9381 \times 10^{-8}$
$A_{10} = 0.0000$ 16th surface K = 0
$A_4 = 1.3137 \times 10^{-3}$
$A_6 = -2.0878 \times 10^{-5}$
$A_8 = 4.9397 \times 10^{-7}$
$A_{10} = 0.0000$ Zooming Data (∞)

| | WE | ST | TE |
|---|---|---|---|
| f (mm) | 5.02898 | 8.69474 | 14.52092 |
| $F_{NO}$ | 2.6544 | 3.5217 | 4.5079 |
| 2ω (°) | 64.8 | 38.2 | 22.6 |
| $d_6$ | 14.61860 | 7.39251 | 1.80000 |
| $d_{12}$ | 3.75585 | 8.20107 | 4.39975 |
| $d_{14}$ | 3.16733 | 5.96897 | 15.38987 |

Figure 13A:
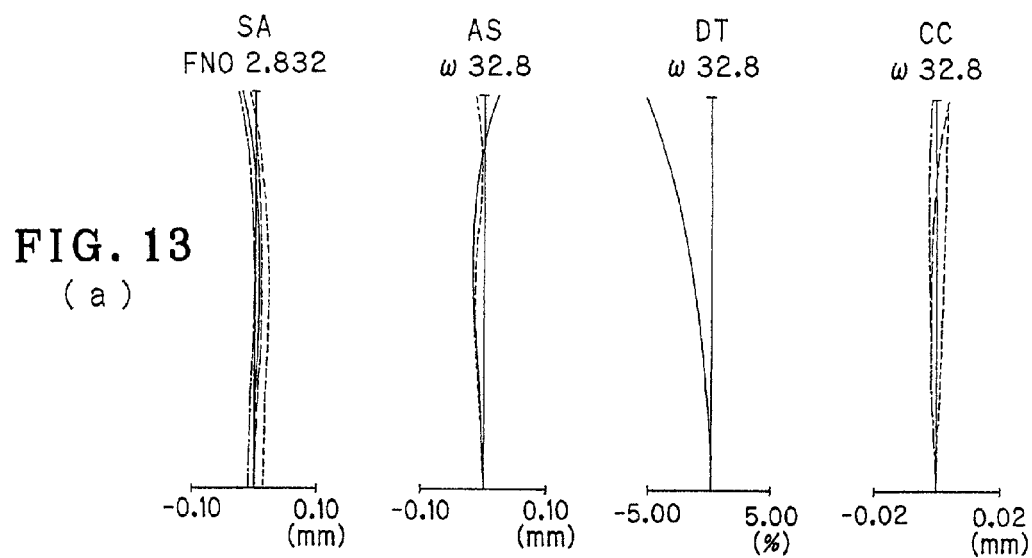
FIGS. 13(a) to 13(c) are aberration diagrams of Example 1 upon focused on an object point at infinity.
Figure 13B:
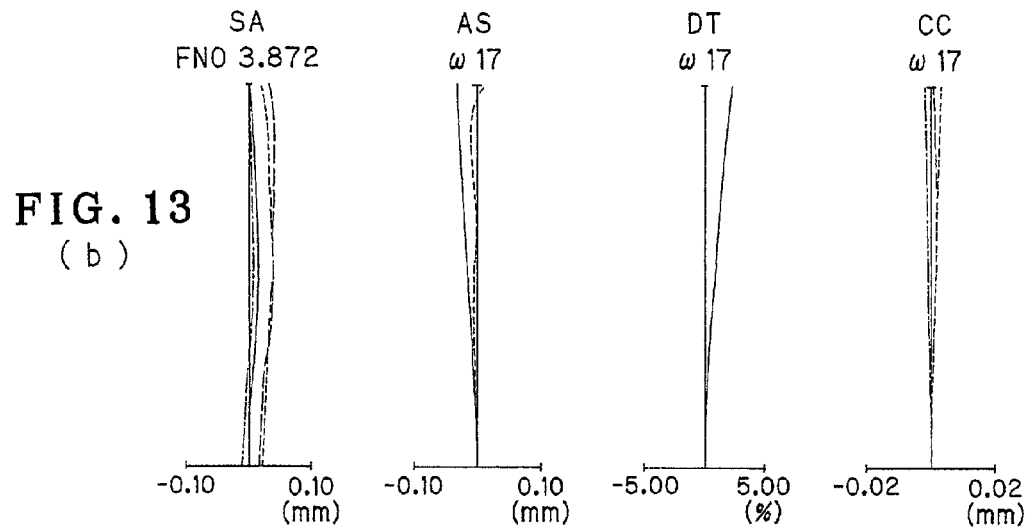
Figure 13C:
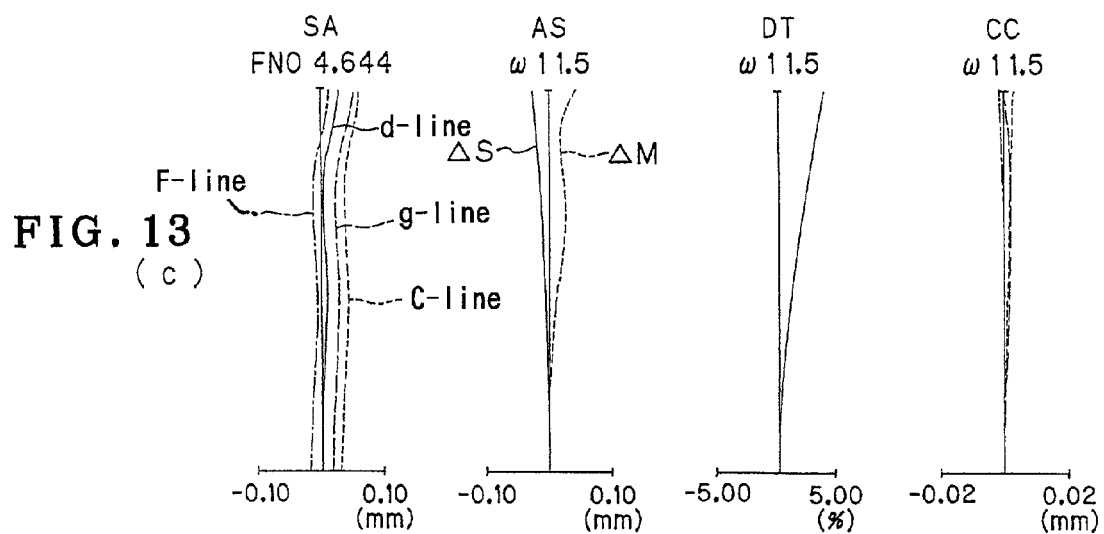
Figure 14:
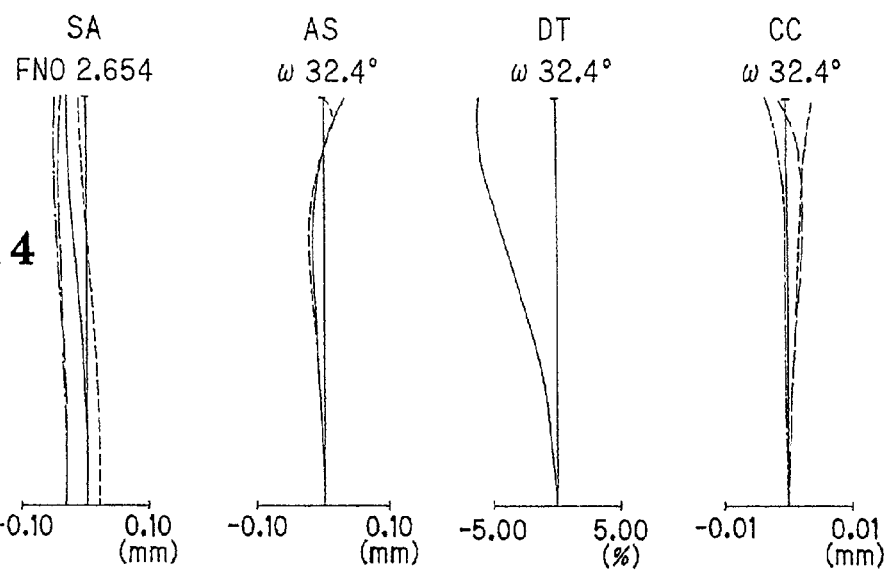
FIGS. 14(a) to 14(c) are aberration diagrams of Example 12 upon focused on an object point at infinity.
Figure 14:
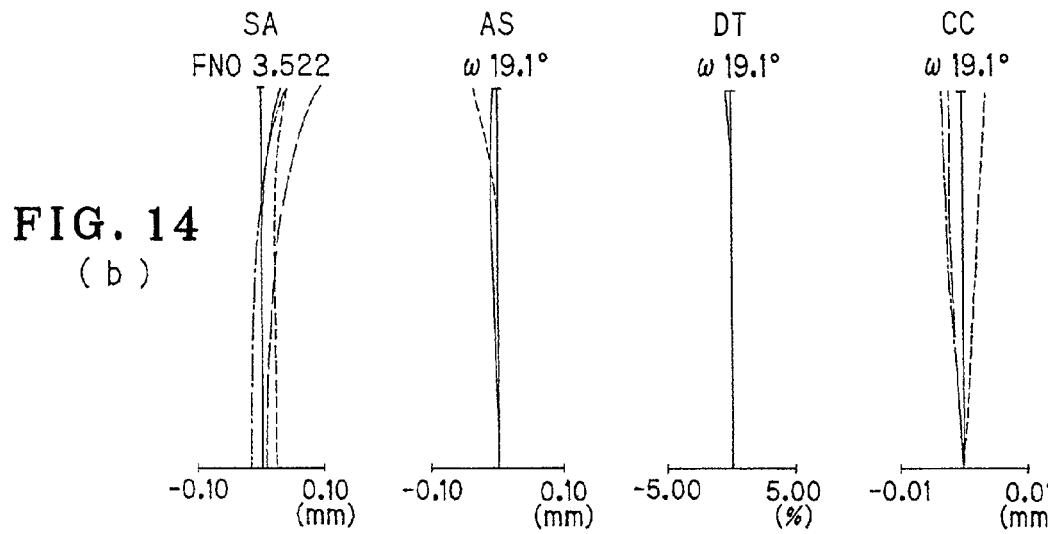
Figure 14:
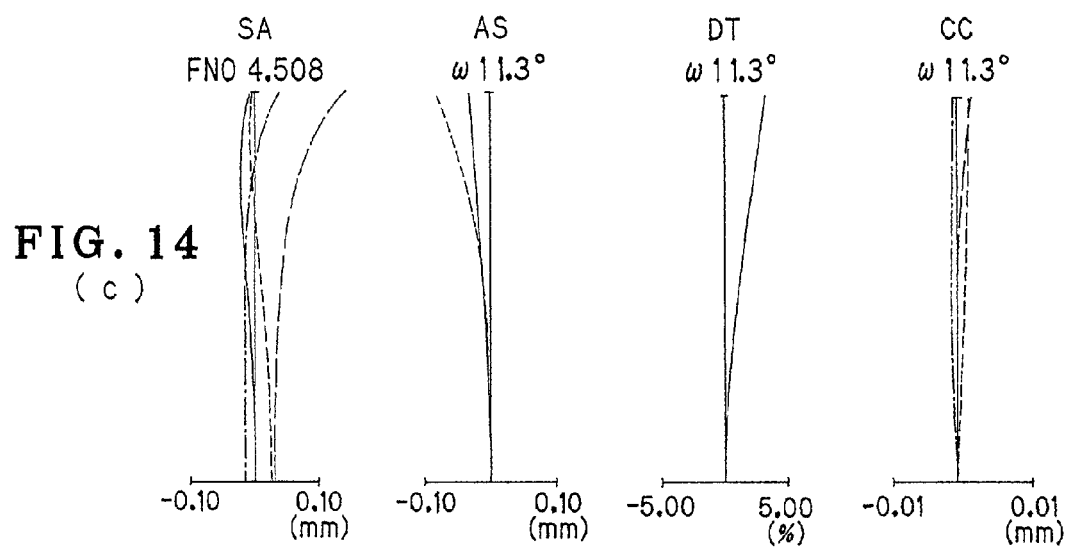

Aberration diagrams for Example 1 and Example 2 upon focused on an object point at infinity are shown in FIG. 13 and FIG. 14, respectively. In these aberration diagrams, spherical aberrations SA, astigmatisms AS, distortions DT and chromatic aberrations of magnification CC are illustrated at the wide-angle end (a), intermediate or standard state (b) and telephoto end (c).

Enumerated below are the values of L, d/L, $D_{FT}/f_T$, $M_3/M_2$, $f_{11}/f_{12}$, $\beta_{Rt}$, a, and $t_{LPF}$ concerning conditions (a) to (f) in the aforesaid examples.

| Ex. | L | d/L | $D_{FT}/f_T$ | $M_3/M_2$ | $f_{11}/f_{12}$ |
|---|---|---|---|---|---|
| 1 | 5.6 | 0.72088 | 0.78471 | 1.19347 | −0.12343 |
| 2 | 6.0 | 0.79009 | 0.76004 | 0.53348 | −0.32094 |
| 3 | 5.6 | 0.71748 | 0.11496 | 0.93206 | 0.36284 |
| 4 | 6.0 | 0.69413 | 0.15191 | 0.92989 | 0.20195 |
| 5 | 6.64 | 0.76797 | 0.25931 | 3rd-negative | 0 |
| 6 | 6.64 | 0.74877 | 0.27393 | 3rd-negative | 0 |
| 7 | 6.64 | 1.19996 | 0.17676 | 0.91213 | 0.37232 |
| 8 | 6.64 | 1.17430 | 0.22374 | 0.93381 | 0.39484 |
| 9 | 6.64 | 0.94629 | 0.21901 | 0.85382 | 0.22917 |
| 10 | 6.64 | 0.85491 | 0.20119 | 0.85523 | 0.05553 |
| 11 | 6.64 | 0.94867 | 0.37452 | 0.73366 | 0.09671 |
| 12 | 6.0 | 1.20313 | 0.30301 | 0.95350 | 1.26698 |

| Ex. | $\beta_{Rt}$ | a | $t_{LPF}$ |
|---|---|---|---|
| 1 | −1.6884 | 3.0 | 1.80 |
| 2 | −1.19598 | 3.0 | 1.80 |
| 3 | −1.49396 | 3.0 | 1.80 |
| 4 | −1.26884 | 3.0 | 0.80 |
| 5 | −1.51672 | 3.0 | 1.55 |
| 6 | −1.38530 | 3.0 | 1.44 |
| 7 | −1.26560 | 3.0 | 1.44 |
| 8 | −1.30121 | 3.0 | 1.44 |
| 9 | −1.05735 | 3.0 | 1.44 |
| 10 | −1.14882 | 3.0 | 1.44 |
| 11 | −0.86588 | 3.0 | 1.44 |
| 12 | −1.36309 | 2.5 | 1.20 |

How to receive the inventive optical path-bending zoom optical system in place is now explained specifically. FIGS.

Figures 15A, 15B:
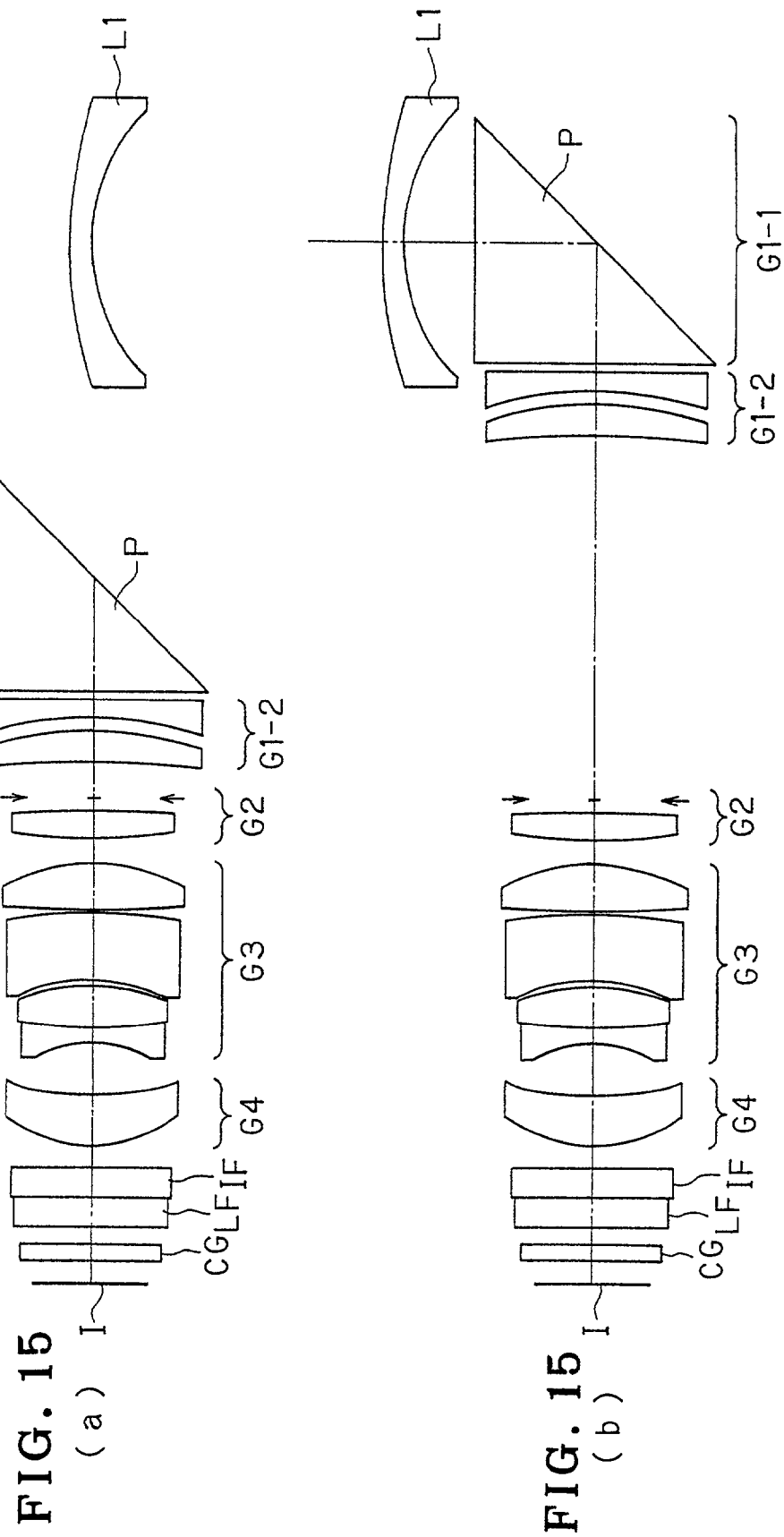
FIGS. 15(a) and 15(b) are conceptual schematics illustrative of one embodiment of how to receive the optical path bending-zoom optical system of the invention in place.

15(*a*) and 15(*b*) are illustrative of how to receive the optical path-bending zoom optical system of FIG. 9 (Example 9) in place. FIG. 15(*b*) is a sectional schematic inclusive of an optical path-bending axis, showing Example 9 of the optical path-bending zoom optical system at the wide-angle end. In this state, two lenses forming the second lens group G2 and the optical path-bending prism P forming a part of the 1-1st lens group G1-1 are relocated in a space between the 1-2nd lens group G1-2 and the second lens group G2, and the negative meniscus lens L1 located in front of the optical path-bending prism P in the 1-1st lens group G1-1 is received in the resulting space, so that the thickness of the optical path-bending zoom optical system in its entrance axis direction (in the depth direction of the camera) can be reduced. It is here noted that when there is a space on the image plane I side with respect to the second lens group G2, it is preferable to relocate the optical path-bending prism P and the 1-2nd lens group G1-2 as well as the second lens group G2, etc. on the image plane I side.

Figure 16:
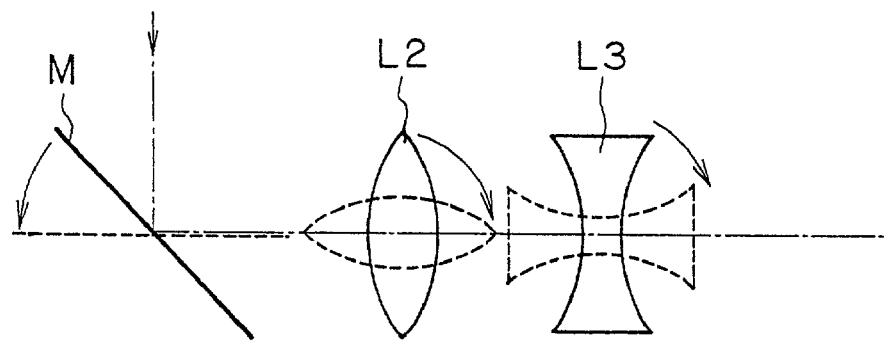
FIG. 16 is a conceptual schematic illustrative of one embodiment of how to receive the optical system body in place when the reflecting optical element for bending an optical path is constructed of a mirror.

FIG. 16 is a conceptual schematic of one embodiment of how to receive the optical path-bending zoom optical system in place when the reflecting optical element is constructed of a mirror M. The mirror M is tilted at a position indicated by a broken line, and lenses L2 and L3 located on the image plane I side with respect to the mirror M are tilted at positions indicated by broken lines, so that the thickness of the zoom optical system in its optical axis direction (in the depth direction of a camera) can be reduced.

Figure 17:
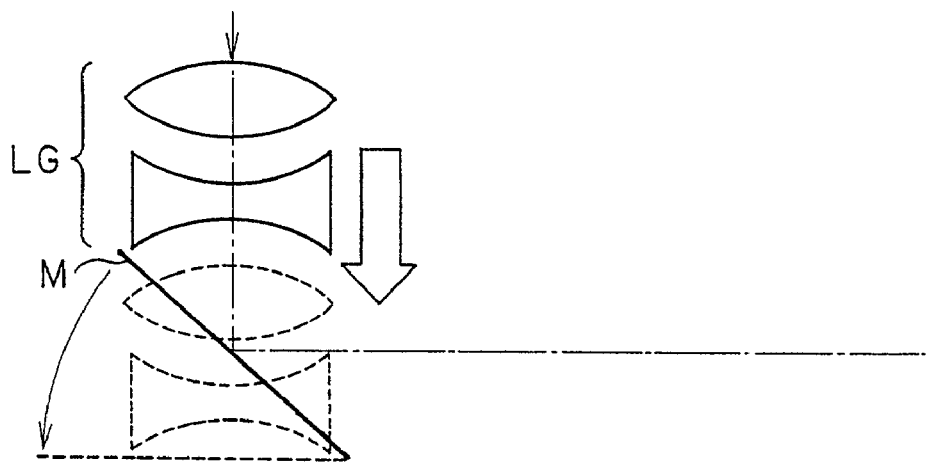
FIG. 17 is a conceptual schematic illustrative of another embodiment of how to receive the optical system in place when the reflecting optical element for bending an optical path is constructed of a mirror.

FIG. 17 is a conceptual schematic of another embodiment of how to receive the optical path-bending zoom optical system in place when the reflecting optical element is formed of a mirror M. The mirror M is tilted at a position indicated by a broken line and a lens group LG located on the object side with respect to the mirror M is received in the resulting space, thereby achieving similar thickness reductions. Instead of tilting the mirror M, it may be relocated along the optical axis after bending, as shown in FIG. 15.

Figure 18:
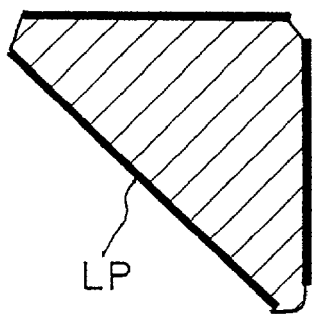
FIGS. 18(a) and 18(b) are conceptual schematics illustrative of one embodiment of how to receive the optical system in place when the reflecting optical element for bending an optical path is constructed of a liquid or transformable prism.
Figure 18:
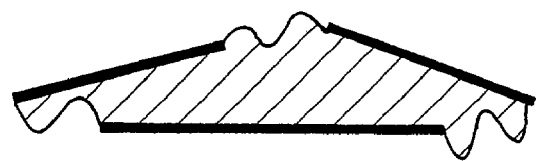

FIGS. 18(*a*) and 18(*b*) are illustrative of one embodiment of the reflecting optical element for bending an optical path, which is constructed of a liquid or transformable prism LP (see FIG. 18(*a*)). This reflecting optical element may be received in place as by removing the liquid therefrom as shown in FIG. 18(*b*), thereby achieving thickness reductions. Alternatively, lens groups located on the object side with respect to the prism LP may be received in the resulting space (see FIG. 17), or other lenses may be tilted (see FIG. 16), again achieving thickness reductions.

In the optical path-bending zoom optical system of the present invention, the reflecting optical element for bending an optical path may also be constructed of a variable-shape mirror. The variable-shape mirror is a reflecting mirror comprising a transformable film with a reflecting mirror coating applied thereon. This reflecting mirror may be relocated by folding or winding.

Figure 19:
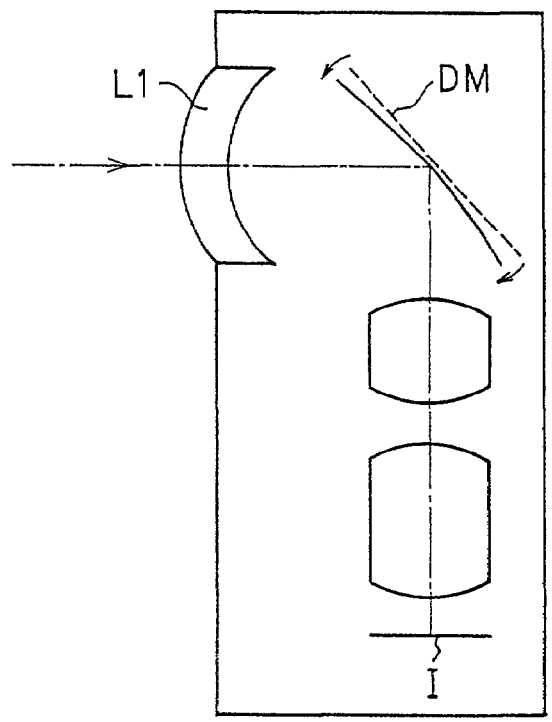
FIG. 19 is a conceptual schematic illustrative of how to carry out focusing when the reflecting optical element for bending an optical path is constructed of a variable-shape mirror.

When the reflecting optical element for bending an optical path is constructed of a variable-shape mirror, it is acceptable to carry out focusing by the transformation of that mirror, as shown conceptually in FIG. 19. For focusing on a nearby object, only the transformation of a planar form of variable-shape mirror DM into a concave surface is needed upon focused on a point at infinity, as shown by an arrow. That is, for focusing on a nearby object, the surface shape of the variable-shape mirror DM is transformed into an aspheric surface shape within an effective reflecting surface area. Especially when power is imparted to a reflecting surface that is of rotationally symmetric shape, decentration aberrations are produced at that surface due to decentered incidence of light thereon. It is thus desired that the variable-shape mirror DM be defined by a rotationally asymmetric curved surface.

Figure 20:
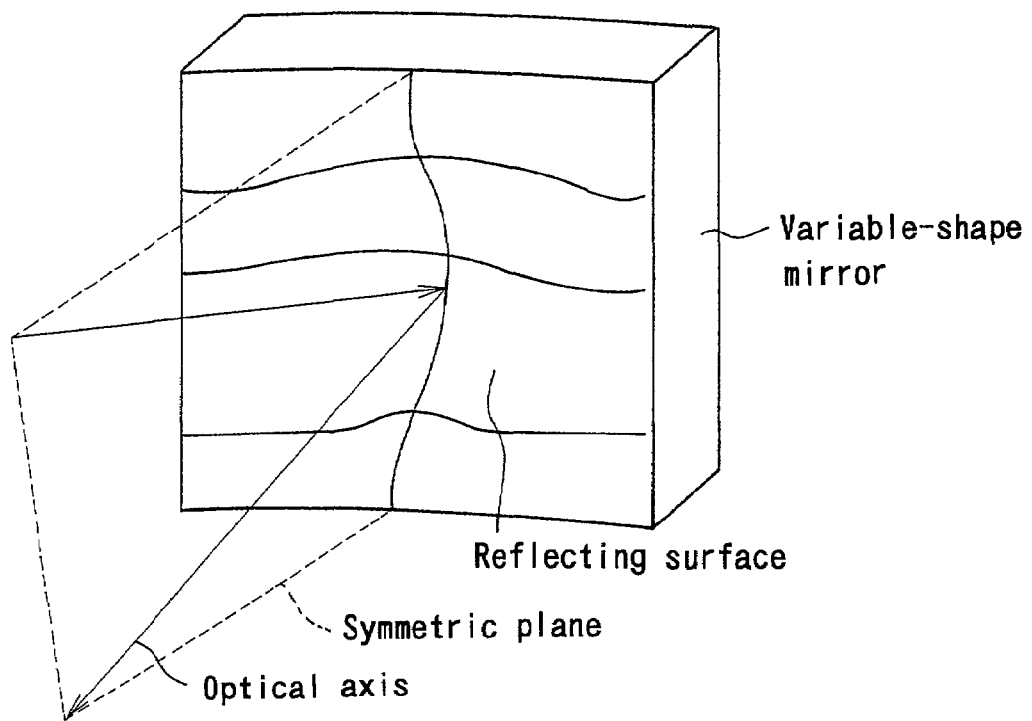
FIG. 20 is a conceptual schematic illustrative of the surface shape of a variable-shape mirror.

Off-axis, rotationally asymmetric distortions or the like, too, are produced by decentration. To make correction for decentration aberrations symmetric with respect to plane, it is preferable to transform the surface of the variable-shape mirror DM into a curved surface with respect to plane, where only one symmetric surface is defined by a plane including an optical axis entered in and reflected at the reflecting surface of the variable-shape mirror DM, as shown in FIG. 20.

Referring again to FIG. 19, the variable-shape mirror DM takes a planar form upon focused on a point at infinity. To make correction for decentration aberrations produced upon focused on a nearby object point, however, it is preferable to transform the reflecting surface of the mirror DM into a rotationally asymmetric surface having only one symmetric plane, as shown in FIG. 20. With this arrangement, it is possible to achieve the size reduction of the whole of an electronic image pickup system and maintain its performance.

Figure 21:
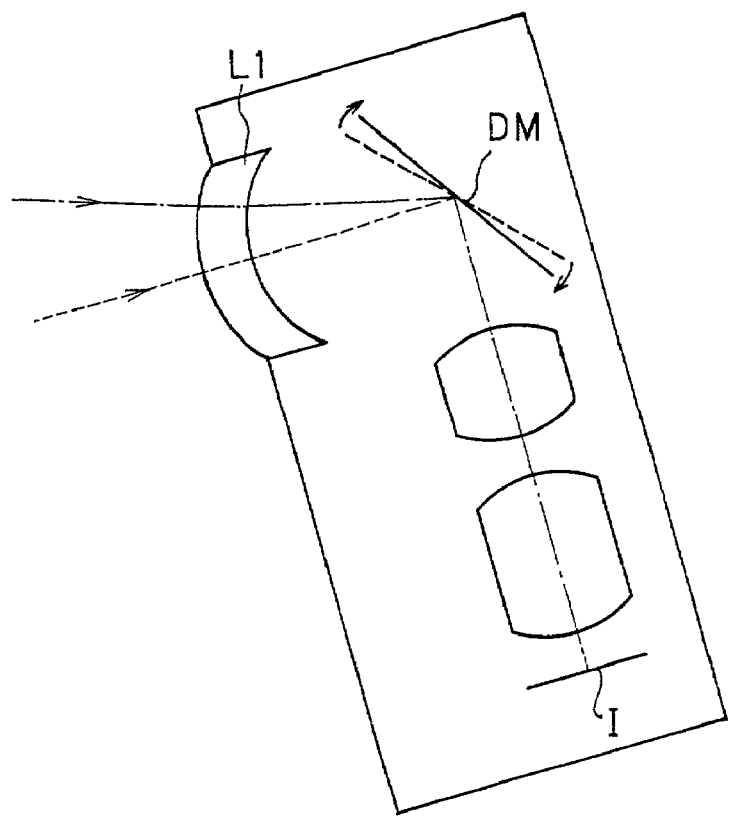
FIG. 21 is a conceptual schematic illustrative of how to correct camera movements when the reflecting optical element for bending an optical path is constructed of a variable-shape mirror.

FIG. 21 is illustrative of one embodiment of how to correct camera movements by tilting the reflecting surface of a variable-shape mirror DM in an arrow direction. In the state of FIG. 19, there is no camera movement, and in the state of FIG. 21, the function of correcting camera movements by tilting the reflecting surface of the variable-shape mirror DM is brought into action. When an image pickup device turns down with respect to a phototaking direction as shown in FIG. 21, the inclination of the reflecting surface of the variable-shape mirror DM displaces from a broken-line position to a solid-line position so that the entrance optical axis is kept from inclination. Preferably in this case, the whole surface shape of the variable-shape mirror DM is so transformed that fluctuations of aberrations can be prevented.

In the present invention, it is acceptable to impart power the reflecting surface of the reflecting optical element for bending an optical path and configure its surface shape with a free-form surface or the like. Alternatively, it is acceptable to construct the reflecting surface of the reflecting optical element with a holographic optical element (HOE).

When the reflecting optical element is constructed of an optical path-bending prism P as set forth in Examples 1 to 12, it is acceptable to cement the prism P to lenses located before and after the same.

Figure 22:
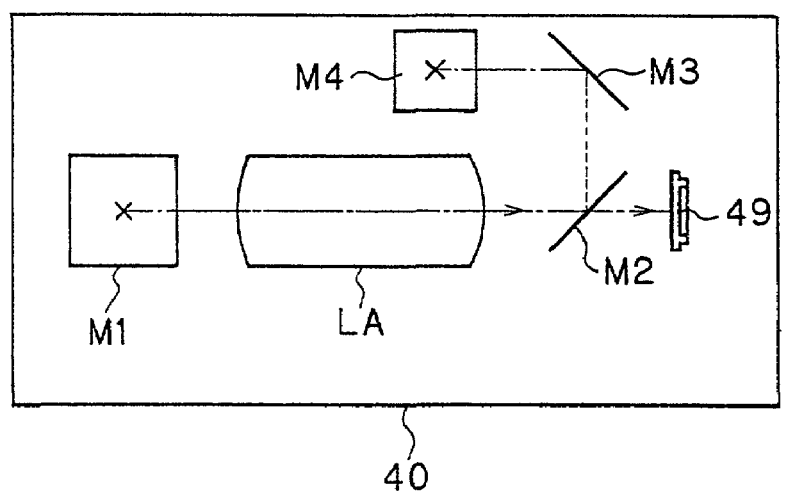
FIG. 22 is a conceptual schematic illustrative of how to split a finder optical path from the optical path-bending zoom optical system.

When an electronic image pickup system such as a digital camera is constructed using the optical path-bending zoom optical system of the present invention, it is acceptable to interpose an optical path splitter element between the optical path-bending zoom optical system and an electronic image pickup device such as a CCD to split an phototaking optical path to a finder optical path, as shown in FIG. 22. FIG. 22 is a front view of a digital camera 40. In this case, an optical path-bending zoom optical system comprises a reflecting optical element Ml for bending an optical path through 90° and a lens group LA located on the image plane side of the element M1, with an image pickup device CCD 49 positioned on the image plane. Between the lens group LA and CCD 49, there is interposed an optical path splitter element M2 half-silvered mirror to split the optical path, so that a part thereof is deflected to a side substantially vertical to a plane including an optical axis before and after reflection at the reflecting optical element M1 (the upper side of FIG. 22). It is understood that the optical path splitter element M2 may be defined by a reflecting surface that is inserted only when a light beam is guided to the finder optical path. An optical path reflected at the optical path splitter element M2 is bent by another reflecting surface M3 through 90° in a plane including an optical axis before and after reflected at the optical path splitter element M2 and further bent by a fourth reflecting surface M4 through 90°, running substantially parallel with the optical axis entered in the reflecting optical element M1. Although an eyepiece optical system is not shown in FIG. 22, it is understood that it is located on the exit side of the fourth reflecting surface M4 or before and after a plane including that reflecting surface M4, so that a subject image under observation is viewed by the viewer's eyeball positioned on the exit side of the fourth reflecting surface M4.

Throughout Examples 1 to 12, the low-pass filter LF is constructed of three filter elements one upon another. However, it is appreciated that many modifications may be made to the aforesaid examples without departing from the scope of the invention. For instance, the low-pass filter may be formed of one single low-pass filter element.

In each of the aforesaid examples, the final lens group is provided on its image side with a near-infrared cut filter IF or a low-pass filter LF having a near-infrared sharp cut coat surface IC on its entrance surface side. This near-infrared cut filter IF or near-infrared sharp cut coat surface IC is designed to have a transmittance of at least 80% at 600 nm wavelength and a transmittance of up to 10% at 700 nm wavelength. More specifically, the low-pass filter has a multilayer structure made up of such 27 layers as mentioned below; however, the design wavelength is 780 nm.

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | $TiO_2$ | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | $TiO_2$ | 95.13 | 1.13 |
| 25th layer | $SiO_2$ | 160.97 | 1.20 |
| 26th layer | $TiO_2$ | 99.34 | 1.18 |
| 27th layer | $SiO_2$ | 87.19 | 0.65 |

Air

Figure 23:
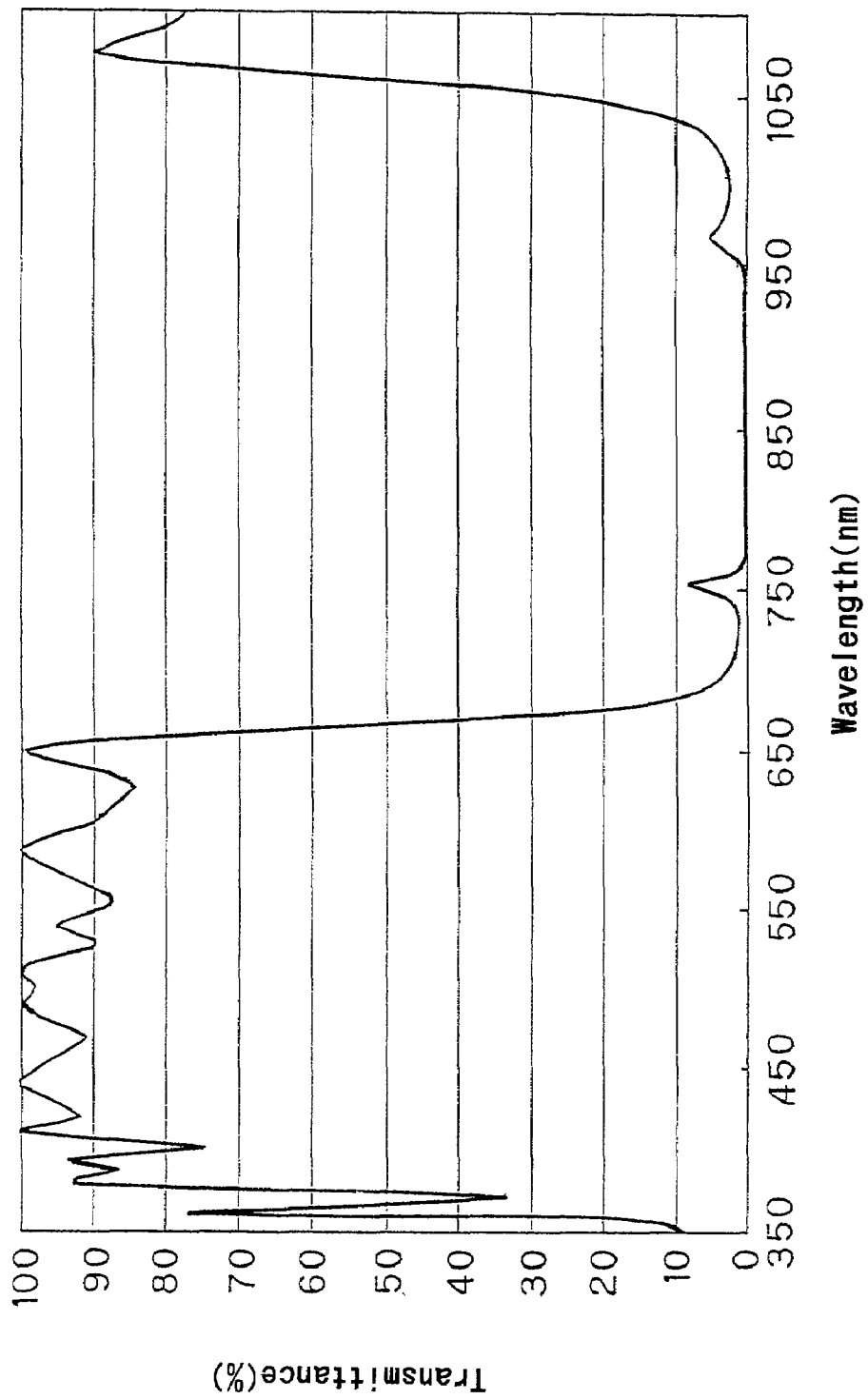
FIG. 23 is a diagram indicative of the transmittance characteristics of one example of the near-infrared sharp cut coat.

The aforesaid near-infrared sharp cut coat has such transmittance characteristics as shown in FIG. 23.

Figure 24:
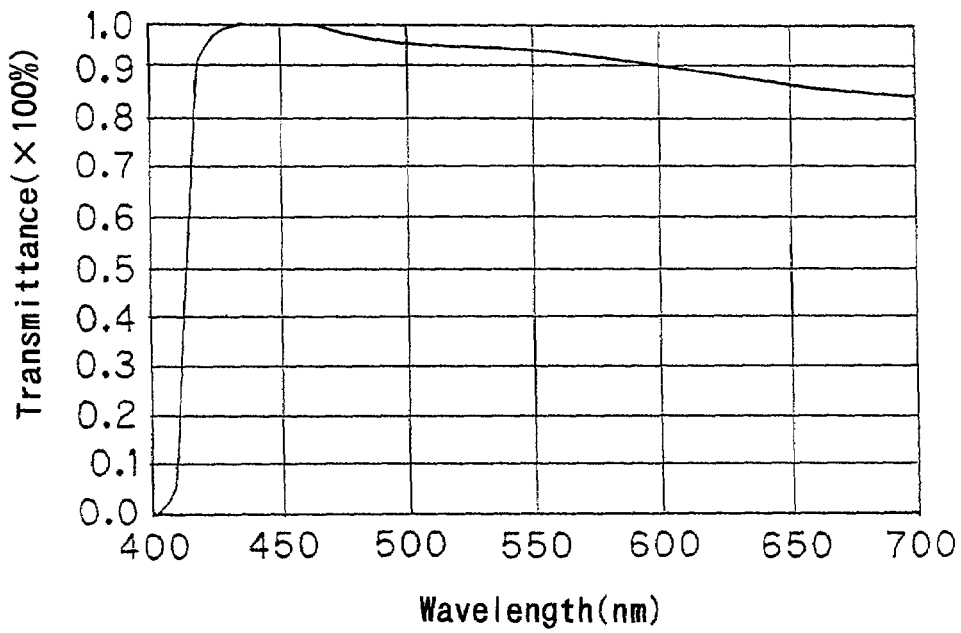
FIG. 24 is a diagram indicative of the transmittance characteristics of one example of the color filter located on the exit surface side of the low-pass filter.

The low-pass filter LF is provided on its exit surface side with a color filter or coat for reducing the transmission of colors at such a short wavelength band as shown in FIG. 24, thereby enhancing the color reproducibility of electronic images.

Preferably, such a filter or coat should be such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. When the ratio of the 420 nm wavelength transmittance is less than 15%, a wavelength region perceivable by the human eyes is less likely to be reproduced, putting colors in an ill-balanced state.

Such means for limiting wavelengths can be more effective for image pickup systems using a complementary mosaic filter.

In each of the aforesaid examples, coating is applied in such a way that, as shown in FIG. 24, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by a μm in the horizontal direction and by SQRT(½)×a in the ±45° direction for the purpose of moiré control, wherein SQRT means a square root as already mentioned.

Figure 25:
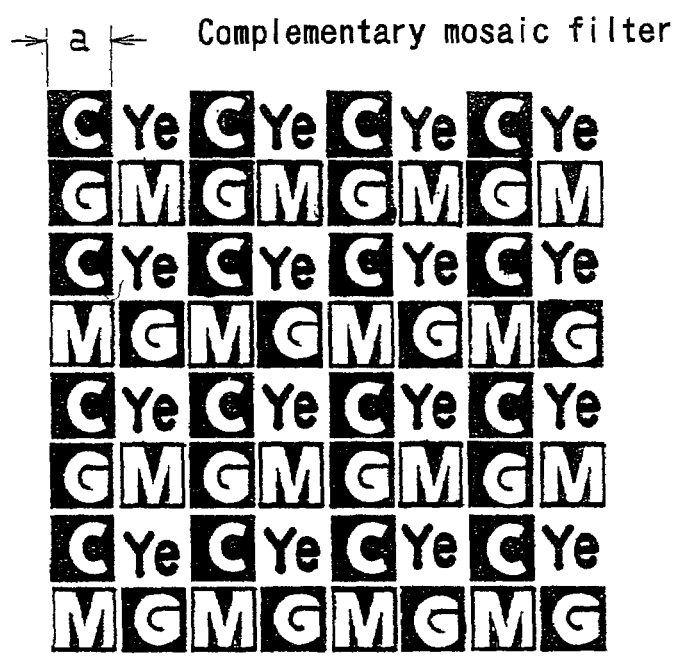
FIG. 25 is a schematic illustrative of how the color filter elements are arranged in the complementary mosaic filter.

The image pickup plane I of a CCD is provided thereon with a complementary mosaic filter wherein, as shown in FIG. 25, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary mosaic filter is composed of at least four different color filter elements, as shown in FIG. 25, which should preferably have such characteristics as given below.

Each green color filter element G has a spectral strength peak at a wavelength $G_P$, each yellow filter element Ye has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

$$510 \text{ nm} < G_P < 540 \text{ nm}$$

$$5 \text{ nm} < Y_P - G_P < 35 \text{ nm}$$

$$-100 \text{ nm} < C_P - G_P < -5 \text{ nm}$$

$$430 \text{ nm} < M_{P1} < 480 \text{ nm}$$

$$580 \text{ nm} < M_{P2} < 640 \text{ nm}$$

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 26:
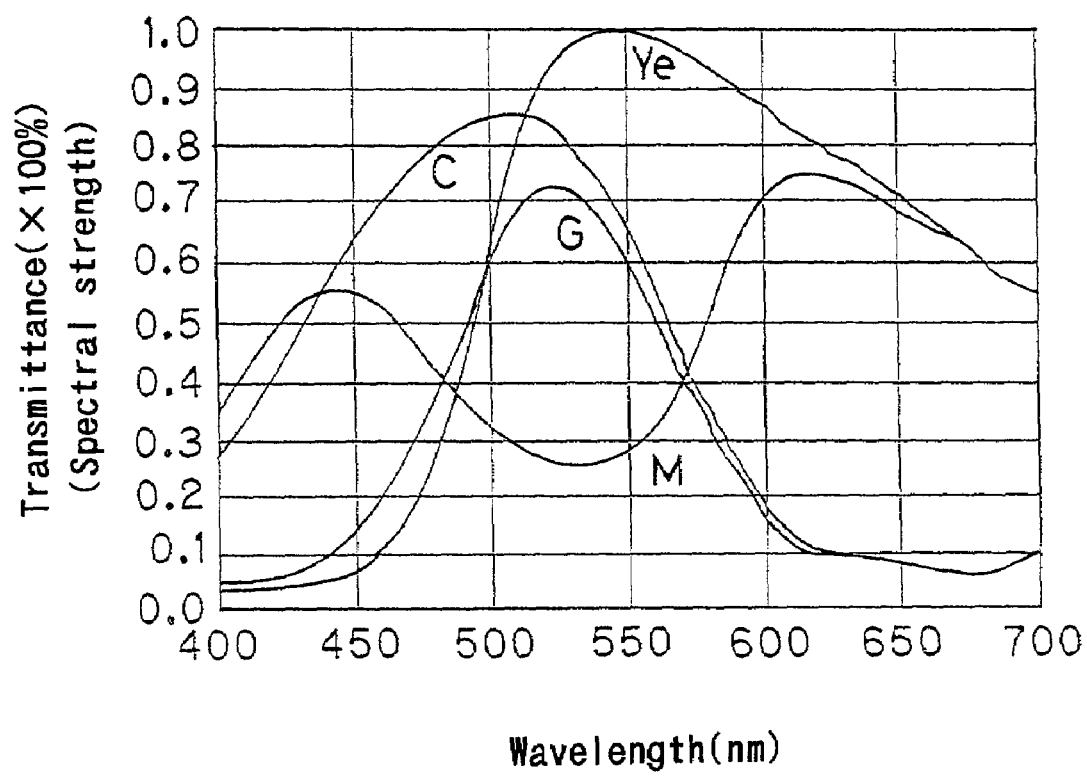
FIG. 26 is a diagram indicative of one example of the wavelength characteristics of the complementary mosaic filter.

One example of the wavelength characteristics in the aforesaid respective examples is shown in FIG. 26. The green filter element G has a spectral strength peak at 525 nm. The yellow filter element Ye has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for Ye, 97% for C and 38% for M.

For such a complementary filter, such signal processing as mentioned below is electrically carried out by means of a controller (not shown) (or a controller used with digital cameras).

For luminance signals, $$Y=|G+M+Ye+C|\times\frac{1}{4}$$

For chromatic signals, $$R-Y=|(M+Ye)-(G+C)|$$

$$B-Y=|(M+C)-(G+Ye)|$$

Through this signal processing, the signals from the complementary filter are converted into R (red), G (green) and B (blue) signals.

In this regard, it is noted that the aforesaid near-infrared sharp cut coat may be located anywhere on the optical path, and that the number of low-pass filters F may be either two as mentioned above or one.

Figure 27:
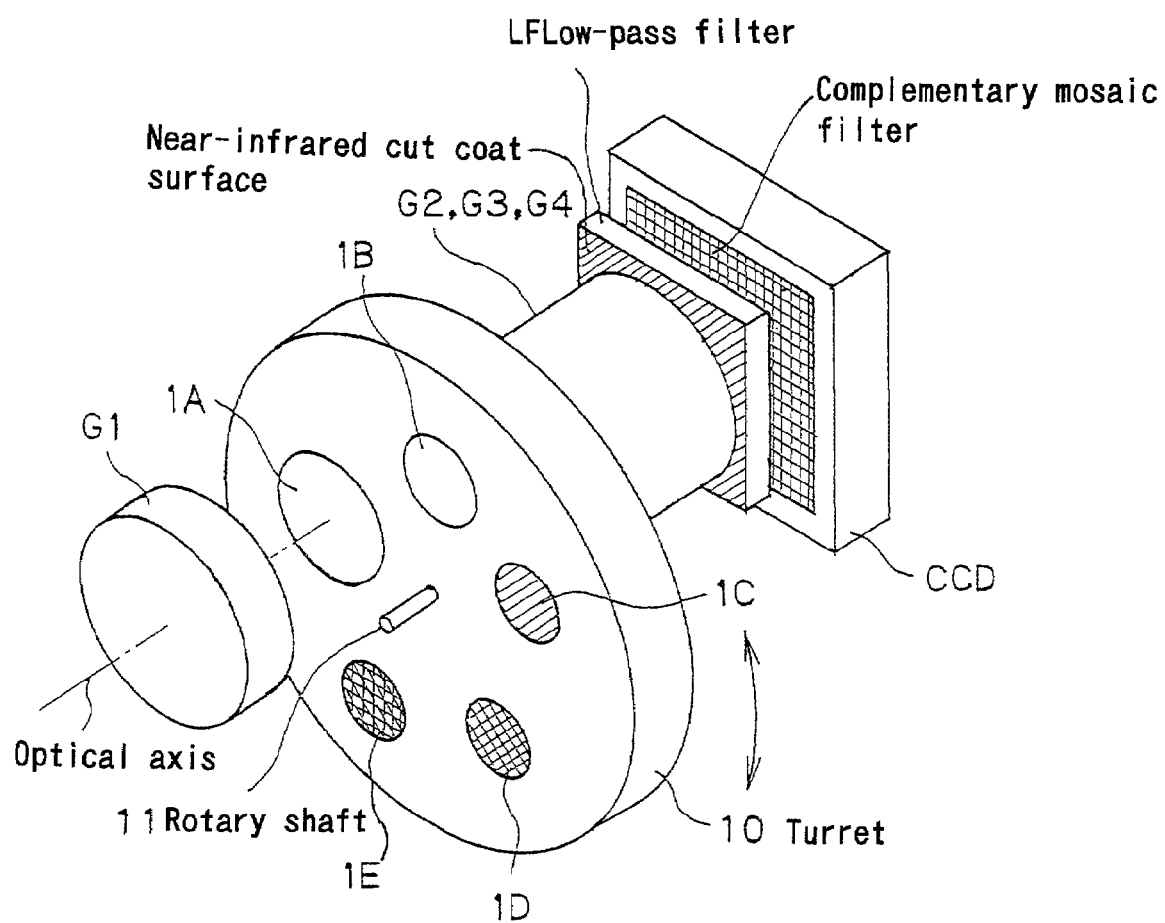
FIG. 27 is a detailed perspective view illustrative of one example of the aperture stop portion in each example.

One typical detailed aperture stop portion in each example is shown in FIG. 27. At the stop position on the optical axis between the first lens group G1 and the second lens group G2 forming part of the image pickup optical system, there is located a turret 10 capable of making five-stage brightness adjustments at 0, −1, −2, −3 and −4 stages. The turret 10 is provided with a 0 stage adjustment opening 1A having a fixed circular aperture shape of about 4 mm in diameter (which has a 550 nm wavelength transmittance of 100%), a −1 stage correction opening 1B having an aperture area about half that of the opening 1A and a fixed aperture shape and comprising a transparent plane-parallel plate (having a 550 nm wavelength transmittance of 99%) and −2, −3, −4 stage correction openings 1C, 1D and 1E provided with ND filters having a 550 nm wavelength transmittance of 50%, 25% and 13%, respectively.

The turret 10 is rotated around its rotating shaft 11 to locate any one of the openings at the stop position for light quantity adjustments.

In the opening, there is also located an ND filter designed to have a 550 nm wavelength transmittance of less than 80% when the effective F-number or $F_{no}'$ is $F_{no}'>a/0.4$ μm. More specifically in Example 1, it is when the effective F-number at the −2 stage is 9.0 upon stop-in (the 0 stage) that the effective F-number at the telephoto end meets the aforesaid formula. The then opening is 1C, so that any image degradation due to diffraction phenomena by the stop is suppressed.

Figure 28:
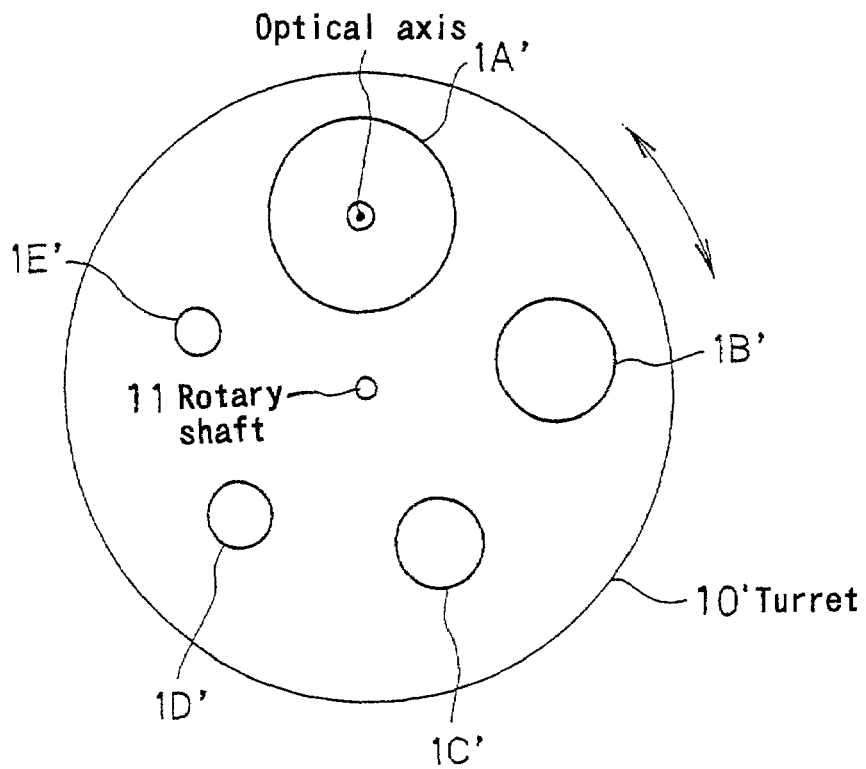
FIGS. 28(a) and 28(b) are illustrative in detail of another example of the aperture stop in each example.
Figure 28:
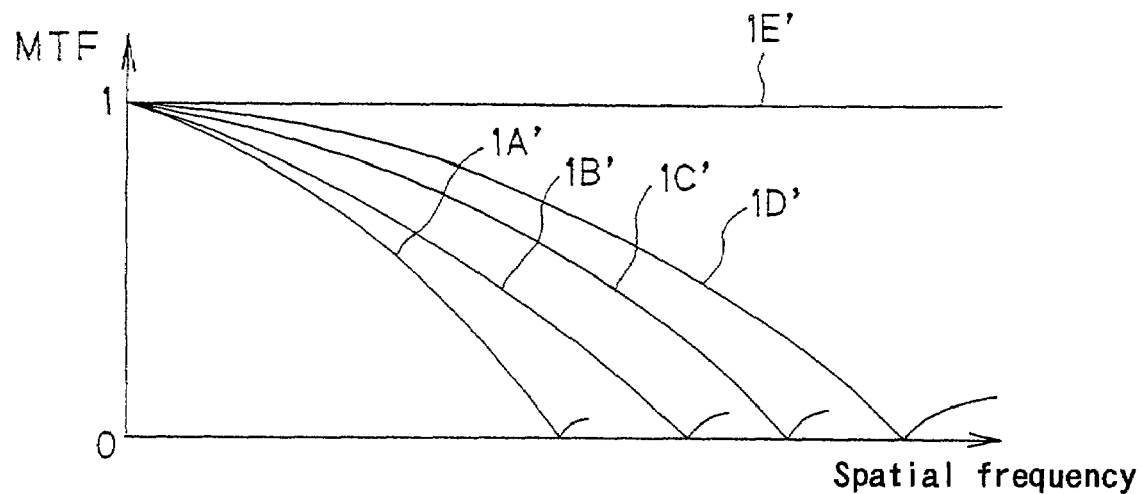

As shown, a turret 10' of FIG. 28(a) may be used in place of the turret of FIG. 27. This turret 10' is capable of making five-stage brightness adjustments at 0, −1, −2, −3 and −4 stages, and located at an aperture stop position on the optical axis between the first lens group G1 and the second lens group G2 forming part of the image pickup optical system. The turret 10' is provided with a 0-stage adjustment opening 1A' having a circular fixed aperture shape of about 4 mm in diameter, a −1 stage correction opening 1B' having an aperture area about half that of the opening 1A' and a fixed aperture shape, and −2, −3 and −4 stage correction openings 1C', 1D' and 1E' having a decreasing area in this order. The turret 10' is rotated around its rotating shaft 11 to locate any one of the openings at the stop position for light quantity adjustments.

A plurality of such openings 1A' to 1D' are each provided with an optical low-pass filter having different spatial frequency characteristics. As shown in FIG. 28(b), the arrangement is such that the smaller the aperture diameter, the higher the spatial frequency characteristics of the optical filter, thereby reducing any image degradation due to diffraction phenomena by stop-down. The respective curves in FIG. 28(b) show the spatial frequency characteristics of the low-pass filters alone. In this regard, it is noted that the characteristics of the openings inclusive of diffractions by the stops are all equally determined.

The electronic image pickup system constructed as described above may be applied to phototaking systems where object images formed through image-formation optical systems such as zoom lenses are received at image pickup devices such as CCDs or silver salt films, especially, digital cameras or video cameras as well as PCs and telephone sets which are typical information processors, in particular, easy-to-carry cellular phones. Given below are some such embodiments.

Figure 29:
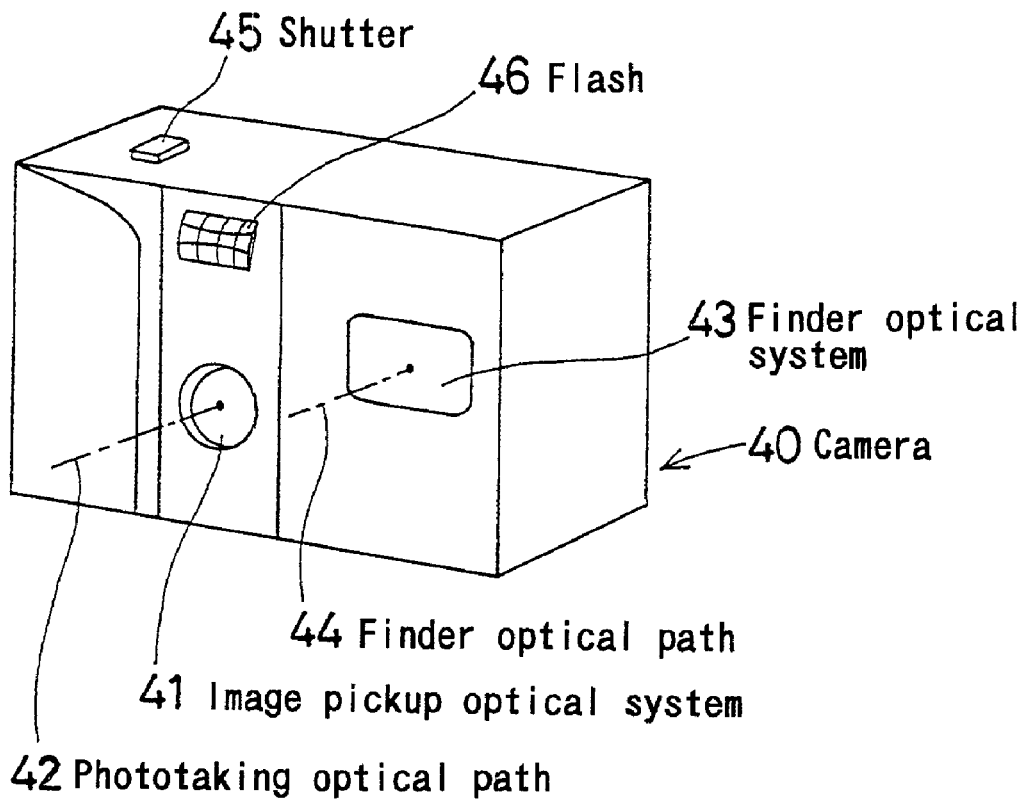
FIG. 29 is a front perspective schematic illustrative of the outside shape of a digital camera with the inventive optical path-bending zoom optical system built therein.
Figure 30:
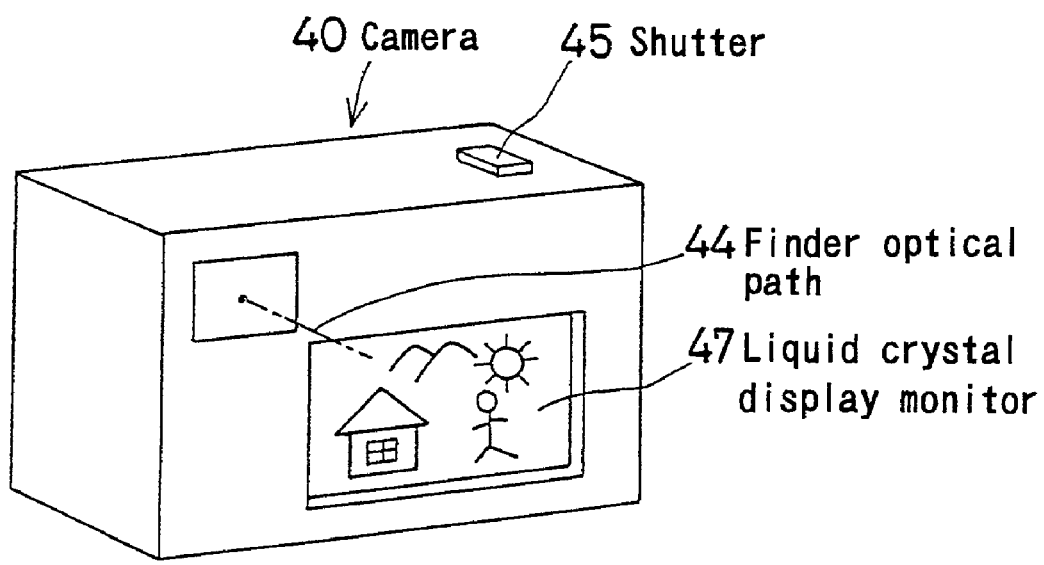
FIG. 30 is a rear perspective schematic of the digital camera of FIG. 29.
Figure 31:
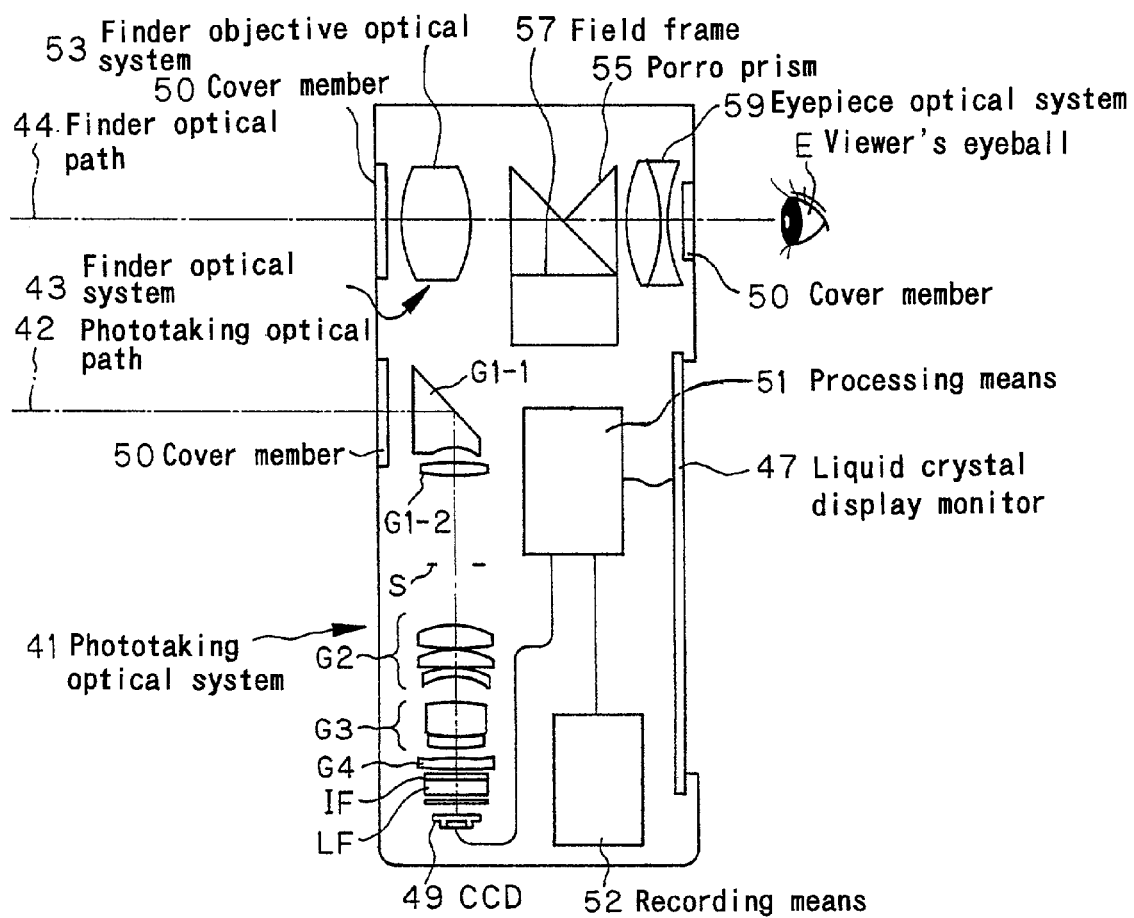
FIG. 31 is a sectional schematic of the digital camera of FIG. 29.

FIGS. 29 to 31 are conceptual illustrations of a phototaking optical system 41 for digital cameras, in which the image-formation optical system of the invention is incorporated. FIG. 29 is a front perspective view of the outside shape of a digital camera 40, and FIG. 30 is a rear perspective view of the same. FIG. 31 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the optical path bending zoom optical system according to Example 2. An object image formed by the phototaking optical system 41 is formed on the image pickup plane of a CCD 49 via a near-infrared cut filter IF and an optical low-pass filter. The object image received at CCD 49 is displayed as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver salt camera using a silver salt camera in place of CCD 49.

Moreover, a finder objective optical system 53 is located on the finder optical path 44. An object image formed by the finder objective optical path 53 is in turn formed on the field frame 57 of a Porro prism 55 that is an image erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 31, plane-parallel plates are used as the cover members 50; however, it is acceptable to use powered lenses.

Figure 32:
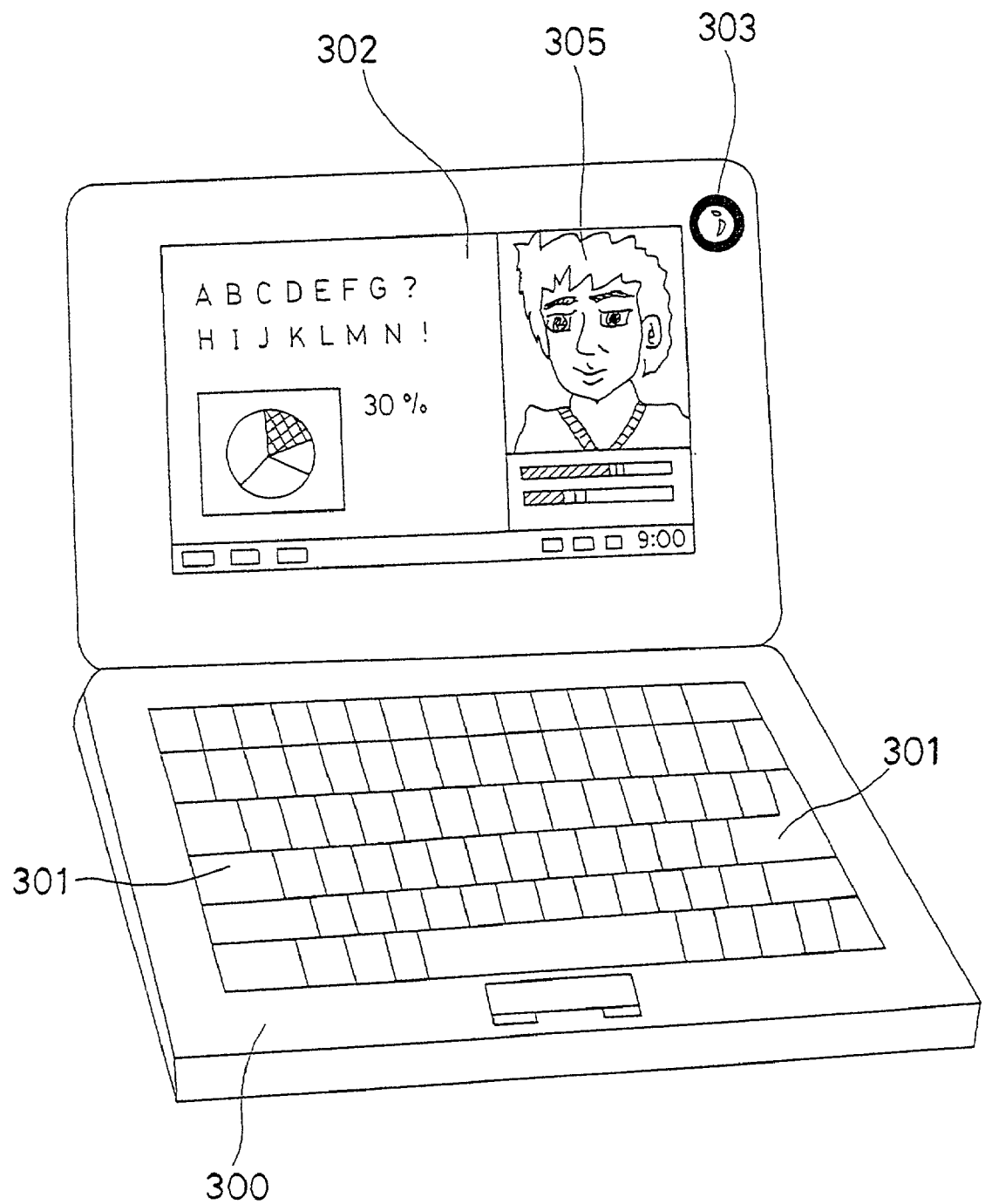
FIG. 32 is a front perspective view of an uncovered personal computer in which the inventive optical path-bending zoom optical system is built in the form of an objective optical system.
Figure 33:
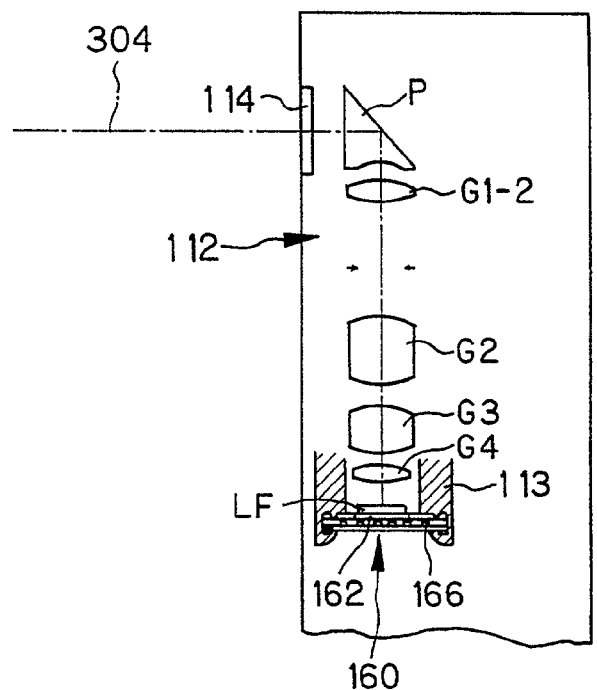
FIG. 33 is a sectional schematic of a phototaking optical system for a personal computer.
Figure 34:
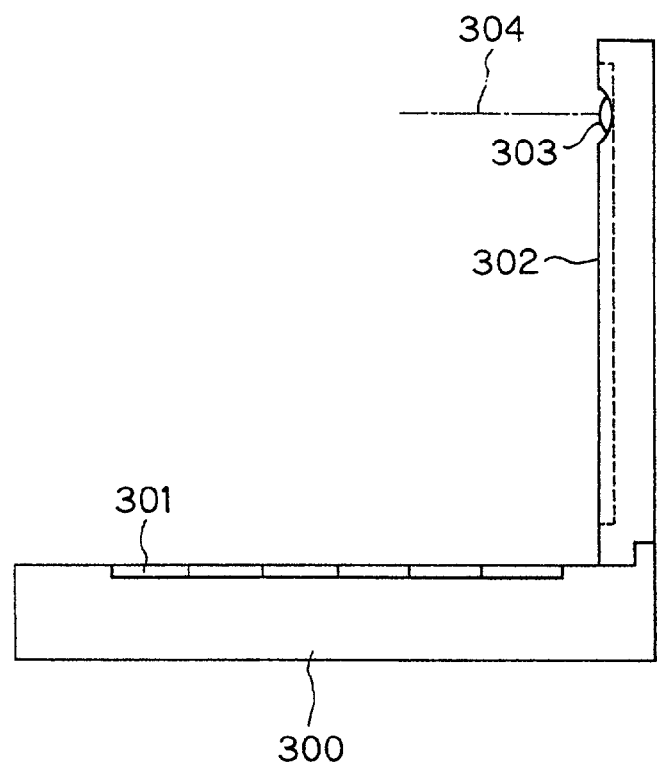
FIG. 34 is a side view of FIG. 32.

FIGS. 32 to 34 illustrates a personal computer that is one embodiment of information processors in which the image-formation optical system of the invention is built in the form of an objective optical system. FIG. 32 is a front perspective view of a personal computer or PC 300 in an uncovered state, FIG. 34 is a sectional view of a phototaking optical system 303 in PC 300, and FIG. 34 is a side view of FIG. 32. As shown in FIGS. 32 to 34, PC 300 comprises a keyboard 301 for allowing an operator to enter information therein from outside, information processing and recording means (not illustrated), a monitor 302 for displaying the information to the operator, and a phototaking optical system 303 for phototaking an image of the operator per se and nearby images. The monitor 302 used herein may be a transmission type liquid crystal display illuminated from its back side by means of a backlight (not shown), a reflection type liquid crystal display designed to reflect light from its front side for display purposes, a CRT display or the like. As shown, the phototaking optical system 303 is built in the right upper portion of the monitor 302; however, it may be located at any desired position, for instance, around the monitor 302 or the keyboard 301.

This phototaking optical system 303 comprises an objective lens 112 mounted on a phototaking optical path 304 and formed of the optical path-bending zoom optical system of the invention (roughly shown) and an image pickup chip 162 for receiving images, which are built in PC 300.

In this embodiment, a low-pass filter LF is additionally applied onto the image pickup chip 162 to form a one-piece unit 160 that can be mounted at the rear end of the lens barrel 113 of the objective lens 112 in one-touch snap operation. Thus, any centering or inter-surface adjustment for the objective lens 112 and image pickup chip 162 can be dispensed with, and so smooth assembly is achieved. Further, the lens barrel 113 is provided at the other end with a cover glass 114 for protection of the objective lens 112. It is here noted that the zoom lens drive mechanism in the lens barrel 113 is not shown.

An object image received at the image pickup chip 162 is entered into the processing means of PC 300 via a terminal 166 and displayed as an electronic image on the monitor 302. As an example, an image 305 phototaken of the operator is shown in FIG. 32. The image 305 may be displayed on a personal computer on the other end of the line by way of processing means and the Internet or a telephone.

Figure 35:
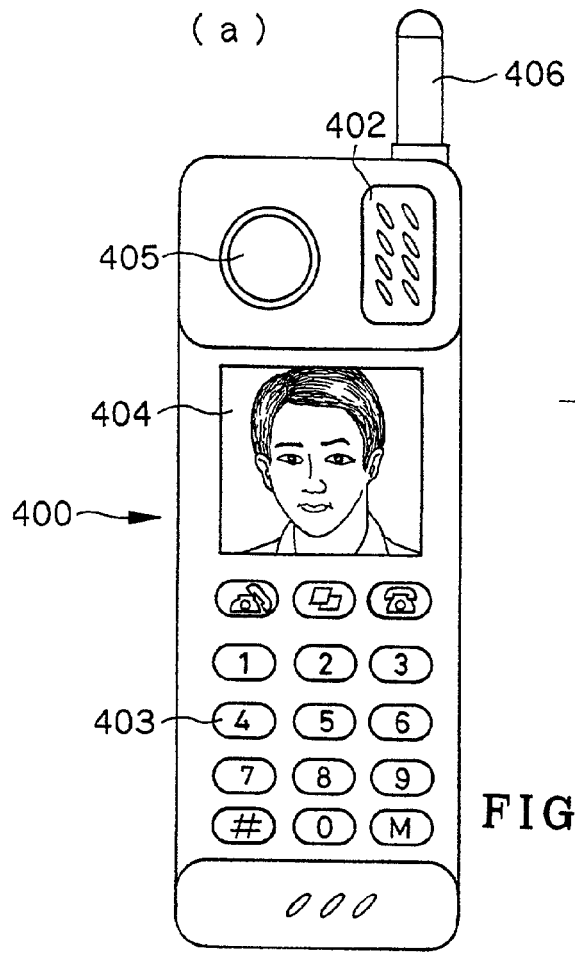
FIGS. 35(a) to 35(c) are a front and a side view of a cellular phone with the inventive optical path-bending zoom optical system built in as an objective optical system, and a sectional view of a phototaking optical system therefore, respectively.
Figure 35:
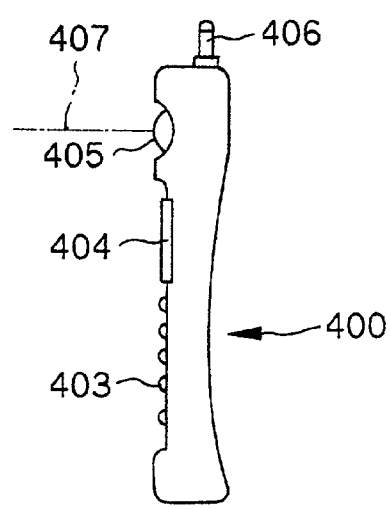
Figure 35:
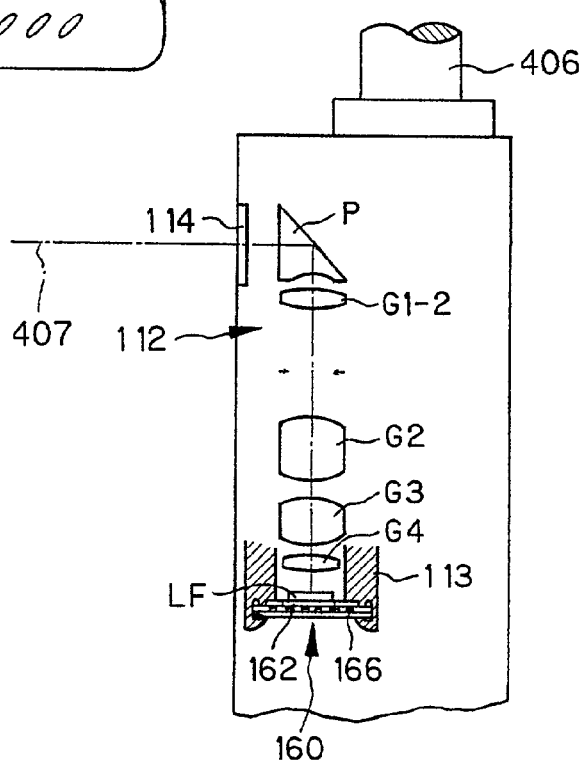

FIG. 35 is illustrative of a telephone set, especially a convenient-to-carry cellular phone that is one exemplary information processor in which the image-formation optical system of the invention is built as a phototaking optical system. FIGS. 35(*a*) and 35(*b*) are a front view and a side view of a cellular phone 400, and FIG. 35(*c*) is a sectional view of a phototaking optical system 405. As shown in FIGS. 35(*a*) to 35(*c*), the cellular phone 400 comprises a microphone 401 through which the voice of an operator is entered as information, a speaker 402 through which the voice of a person on the other end of the like is produced, an input dial 403 through which the information is entered by the operator, a monitor 404 for displaying images phototaken of the operator per se, the person on the other end of the line and so on as well as information such as telephone numbers, a phototaking optical system 405, an antenna 406 for transmission and reception of radio waves for communications, and processing means (not shown) for processing image information, communications information, input signals, etc. Here a liquid crystal display is used for the monitor 404. How the respective devices are arranged is not particularly limited to the arrangement shown in FIG. 41. This phototaking optical system 405 comprises an objective lens 112 mounted on a phototaking optical path 407 and formed of the optical path-bending zoom optical system of the invention (roughly shown) and an image pickup chip 162 for receiving object images, which are built in the cellular phone 400.

In this embodiment, a low-pass filter LF is additionally applied onto the image pickup chip 162 to form a one-piece unit 160 that can be mounted at the rear end of the lens barrel 113 of the objective lens 112 in one-touch snap operation. Thus, any centering or inter-surface adjustment for the objective lens 112 and image pickup chip 162 can be dispensed with, and so smooth assembly is achieved. Further, the lens barrel 113 is provided at the other end (not shown) with a cover glass 114 for protection of the objective lens 112. It is here noted that the zoom lens drive mechanism in the lens barrel 113, etc. are not shown.

An object image received at the image pickup chip 162 is entered into processing means (not shown) via a terminal 166, so that the image is displayed as an electronic image on the monitor 404 and/or a monitor on the other end of the line. To transmit the image to the person on the other end, the signal processing means has a signal processing function of converting information on the object image received at the image pickup chip 162 to transmittable signals.

As can be appreciated from the foregoing explanation, the present invention can provide a zoom lens that is received in a lens mount with smaller thickness and efficiency, has high magnifications and is excellent in image-formation capability even on rear focusing, and enables video cameras or digital cameras to be thoroughly slimmed down.

What we claim is:

1. An electronic image pickup apparatus, comprising:
   an optical path-bending zoom optical system and an electronic image pickup device, said optical path-bending zoom optical system comprising:
   at least one negative lens group,
   at least one positive lens group that moves only toward an object side of said optical path-bending zoom optical system for zooming from a wide-angle end to a telephoto end of said optical path-bending zoom optical system,
   a final lens group located on an image side with respect to said positive lens group and nearest to an image plane side in said optical path-bending zoom optical system, and
   only one reflecting optical element for bending an optical path, which element has a fixed shape and is located on said object side with respect to all lens groups movable during zooming,
   wherein only one lens group is disposed on an object side with respect to said at least one positive lens group that moves only toward the object side of said optical path-bending zoom optical system, and
   wherein said only one lens group is a negative lens group of said at least one negative lens group which is disposed on a most object side of said optical path-bending zoom optical system, and
   wherein said electronic image pickup device is disposed on said image side of said optical path-bending zoom optical system.

2. An electronic image pickup apparatus, comprising:
an optical path-bending zoom optical system and an electronic image pickup device, said optical path-bending zoom optical system comprising:
  at least one negative lens group,
  at least one positive lens group that moves only toward an object side of said optical path-bending zoom optical system for zooming from a wide-angle end to a telephoto end of said optical path-bending zoom optical system, and
  only one reflecting optical element for bending an optical path, which element has a fixed shape and is located on said object side with respect to all lens groups movable during zooming,
wherein said electronic image pickup device is disposed on an image side of said optical path-bending zoom optical system,
and wherein only one lens group is disposed on an object side with respect to said at least one positive lens group that moves only toward the object side of said optical path-bending zoom optical system,
and wherein said only one lens group is a partial optical system having said reflecting optical element and located on said object side with respect to said all lens groups movable during zooming, has a negative combined focal length.

3. An electronic image pickup apparatus, comprising:
an optical path-bending zoom optical system and an electronic image pickup device, said optical path-bending zoom optical system comprising:
  at least one negative lens group,
  at least one positive lens group that moves only toward an object side of said optical path-bending zoom optical system for zooming from a wide-angle end to a telephoto end of said optical path-bending zoom optical system, and
  at least one reflecting optical element for bending an optical path, which element is located on said object side with respect to all lens groups movable during zooming,
wherein said electronic image pickup device is disposed on an image side of said optical path-bending zoom optical system,
and wherein said reflecting optical element is a cemented prism in which a plano-concave lens is cemented to a planar portion of a prism having said planar portion.

4. An electronic image pickup apparatus, comprising:
an optical path-bending zoom optical system and an electronic image pickup device, said optical path-bending zoom optical system comprising:
  at least one negative lens group,
  at least one positive lens group that moves only toward an object side of said optical path-bending zoom optical system for zooming from a wide-angle end to a telephoto end of said optical path-bending zoom optical system, and
  only one reflecting optical element for bending an optical path, which element has a fixed shape and is located on said object side with respect to all lens groups movable during zooming,
wherein said electronic image pickup device is disposed on an image side of said optical path-bending zoom optical system,
and wherein a positive lens is located nearest to said object side of said optical path-bending zoom optical system.

5. An electronic image pickup apparatus, comprising:
an optical path-bending zoom optical system and an electronic image pickup device, said optical path-bending zoom optical system comprising:
  at least one negative lens group,
  at least one positive lens group that moves only toward an object side of said optical path-bending zoom optical system for zooming from a wide-angle end to a telephoto end of said optical path-bending zoom optical system, and
  at least one reflecting optical element for bending an optical path, which element is located on said object side with respect to all lens groups movable during zooming,
wherein only one lens group is disposed on an object side with respect to said at least one positive lens group that moves only toward the object side of said optical path-bending zoom optical system, and
wherein said only one lens group is a negative lens group of said at least one negative lens group which is disposed on a most object side of said optical path-bending zoom optical system,
wherein said electronic image pickup device is disposed on an image side of said optical path-bending zoom optical system,
wherein said optical path-bending zoom optical system includes a final lens group having an aspheric single lens, and
wherein said final lens group is provided nearest to an image plane side of said optical path-bending zoom optical system.

6. The electronic image pickup apparatus according to claim 5,
wherein said final lens group is fixed.

7. An electronic image piekup apparatus comprising:
an optical path-bending zoom optical system and an electronic image pickup device, said optical path-bending zoom optical system comprising:
  at least one negative lens group,
  at least one positive lens group that moves only toward an object side of said optical path-bending zoom optical system for zooming from a wide-angle end to a telephoto end of said optical path-bending zoom optical system, and
  only one reflecting optical element for bending an optical path, which element is located on said object side with respect to all lens groups movable during zooming,
wherein said electronic image pickup device is disposed on an image side of said optical path-bending zoom optical system,
wherein a final lens group is provided nearest to an image plane side of said optical path-bending zoom optical system, and
wherein focusing is carried out with said second lens group or subsequent lens group except said final lens group.

8. An electronic image pickup apparatus comprising:
an optical path-bending zoom optical system and an electronic image pickup device, said optical path-bending zoom optical system comprising:
  at least one negative lens group,
  at least one positive lens group that moves only toward an object side of said optical path-bending zoom optical system for zooming from a wide-angle end to a telephoto end of said optical path-bending zoom optical system; and only one reflecting optical element for bending an optical path, which element is located on said object side with respect to all lens groups movable during zooming, wherein said electronic image pickup device is disposed on an image side of said optical path bending zoom optical system, wherein a final lens group is provided nearest to an image plane side of said optical path-bending zoom optical system, and wherein focusing is carried out with a second lens group as counted from said final lens group toward the object side.

9. The electronic image pickup apparatus according to claim 8, wherein an axial air spacing $D_{FT}$ upon being focused on an object point at infinity at telephoto ends of a second lens group and a third lens group as counted from said final lens group toward the object side satisfies the following condition:

$$0.1 < D_{FT}/f_T < 1.5 \qquad (b)$$

where $f_T$ is a focal length of the zoom optical system at the telephoto end upon focused on an object point at infinity.

10. An electronic image pickup apparatus comprising:
an optical path-bending zoom optical system and an electronic image pickup device, said optical path-bending zoom optical system comprising:
at least one negative lens group,
at least one positive lens group that moves only toward an object side of said optical path-bending zoom optical system for zooming from a wide-angle end to a telephoto end of said optical path-bending zoom optical system; and
only one reflecting optical element for bending an optical path, which element has a fixed shape and is located on said object side with respect to all lens groups movable during zooming,
wherein only one lens group is disposed on an object side with respect to said at least one positive lens group that moves only toward the object side of said optical path-bending zoom optical system, and
wherein said only one lens group is a negative lens group of said at least one negative lens group which is disposed on a most object side of said optical path-bending zoom optical system,
wherein said electronic image pickup device is disposed on an image side of said optical path-bending zoom optical system,
and wherein a filter using a near-infrared sharp cut coat having a transmittance of at least 80% at 600 nm and a transmittance of up to 10% at 700 nm is disposed on an object side with respect to said electronic image pickup device in the rear of said optical path-bending zoom optical system.

11. The electronic image pickup apparatus according to claim 10, wherein said electronic image pickup device comprises a complementary mosaic filter.

12. An electronic image pickup apparatus, comprising:
an optical path-bending zoom optical system and an electronic image pickup device, said optical path-bending zoom optical system comprising:
at least one negative lens group,
at least one positive lens group that moves only toward an object side of the optical path-bending zoom optical system for zooming from a wide-angle end to a telephoto end of the optical path-bending zoom optical system,
a final lens group located on an image side with respect to said positive lens group and nearest to an image plane side in said optical path-bending zoom optical system, and
at least one reflecting optical element for bending an optical path, which element is located on said object side with respect to all lens groups that move upon zooming,
wherein said electronic image pickup device is disposed on said image side of the zoom optical system,
and wherein on said object side with respect to said electronic image pickup device in the rear of said optical path-bending zoom optical system, there is disposed an optical low-pass filter whose total thickness, tLPF in mm, satisfies the following condition (f):

$$0.15a < t_{LPF} < 0.45a \qquad (f)$$

where a is a horizontal pixel pitch in p.m of said electronic image pickup device, and is 5 μm or less.

13. An electronic image pickup apparatus, comprising:
an optical path-bending zoom optical system and an electronic image pickup device, said optical path-bending zoom optical system comprising:
at least one negative lens group,
at least one positive lens group that moves only toward an object side of the optical path-bending zoom optical system upon zooming from a wide-angle end to a telephoto end of the optical path-bending zoom optical system,
a final lens group located on an image side with respect to said positive lens group and nearest to an image plane side in said optical path-bending zoom optical system,
at least one reflecting optical element for bending an optical path, which element is located on said object side with respect to all lens groups that move upon zooming,
wherein said electronic image pickup device is disposed on said image side of said optical path-bending zoom optical system,
and wherein on said object side with respect to said electronic image pickup device in the rear of said optical path-bending zoom optical system, there is disposed an optical low-pass filter whose total thickness, tLPF in mm, satisfies the following condition (f):

$$0.13a < t_{LPF} < 0.42a \qquad (f)$$

where a is a horizontal pixel pitch in μm of said electronic image pickup device, and is 5 μm or less.

14. An electronic image pickup apparatus, comprising:
an optical path-bending zoom optical system and an electronic image pickup device, said optical path-bending zoom optical system comprising:
at least one negative lens group,
at least one positive lens group that moves only toward an object side of said optical path-bending zoom optical system for zooming from a wide-angle end to a telephoto end of said optical path-bending zoom optical system,
a final lens group located on an image side with respect to said positive lens group and nearest to an image plane side in said optical path-bending zoom optical system, and
only one reflecting optical element for bending an optical path, which element has a fixed shape and is located on said object side with respect to all lens groups movable during zooming, wherein said electronic image pickup device is disposed on said image side of said optical path-bending zoom optical system, an aperture unit and a moving member, wherein:

a first lens group corresponds to one of said at least one negative lens group, a second lens group corresponds to one of said at least one positive lens group, and a third lens group corresponds to said final lens group and, located in order from said object side to said image side in this order, said aperture unit includes a plurality of apertures, said moving member moves said aperture unit across an optical axis of said optical path-bending zoom optical system, each of said plurality of apertures has a fixed shape, and only one aperture out of said plurality of apertures can be inserted over any one of optical paths between a lens surface located in the first lens group and nearest to the image side thereof and a lens surface located in the third lens group and nearest to the object side thereof.

15. An electronic image pickup apparatus comprising:

an optical path-bending zoom optical system and an electronic image pickup device, said optical path-bending zoom optical system comprising:

at least one negative lens group;

at least one positive lens group that moves only toward an object side of said optical path-bending zoom optical system for zooming from a wide-angle end to a telephoto-angle end of said optical path-bending zoom optical system;

a final lens group located on an image side with respect to said positive lens group and nearest to an image plane side in said optical path-bending zoom optical system; and at least one reflecting optical element for bending an optical path, which element is located on said object side with respect to all lens groups movable during zooming;

wherein said electronic image pickup device is disposed on said image side of said optical path-bending zoom optical system, and includes an aperture unit and a moving member, and wherein:

a first lens group corresponds to one of said at least one negative lens group, a second lens group corresponds to one of said at least one positive lens group, and a third lens group corresponds to said final lens group and, located in order from said object side to said image side in this order, said aperture unit includes a plurality of apertures, said moving member moves said aperture unit across an optical axis of said optical path-bending zoom optical system, each of said plurality of apertures has a fixed shape, and only one aperture out of said plurality of apertures can be inserted over any one of optical paths between a lens surface located in the first lens group and nearest to the image side thereof and a lens surface located in the third lens group and nearest to the object side thereof, and some of said plurality of apertures are filled with a medium, one aperture being filled with said medium has a transmittance which is less than 80% at 550 nm wavelength, and another aperture filled with said medium has a transmittance which is 80% or greater at 550 nm wavelength.

16. An electronic image pickup apparatus comprising:

an optical path-bending zoom optical system and an electronic image pickup device, said optical path-bending zoom optical system comprising:

at least one negative lens group;

at least one positive lens group that moves only toward an object side of said optical path-bending zoom optical system for zooming from a wide-angle end to a telephoto-angle end of said optical path-bending zoom optical system;

a final lens group located on an image side with respect to said positive lens group and nearest to an image plane side in said optical path-bending zoom optical system; and at least one reflecting optical element for bending an optical path, which element is located on said object side with respect to all lens groups movable during zooming, wherein said electronic image pickup device is disposed on said image side of said optical path-bending zoom optical system, and includes an aperture unit and a moving member, and wherein:

a first lens group corresponds to one of said at least one negative lens group, a second lens group corresponds to one of said at least one positive lens group, and a third lens group corresponds to said final lens group and, located in order from said object side to said image side in this order, said aperture unit includes a plurality of apertures, said moving member moves said aperture unit across an optical axis of said optical path-bending zoom optical system, each of said plurality of apertures has a fixed shape, and only one aperture out of said plurality of apertures can be inserted over any one of optical paths between a lens surface located in the first lens group and nearest to the image side thereof and a lens surface located in the third lens group and nearest to the object side thereof, some of said plurality of apertures are filled with a medium, a given aperture being filled with said medium has a transmittance which is less than 80% at 550 nm wavelength, said electronic image pickup apparatus has a state that light quantity adjustment is achieved by inserting said given aperture in said optical path, and wherein in said state said electronic image pickup apparatus satisfies the following condition:

$$F_{no}' > a(\mu m)/0.4\ \mu m$$

wherein $F_{no}'$ is an effective F-number defined by the equation $F_{no}' = F_{no}/\sqrt{T}$, where $F_{no}$ is an F-number determined by a focal length of said optical path-bending zoom optical system and an entrance pupil diameter, T is a transmittance of said given aperture at 550 nm wavelength, and a is a horizontal pixel pitch of said electronic image pickup device.

17. An electronic image pickup apparatus comprising:

optical path-bending zoom optical system and an electronic image pickup device, said optical path-bending zoom optical system comprising:

at least one negative lens group;

at least one positive lens group that moves only toward an object side of said optical path-bending zoom optical system for zooming from a wide-angle end to a telephoto-angle end of said optical path-bending zoom optical system;

a final lens group located on an image side with respect to said positive lens group and nearest to an image plane side in said optical path-bending zoom optical system; and at least one reflecting optical element for bending an optical path, which element is located on said object side with respect to all lens groups movable during zooming, said electronic image pickup device is disposed on said image side of said optical path-bending zoom optical system, and includes an aperture unit and a moving member, wherein:

a first lens group corresponds to one of said at least one negative lens group, a second lens group corresponds to one of said at least one positive lens group, and a third lens group corresponds to said final lens group and, located in order from said object side to said image side in this order, said aperture unit includes a plurality of apertures, said moving member moves said aperture unit across an optical axis of said optical path-bending zoom optical system, each of said plurality of apertures has a fixed shape, and only one aperture out of said plurality of apertures can be inserted over any one of optical paths between a lens surface located in the first lens group and nearest to the image side thereof and a lens surface located in the third lens group and nearest to the object side thereof, and said plurality of apertures are each provided therein with an optical low-pass filter having different spatial frequency properties.

18. The electronic image pickup apparatus according to claim 1, wherein when a lens mount is received in the zoom optical system, at least one lens other than the reflecting optical element is tilted to make the lens mount thinner than that at the time of phototaking.

19. An electronic image pickup apparatus comprising:

an optical path-bending zoom optical system and an electronic image pickup device, said optical path-bending zoom optical system comprising:

at least one negative lens group;

at least one positive lens group that moves only toward an object side of said optical path-bending zoom optical system for zooming from a wide-angle end to a telephoto-angle end of said optical path-bending zoom optical system;

a final lens group located on an image side with respect to said positive lens group and nearest to an image plane side in said optical path-bending zoom optical system; and at least one reflecting optical element for bending an optical path, which element is located on said object side with respect to all lens groups movable during zooming, wherein said electronic image pickup device is disposed on said image side of said optical path-bending zoom optical system, and wherein said reflecting optical element is constructed of a prism comprising a solid outer shell and a liquid filled therein, and said liquid is removable from said prism, thereby transforming said prism to a thin configuration and a lens is insertable in the resulting space.

20. An electronic image pickup apparatus, comprising:

an optical path-bending zoom optical system and an electronic image pickup device, said optical path-bending zoom optical system comprising:

at least one negative lens group, at least one positive lens group that moves only toward an object side of said optical path-bending zoom optical system for zooming from a wide-angle end to a telephoto end of said optical path-bending zoom optical system, a final lens group located on an image side with respect to said positive lens group and nearest to an image plane side in said optical path-bending zoom optical system, and only one reflecting optical element for bending an optical path, which element has a fixed shape and is located on said object side with respect to all lens groups movable during zooming, wherein said electronic image pickup device is disposed on said image side of said optical path-bending zoom optical system, and wherein said reflecting optical element is moved thereby varying a phototaking direction.

21. The electronic image pickup apparatus according to claim 1, wherein a finder optical system is provided separately from said optical path-bending zoom optical system.

22. The electronic image pickup apparatus according to claim 21, wherein said finder optical system comprises an objective optical system, a prism, and an eyepiece optical system.

23. The electronic image pickup apparatus according to claim 21, wherein said finder optical system includes an entrance window located before an objective optical system.

24. The electronic image pickup apparatus according to claim 21, wherein said finder optical system includes a cover member before an objective optical system.

25. The electronic image pickup apparatus according to claim 1, which comprises a processing means for displaying an image picked up by a CCD on a liquid crystal display monitor mounted on a back side of said electronic image pickup apparatus.

26. The electronic image pickup apparatus according to claim 1, wherein a cover member is located on an entrance side of a photo-taking optical system.

27. The electronic image pickup apparatus according to claim 1, which comprises a recording means for recording a photo-taken electronic image.

28. The electronic image pickup apparatus according to claim 1, which comprises a finder optical system, a processing means, a recording means, and a liquid crystal display monitor.

29. The electronic image pickup apparatus according to claim 1, which comprises a negative meniscus lens element located on an object side of said reflecting optical element.

30. The electronic image pickup apparatus according to claim 29, wherein said negative meniscus lens element is convex on an object side thereof.

31. The electronic image pickup apparatus according to claim 1, which comprises a positive lens element that remains fixed upon zooming, wherein said positive lens element is located just after and adjacent to an image side of said reflecting optical element.

32. The electronic image pickup apparatus according to claim 31, wherein said positive lens element located just after and adjacent to the image side of said reflecting optical element and remaining fixed upon zooming is a double-convex lens element.

33. The electronic image pickup apparatus according to claim 1, wherein at least one lens group that moves along an optical axis of said optical path-bending zoom optical system upon zooming comprises a positive lens element and a negative lens element.

34. The electronic image pickup apparatus according to claim 33, wherein said lens group comprising a positive lens element and a negative lens element is positioned nearer to the object side of said optical path-bending zoom optical system at a telephoto end of said optical path-bending zoom optical system, with a wide-angle end of said optical path-bending zoom optical system set as a reference.

35. The electronic image pickup apparatus according to claim 1, wherein a lens group that moves along an optical axis of said optical path-bending zoom optical system upon zooming comprises a meniscus lens component.

36. The electronic image pickup apparatus according to claim 35, wherein the meniscus lens component in the lens group that moves along said optical axis upon zooming is concave on an image side thereof.

37. The electronic image pickup apparatus according to claim 1, which comprises a positive lens element located just after and adjacent to an image side of an aperture stop.

38. The electronic image pickup apparatus according to claim 37, wherein said positive lens element located just after and adjacent to said image side of said aperture stop is constructed of only spherical surfaces.

39. The electronic image pickup apparatus according to claim 1, which comprises a fixed negative lens group located just before an object side of said reflecting optical element and a fixed lens group including a positive lens element and located just after an image side of said reflecting optical element.

40. The electronic image pickup apparatus according to claim 1, wherein at least one lens group of all lens groups that are movable upon zooming comprises a doublet component consisting of, in order from an object side thereof, a double-convex lens element and a double-concave lens element.

41. The electronic image pickup apparatus according to claim 40, wherein a stop is located between said doublet component and said reflecting optical element.

42. The electronic image pickup apparatus according to claim 1, which comprises a complementary colors mosaic filter.

43. An electronic image pickup apparatus comprising:
an optical path-bending zoom optical system and an electronic image pickup device, said optical path-bending zoom optical system comprising:
at least one negative lens group,
at least one positive lens group that moves only toward an object side of said optical path-bending zoom optical system for zooming from a wide-angle end to a telephoto end of said optical path-bending zoom optical system,
only one reflecting optical element for bending an optical path, which element has a fixed shape and is located on said object side with respect to all lens groups movable during zooming, and
at least one refracting surface located on said object side of said reflecting optical element,
wherein said electronic image pickup device is disposed on an image side of said optical path-bending zoom optical system wherein only one lens group is disposed on an object side with respect to said at least one positive lens group that moves only toward the object side of said optical path-bending zoom optical system, and wherein said only one lens group is a negative lens group of said at least one negative lens group which is disposed on a most object side of said optical-path bending zoom optical system,
and wherein an axis length d, as calculated on an air basis, from said refracting surface located just before a reflecting surface of said reflecting optical element to a refracting surface located just after said reflecting surface satisfies the following condition (a):

$$0.5 < d/L < 1.4 \qquad (a)$$

where L is a diagonal length of an effective image pickup area of said electronic image pickup device.

44. An electronic image pickup apparatus comprising:
an optical path-bending zoom optical system and an electronic image pickup device, said optical path-bending zoom optical system comprising:
at least one negative lens group,
at least one positive lens group that moves only toward an object side of said optical path-bending zoom optical system for zooming from a wide-angle end to a telephoto end of said optical path-bending zoom optical system, and
only one reflecting optical element for bending an optical path, which element has a fixed shape and is located on said object side with respect to all lens groups movable during zooming,
wherein said electronic image pickup device is disposed on an image side of said optical-path-bending zoom optical system,
wherein only one lens group is disposed on an object side with respect to said at least one positive lens group that moves only toward the object side of said optical path-bending zoom optical system, and wherein said only one lens group is a negative lens group of said at least one negative lens group which is disposed on a most object side of said optical-path bending zoom optical system,
and wherein said optical path-bending zoom optical system includes a final lens group located nearest to an image plane side of said optical path-bending zoom optical system,
and wherein said final lens group consists of a single lens alone, and is located on an image side with respect to said positive lens group.

45. The electronic image pickup apparatus according to claim 1, and further comprising an aperture stop, wherein all lens groups that are located on the image side of said optical path-bending zoom optical system with respect to said aperture stop has positive power.

46. The electronic image pickup apparatus according to claim 1, and further comprising an aperture stop, wherein image side of said optical path-bending zoom optical system with respect to said aperture stop consists of three positive lens elements.

47. The electronic image pickup apparatus according to claim 1, and further comprising an aperture stop, wherein an image side of said optical path-bending zoom optical system with respect to said aperture stop comprises two single lens elements.

48. An electronic image pickup apparatus comprising:
an optical path-bending zoom optical system and an electronic image pickup device, said optical path-bending zoom optical system comprising:
at least one negative lens group,
at least one positive lens group that moves only toward an object side of said optical path-bending zoom optical system for zooming from a wide-angle end to a telephoto end of said optical path-bending zoom optical system, and only one reflecting optical element for bending an optical path, which element is located on said object side with respect to all lens groups movable during zooming, wherein said electronic image pickup device is disposed on an image side of said optical path-bending zoom optical system, and wherein focusing is carried out only by movement of one single lens element.

49. The electronic image pickup apparatus according to claim 1, wherein upon photo-taking, said image pickup optical system remains confined within a body.

50. The electronic image pickup apparatus according to claim 1, wherein a lens group including said reflecting optical system remains fixed.

51. The electronic image pickup apparatus according to claim 1, and further comprising an aperture stop, wherein a spacing between said aperture stop and a lens element located just after an image side of said aperture is always kept constant.

52. An electronic image pickup apparatus comprising:

an optical path-bending zoom optical system and an electronic image pickup device, said optical path-bending zoom optical system comprising:

at least one negative lens group, at least one positive lens group that moves only toward an object side of said optical path-bending zoom optical system for zooming from a wide-angle end to a telephoto end of said optical path-bending zoom optical system, and only one reflecting optical element for bending an optical path, which element has a fixed shape and is located on said object side with respect to all lens groups movable during zooming, wherein only one lens group is disposed on an object side with respect to said at least one positive lens group that moves only toward the object side of said optical path-bending zoom optical system, and wherein said only one lens group is a negative lens group of said at least one negative lens group which is disposed on a most object side of said optical path-bending zoom optical system, wherein said electronic image pickup device is disposed on an image side of said optical-path bending zoom optical system, and wherein said optical path-bending zoom optical system includes a final lens group located nearest to an image plane side of said optical path-bending zoom optical system, and wherein a low-pass filter located on said image side of said final lens group is formed by superposition of a plurality of filter elements.

53. An electronic image pickup apparatus, comprising:

an optical path-bending zoom optical system and an electronic image pickup device, said optical path-bending zoom optical system comprising:

at least one negative lens group, at least one positive lens group that moves only toward an object side of said optical path-bending zoom optical system for zooming from a wide-angle end to a telephoto end of said optical path-bending zoom optical system, only one reflecting optical element for bending an optical path, which element has a fixed shape and is located on said object side with respect to all lens groups movable during zooming, and a further negative lens group that remains fixed during zooming, wherein said further negative lens group that remains fixed during zooming is disposed on an object side with respect to said at least one positive lens group that moves only toward the object side of said optical path-bending zoom optical system, wherein said electronic image pickup device is disposed on an image side of said optical path-bending zoom optical system wherein only one lens group is disposed on an object side with respect to said at least one positive lens group that moves only toward the object side of said optical path-bending zoom optical system, and wherein said only one lens group is a negative lens group of said at least one negative lens group which is disposed on a most object side of said optical-path bending zoom optical system, and wherein a partial optical system having said reflecting optical element and located on said object side with respect to said all lens groups movable during zooming, has a negative combined focal length.

* * * * *